US005773559A

United States Patent [19]
Miyamoto et al.

[11] Patent Number: 5,773,559
[45] Date of Patent: Jun. 30, 1998

[54] POLYIMIDE BLOCK COPOLYMER AND LIQUID CRYSTAL ALIGNMENT LAYER FORMING AGENT

[75] Inventors: Tsuyoshi Miyamoto, Yokohama; Masayuki Kimura, Yokkaichi; Kazuhiro Eguchi, Tsuchiura; Yasuo Matsuki, Yokkaichi, all of Japan

[73] Assignee: Japan Synthetic Rubber Co., Ltd., Tokyo, Japan

[21] Appl. No.: 594,521

[22] Filed: Jan. 31, 1996

[30] Foreign Application Priority Data

Jan. 31, 1995 [JP] Japan .................................... 7-032875

[51] Int. Cl.$^6$ ........................... C08G 73/10; C08G 69/26
[52] U.S. Cl. ........................ 528/353; 528/125; 528/128; 528/170; 528/172; 528/173; 528/176; 528/183; 528/185; 528/220; 528/229; 528/350; 528/351; 428/1; 428/473.5; 359/36; 359/93; 359/103; 359/104
[58] Field of Search .................... 428/1, 473.5; 528/125, 528/128, 170, 172, 173, 176, 183, 185, 188, 220, 229, 350, 351, 353; 359/103, 104, 36, 93

[56] References Cited

U.S. PATENT DOCUMENTS

| 5,276,132 | 1/1994 | Nishikawa et al. ..................... 528/353 |
| 5,478,682 | 12/1995 | Nishikawa et al. ..................... 430/320 |

FOREIGN PATENT DOCUMENTS

| 0 337 355 | 10/1989 | European Pat. Off. . |
| 0 400 635 | 12/1990 | European Pat. Off. . |
| 0 479 148 | 4/1992 | European Pat. Off. . |
| 0 527 439 | 2/1993 | European Pat. Off. . |
| 0 540 829 | 5/1993 | European Pat. Off. . |
| 5-25274 | 2/1993 | Japan . |
| 7-157560 | 6/1995 | Japan . |
| 2 266 859 | 11/1993 | United Kingdom . |

OTHER PUBLICATIONS

"Principles of Polymerization," 3rd Ed., by George Odian, John Wiley & Sons, Inc., pp. 142–143, the date of publication is not available.

*Primary Examiner*—P. Hampton-Hightower
*Attorney, Agent, or Firm*—Oblon, Spivak, McClelland, Maier & Neustadt, P.C.

[57] ABSTRACT

The present invention relates to a process of producing a polyimide-type copolymer, to a thin layer forming agent, to a liquid crystal alignment layer and to processes of producing thin layer formation agents and liquid crystal alignment layers. More specifically, this invention relates to a polyamic acid block copolymer, a polyimide block copolymer, a polyimide-polyamic acid block copolymer, a thin layer forming agent comprised of a polyimide-type block copolymer, and a liquid crystal alignment layer comprised of a polyimide-type block copolymer and processes of their production.

25 Claims, 17 Drawing Sheets

FORMULA 1

FORMULA 2

(X: a hydrogen atom or an organic group)

FORMULA 3

FORMULA 4

(X: a hydrogen atom or an organic group)

FORMULA 1

FORMULA 2

(X: a hydrogen atom or an organic group)

FORMULA 3

FORMULA 4

(X: a hydrogen atom or an organic group)

REACTION 1

Tetracarboxylic dianhydrides

The first polyamic acid prepolymer

REACTION 2

Tetracarboxylic acid or Tetracarboxylic ester
(X: a hydrogen atom or an organic group)

The first polyamic acid prepolymer

REACTION 3

Tetracarboxylic dianhydrides
(excess amount)

The second polyamic acid prepolymer

REACTION 4

Tetracarboxylic acid or Tetracarboxylic ester
(excess amount)
(X: a hydrogen atom or an organic group)

The second polyamic acid prepolymer

FORMULA 5

Block copolymer type polyamic acid

The first polyamic acid block    The second polyamic acid block (X: a hydrogen atom or an organic group)

COMPOUND A09

(a = 5~12)

COMPOUND A10

(b = 1~5)

COMPOUND A08

COMPOUND A11

COMPOUND A12

COMPOUND A13

COMPOUND A14

FORMULA 6
Polyimide block copolymer

The first polyimide block    The second polyimide block

REACTION 5

Tetracarboxylic dianhydrides

Diamine compound (excess amount)

The first polyimide prepolymer

REACTION 6

Tetracarboxylic acid or Tetracarboxylic ester
(X: a hydrogen atom or an organic group)

Diamine compound (excess amount)

The first polyimide prepolymer

REACTION 7

Tetracarboxylic dianhydrides
(excess amount)

The second polyimide prepolymer

REACTION 8

Tetracarboxylic acid or Tetracarboxylic ester
(excess amount)
(X: a hydrogen atom or an organic group)

The second polyimide prepolymer

COMPOUND B09

(a = 5~12)

COMPOUND B10

(b = 1~5)

COMPOUND B08

COMPOUND B11

COMPOUND B12

COMPOUND B13

COMPOUND B14

POLYIMIDE BLOCK COPOLYMER AND LIQUID CRYSTAL ALIGNMENT LAYER FORMING AGENT

The present invention relates to a process of producing a polyimide-type copolymer, to a thin layer forming agent, to a liquid crystal alignment layer and to processes of producing thin layer formation agents and liquid crystal alignment layers. More specifically, this invention relates to a polyamic acid block copolymer, a polyimide block copolymer, a polyimide-polyamic acid block copolymer, a thin layer forming agent comprised of a polyimide-type block copolymer, and a liquid crystal alignment layer comprised of a polyimide-type block copolymer and processes of their production.

At present, so-called TN (Twisted Nematic) type liquid crystal display elements are known. A substrate with a transparent conductive layer thereon is coated with a liquid crystal alignment layer made of polyimide and the like. Two such substrates are put together to form a cell holding a nematic liquid crystal having positive dielectric anisotropy is formed in a sandwich structure, and the major axis of the liquid crystal molecule is continuously twisted, from one substrate to the other substrate, due to the alignment layers, by 90 degrees. The liquid crystal alignment layers in TN type display elements are normally made so by rubbing.

Recently being developed is the SBE (Super Twisted Birefringent Effect) display element, which exceeds the TN type display in contrast and visual properties. The SBE display element uses as a liquid crystal substance a nematic liquid crystal which is blended with a chiral agent and utilizes the birefringent effect generated when the substrates are continuously twisted until the angle between the major axis of the first substrate and that of the last substrate reaches 180° or more.

When, for example, an SBE type display element is produced using a liquid crystal alignment layer comprised of conventional polyimide, the "pretilt angle" (the angle the major axis of the liquid crystal molecule makes with the plane of the liquid crystal alignment layer) is so small that, for example, it cannot be 3° or more. As a result, it is difficult to continually twist the liquid crystal molecule at 180° or more as one proceeds from one substrate to the next, and the resulting liquid crystal display element cannot have the predetermined desired display function. For this reason, a SBE display element needs to use as the liquid crystal alignment layer a layer formed by oblique evaporation of silicon monoxide to obtain a large pretilt angle. However, this liquid crystal alignment layer requires complex processing and does not suit mass production. It is to be noted that the TN type display element is also required to have a large pretilt angle to reduce display defects due to the reversed tilt phenomena during cell driving.

Knowing the above background, to obtain a large pretilt angle of 3° or more various modified polyimides, which inherently have the properties necessary to be a liquid crystal alignment layer, have been considered as a liquid crystal alignment layer material. Polyimides having long chain alkyl groups or fluorine atoms, for example, have been tested. In this technology, however, the polarity of the polyimide itself can be decreased due to such specific atoms or atom groups, providing a liquid crystal alignment layer with poor adhesion to substrates. As a result, the liquid crystal alignment layer peels from the substrate when rubbed as required to provide liquid crystal alignability.

Generally, a liquid crystal alignment layer comprised of polyimide is provided by using a solution obtained by dissolving a polyamic acid (a polyimide carboxylic acid) or a soluble polyimide into an appropriate organic solvent to provide a liquid crystal alignment layer forming agent. The solution is then applied to the surface of the substrate that will constitute a liquid crystal display element cell to obtain a polyimide thin layer. The thin layer is then aligned by rubbing treatment or the like to obtain a liquid crystal alignment layer.

If desired, a selected partial domain of the liquid crystal alignment layer may be irradiated by, for example, ultraviolet light to alter, or correct or improve the alignment properties before or after an aligning treatment by, for example, rubbing: in the area, the pretilt angle can be, for example, narrowed compared to other areas. Within the area in which different pretilt angle regions coexist, a liquid crystal display element provides excellent quality with less viewing angle dependency; contrast is less dependent on the viewing angle.

Presently, for a polyimide used as a material for a liquid crystal alignment layer forming agent in relation to its applications, functions, and the process of forming a liquid crystal alignment layer, a variety of properties are required, as follows:

(1) to obtain excellent alignment properties in a liquid crystal display element by providing a predetermined pretilt angle, (2) to obtain high durability to the aligning treatment, such as rubbing, (3) to obtain excellent applicability, (4) to obtain high transparency, (5) to obtain high voltage retention, (6) to have little flickering in the liquid crystal display element, (7) to obtain excellent preservation properties, (8) to be able to execute highly efficient alignment property correction by irradiation.

Conventional polyimides, however, do not have well balanced properties as mentioned above; normally, a polyimide excellent in a specific property does not have other excellent specific properties. To obtain a polyimide having plural properties, a plural polyimide mixture having different properties may be considered; however, in this case, it is rare that these properties can be obtained together, but rather, differences in physical properties of each polyimide and insufficient miscibility make it difficult to obtain excellent properties, such as a high transparency, prerequisite for a liquid crystal alignment layer and sufficiently excellent applicability. As a result, the goal is not achievable.

A polyimide is produced by polycondensation reaction between tetracarboxylic dianhydrides and diamine compounds or diisocyanate compounds. To obtain a polyimide having plural different properties or a polyimide having modified properties, several different diamine compounds, for example, can be used for production together. By such a process, however, it is difficult to control polycondensation reaction conditions and the predetermined desired polyimide cannot be obtained easily.

OBJECTS OF THE INVENTION

The present invention was accomplished in view of the prior art mentioned above. One of the objects of this invention is to provide a polyimide-type copolymer which is useful, especially as a liquid crystal alignment layer material, providing predetermined plural properties. These properties are difficult to obtain at the same time by conventional methods.

Another object of this invention is to provide a process of producing a polyamic acid block copolymer, a polyimide block copolymer or a polyimide-polyamic acid block copolymer which provides some or all of the above-mentioned properties.

Another object of this invention is to provide a thin layer forming agent capable to form a thin layer having excellent predetermined plural properties which are difficult to obtain at the same time by conventional methods and to provide a liquid crystal alignment layer having plural excellent properties which is difficult to obtain at the same time by conventional methods. Another object of the invention is the production processes of the liquid crystal alignment layers above mentioned.

DETAILED DESCRIPTION OF THE INVENTION

In this specification, the term "polyimide-type" includes both polyimide and polyamic acid-based materials. Therefore, the term "polyimide-type block copolymer" includes a polyamic acid block copolymer, a polyimide block copolymer, and a polyimide-polyamic acid block copolymer. The term "polyimide-type block" includes both a polyamic acid block and a polyimide block.

The term "tetracarboxylic compounds" in this specification includes (1) tetracarboxylic dianhydrides having two divalent carboxylic anhydride groups (—CO—O—CO—) bonded to tetravalent nuclear atom group, (2) tetracarboxylic acid or tetracarboxylic ester having a total of four (—COOH) groups and/or (—COOR) groups (wherein R is an organic group such as an alkyl group or an aryl group) bonded to tetravalent nuclear atom group, and (3) tetracarboxylic monoanhydride or tetracarboxylic ester monohydride having one divalent carboxylic anhydride group and a total of two of (—COOH) groups and/or (—COOR) groups bonded to tetravalent nuclear atom group~where R is alkyl, etc.

The term "polyamic acid prepolymer" in this specification is the same as "amic acid prepolymer" or "amic acid oligomer". The term "polyimide prepolymer" is the same as "imide oligomer". The term "(tetra) carboxylic (di) anhydride" in this specification is the same as "(tetra) carboxylic acid (di) anhydride".

The invention process of producing a polyamic acid block copolymer comprises the formation, in a molecule, of a first polyamic acid block and a second polyamic acid block having a different structure from the first and includes the following steps:

obtaining a first polyamic acid prepolymer having amino groups at its ends by a reaction between tetracarboxylic compounds and diamine compounds.

obtaining a second polyamic acid prepolymer having reactive groups at its ends originating from tetracarboxylic compounds by a reaction between tetracarboxylic compounds and diamine compounds, and reacting the first polyamic acid prepolymer with the second polyamic acid prepolymer. (Method A)

One invention process for producing a polyimide block copolymer comprises imidizing a polyamic acid block copolymer produced in the above mentioned process to obtain a polyimide block copolymer comprising, in a molecule, a first polyimide block and a second polyimide block. (Method B)

Another process for producing a polyimide block copolymer of this invention is to produce a polyimide block copolymer. comprising, in a molecule, a first polyimide block and a second polyimide block having a different structure from the first one including the steps of:

obtaining a first polyimide prepolymer having amino groups at its ends by a reaction between tetracarboxylic compounds and diamine compounds, obtaining a second polyimide prepolymer having reactive groups originating from tetracarboxylic compounds at its ends by a reaction between tetracarboxylic compounds and diamine compounds, and reacting the first polyimide prepolymer with the second polyimide prepolymer. (Method C)

Another process of producing a polyimide block copolymer of this invention is to produce a polyimide block copolymer comprising, in a molecule, a first polyimide block and a second polyimide block having a different structure from the first one and includes the steps of:

obtaining a first polyimide prepolymer having isocyanate groups at its ends by a reaction between tetracarboxylic dianhydrides and diisocyanate compounds, obtaining a second polyimide prepolymer having carboxylic acid anhydride groups at its ends by a reaction between tetracarboxylic dianhydrides and diisocyanate compounds, and reacting the first polyimide prepolymer with the second polyimide prepolymer. (Method D)

One process of producing a polyimide-polyamic acid block copolymer according to this invention is to produce a polyimide-polyamic acid block copolymer comprising, in a molecule, a polyimide block and a polyamic acid block, and includes the steps of:

obtaining a polyimide prepolymer having carboxylic anhydride groups or isocyanate groups at its ends by a reaction between tetracarboxylic dianhydrides and diisocyanate compounds, obtaining polyamic acid prepolymers having amino groups or carboxylic anhydride groups at its ends by a reaction between tetracarboxylic dianhydrides and diamine compounds, reacting the polyamic acid prepolymer having amino groups at its ends with the polyimide prepolymer containing carboxylic anhydride groups at its ends, and/or reacting the polyamic acid prepolymer having carboxylic anhydride groups at its ends with the polyimide prepolymer containing isocyanate groups at its ends. (Method E)

Another process of producing a polyimide-polyamic acid block copolymer according to this invention is to produce a polyimide-polyamic acid block copolymer having a polyimide block and a polyamic acid block in a molecule and includes the steps of:

obtaining a polyimide prepolymer having reactive groups originating from tetracarboxylic compounds or amino groups at its ends by a reaction between tetracarboxylic compounds and diamine compounds, obtaining a polyamic acid prepolymer having amino groups or reactive groups originating from tetracarboxylic compounds at its ends by a reaction between tetracarboxylic compounds and diamine compounds, reacting a polyamic acid prepolymer having amino groups at its ends with the polyimide prepolymer containing reactive groups originating from tetracarboxylic compounds at its ends, and/or reacting a polyamic acid prepolymer having reactive groups originating from tetracarboxylic compounds at its ends with the polyimide prepolymer containing amino groups at its ends. (Method F)

BRIEF DESCRIPTION OF THE DRAWINGS

The thin layer forming agents of this invention include a polyimide-type block copolymer having a first polyimide-type block and a second polyimide-type block that is bonded to the first polyimide-type block and has a different structure from the first polyimide-type block; the first polyimide-type block preferably having recurring units illustrated in formula 1 or 2 of FIG. 1, and the second polyimide-type block preferably having recurring units illustrated in formula 3 or 4 of FIG. 1, wherein $R^1$ and $R^2$ are tetravalent organic groups which can be the same or different; $Q^1$ and $Q^2$ are divalent organic groups which can be the same or different and X is a hydrogen atom or an organic group.

The liquid crystal alignment layer of this invention includes a polyimide block copolymer comprising, in a molecule, a first polyimide block and a second polyimide block which is bonded to the first polyimide-type block and has a different structure from the first polyimide block, the first polyimide block, having recurring units illustrated in formula 1 of FIG. 2 and, the second polyimide block having recurring units illustrated in formula 3 of FIG. 2 wherein $R^1$ and $R^2$ are tetravalent organic groups which can be the same or different; $Q^1$ and $Q^2$ are divalent organic groups which can be the same or different and X is a hydrogen atom or an organic group.

The process of producing liquid crystal alignment layers of this invention comprises the step of producing a thin layer comprising a polyimide block copolymer on a substrate surface optionally a step of altering alignment by irradiation on at least a selected region of the thin layer.

The above invention methods, agents and layers will now be more fully described with regard to specific steps, etc.

Method A

This process is used to produce a polyamic acid block copolymer comprised of, in a molecule, a first polyamic acid block and a second polyamic acid block having a different structure from the first. There are preferably three steps in this process.

Step 1

Step 1 is a step to produce a first polyamic acid prepolymer having amino groups at molecular ends, by reacting tetracarboxylic compounds with diamine compounds having two amino groups (—$NH_2$) bonded to a divalent organic group ($Q^1$ illustrated in reaction 1 or 2 of FIG. 3), with the molar ratio of diamine compounds to tetracarboxylic compounds of, for example, 1.001~2.0, i.e., an excess of equivalent diamine compound.

Step 2

Step 2 is a step to produce a second polyamic acid prepolymer having reactive groups originating from tetracarboxylic compounds at molecular ends, by reacting tetracarboxylic compounds with diamine compounds having two amino groups bonded to a divalent organic group ($Q^2$ as illustrated in reaction 3 or 4 of FIG. 4), with the molar ratio of tetracarboxylic compounds to diamine compounds of, for example, 1.001~2.0, i.e., an excess of equivalent tetracarboxylic compounds.

Step 3

Figure 1A:
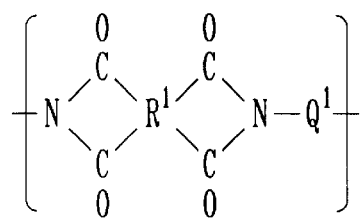
Figure 1B:
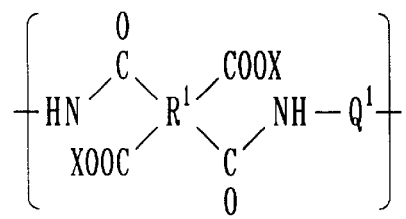
Figure 1C:
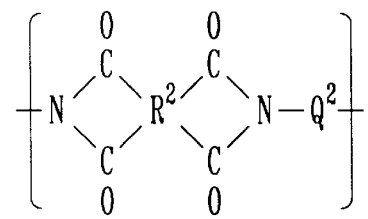
Figure 1D:
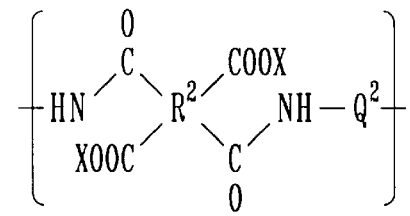
Figure 2A:
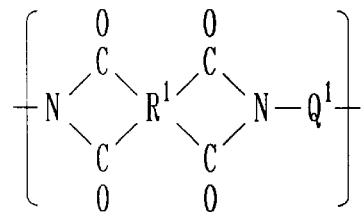
Figure 2B:
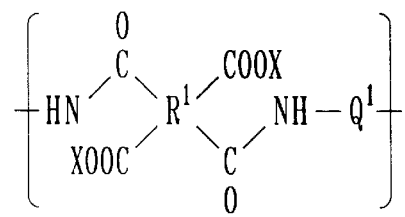
Figure 2C:
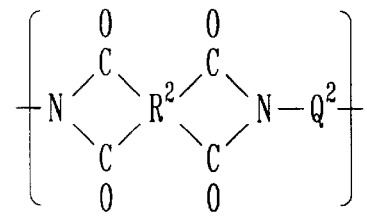
Figure 2D:
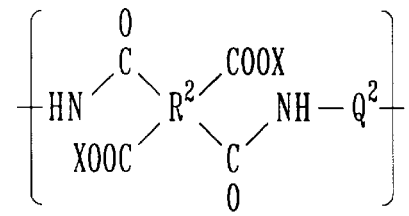
Figure 3A:
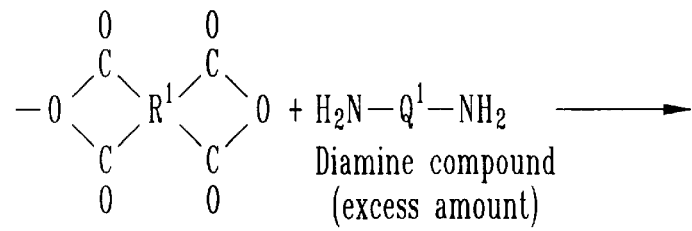
Figure 3A:
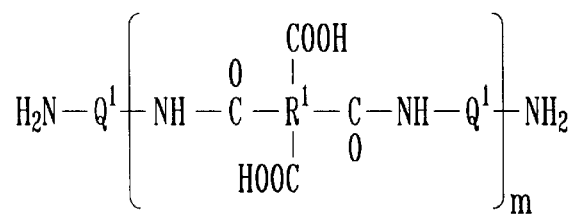
Figure 3B:
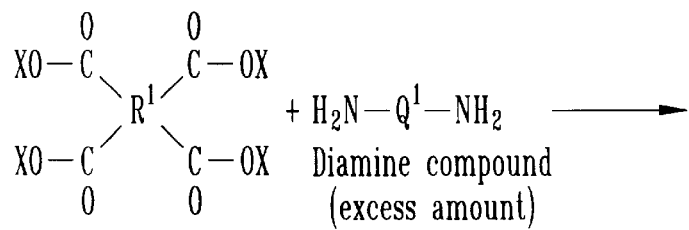
Figure 3B:
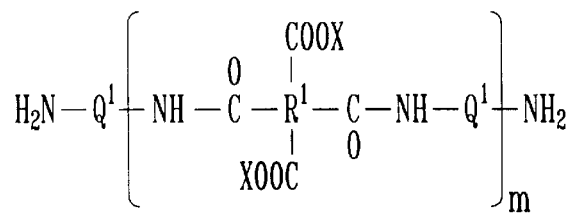
Figure 4A:
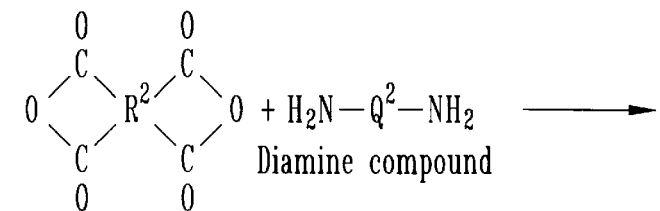
Figure 4A:
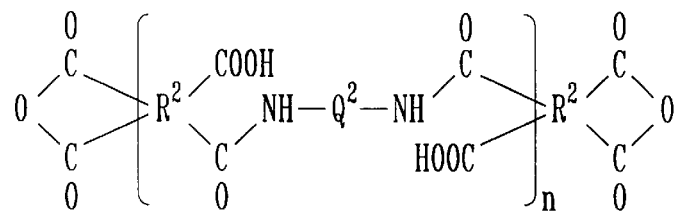
Figure 4B:
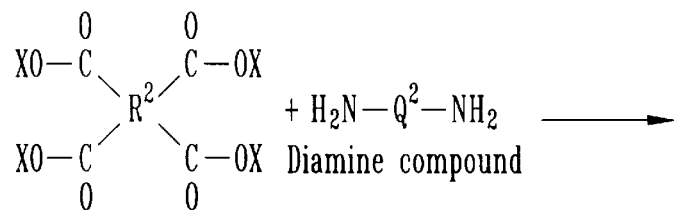
Figure 4B:
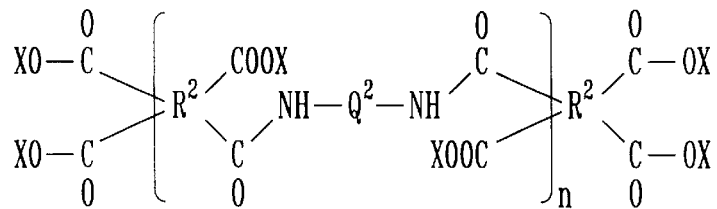
Figure 5:
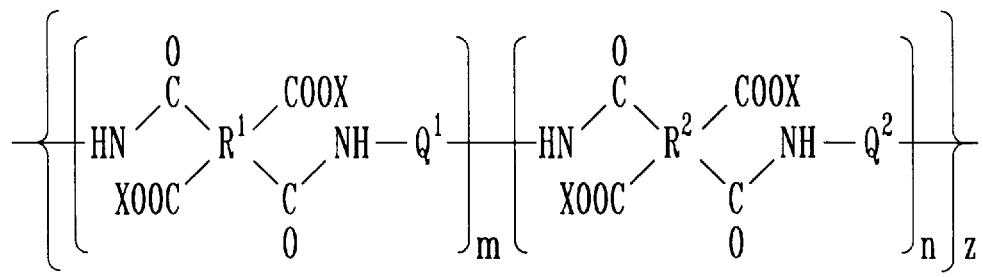

Step 3 is a step to produce a polyamic acid block copolymer by reacting the amino reaction groups at the ends of the first polyamic acid prepolymer obtained in Step 1, with the reaction groups originating from tetracarboxylic compounds at the ends of the second polyamic acid prepolymer obtained in Step 2, in the same manner as in Steps 1 or 2; as illustrated in, e.g., formula 5 of FIG. 5. Here, a first polyamic acid block has as one block a bonding between a nuclear atom group $R^1$ and an organic group $Q^1$ via a divalent bonding group (—C)—NH—), and as a second block a bonding between a nuclear atom group $R^2$ and an organic group $Q^2$ via a divalent bonding group (—CO—NH—) in the same manner.

As described above, the first and the second polyamic acid prepolymers are structurally different from each other; specifically, molecular structures of recurring units of each polyamic acid prepolymer are different. Referring to FIG. 5, nuclear groups $R^1$ and $R^2$ can be same or different from each other and organic groups $Q^1$ and $Q^2$ can be same or different; however, ($R^1$ and $R^2$) and ($Q^1$ and $Q^2$) cannot be same at the same time; at least one set should have different structures.

For this reason, Step 1 and Step 2 may use different compounds as tetracarboxylic compounds, different compounds as diamine compounds, or different compounds in both cases. When tetracarboxylic compounds and diamine compounds used in Step 1 and Step 2 are the same compounds ($R^1=R^2$ and $Q^1=Q^2$ in formula 5), the resulting polymer becomes a homopolymer, not a block copolymer, because the first and the second polyamic acid prepolymers are the same.

Although the amount of either tetracarboxylic compounds or diamine compounds is used in excess of the other part in Steps 1 and 2, the ratio of compounds in each step can be selected based on properties required for a final polyimide-type block copolymer. The molar ratio of one to the other is normally in the range of 1.001~2.0 including all values and subranges therebetween.

In FIG. 5, the number of recurring units, m and n, in each polyamic acid block is normally in the range of 1 to 1000, preferably 2 to 1000. This range is the same in reactions 1, 2, 3 and 4 of FIGS. 3 and 4 and reactions 5, 6, 7 and 8 of FIGS. 11 and 12. The number of recurring units z of the bonded body between the first polyamic acid block and the second polyamic acid block is in the range of 1 to 100. When z is two or more, m or n of each recurring unit can be the same, but this is not necessary.

In Method A, it is preferable that the total moles of tetracarboxylic compounds and moles of diamine compounds used in Steps 1 and 2, taken in sum, are in an equivalent relationship.

In each of Step 1 and Step 2, plural kinds (i.e., mixtures) of compounds can be used as the tetracarboxylic compounds and as diamine compounds.

By having one kind or more of the polyamic acid prepolymer produced in the same manner as in Step 1 or Step 2, reacted in Step 3 or in the same manner as in Step 3, polyamic acid block copolymers comprised of three kinds or more of polyamic acid blocks can be produced.

The above mentioned polyamic acid prepolymers and the polyamic acid block copolymer contain imide bonds in part depending on reaction conditions.

Tetracarboxylic compounds used in the above Method A are not especially limited. It is preferable, however, that at least one tetracarboxylic compound used in Step 1 and/or 2 is a cyclic aliphatic tetracarboxylic compound, from the point of solubility of a polyimide block copolymer derived from a block copolymer type polyamic acid in organic solvent.

In view of transparency and liquid crystal alignment properties such as electric properties (when the liquid crystal is in a driving condition) of a polyimide-block copolymer derived from polyamic acid block copolymers or polyamic acid, it is preferable that the diamine compounds used in Steps 1 and 2 are as follows: diamine compounds in one step have two amino groups (—NH$_2$) bonded to an aromatic ring and hetero atoms other than the nitrogen atoms of the amino groups; diamine compounds in the other step have two amino groups that are bonded to an aromatic ring, and no hetero atoms other than the structural atoms of the amino groups.

Tetracarboxylic Compounds

Examples of tetracarboxylic (acid) dianhydrides useful herein include:

aliphatic tetracarboxylic dianhydrides or cyclic aliphatic tetracarboxylic dianhydrides such as butane tetracarboxylic dianhydride;
1,2,3,4-cyclobutanetetracarboxylic dianhydride;
1,3-dimethyl-1,2,3,4-cyclobutanetetracarboxylic dianhydride;
1,3-diethyl-1,2,3,4-cyclobutanetetracarboxylic dianhydride;
1,2,3,4-tetramethyl-1,2,3,4-cyclobutanetetracarboxylic dianhydride;
1,2,3,4-cyclopentanetetracarboxylic dianhydride;
2,3,5-tricarboxycyclopentylacetic dianhydride;
3,5,6-tricarboxynorbornane-2-acetic dianhydride;
2,3,4,5-tetrahydrofurantetracarboxylic dianhydride;
1,3,3a,4,5,9b-hexahydro-5-(tetrahydro-2,5-dioxo-3-furanyl)naphtho[1,2-c]furan-1,3-dione;
1,3,3a,4,5,9b-hexahydro-5-methyl-5-(tetrahydro-2,5-dioxo-3-furanyl)naphtho[1,2-c]furan-1,3-dione;
1,3,3a,4,5,9b-hexahydro-5-ethyl-5-(tetrahydro-2,5-dioxo-3-furanyl)naphtho[1,2-c]furan-1,3-dione;
1,3,3a,4,5,9b-hexahydro-7-methyl-5-(tetrahydro-2,5-dioxo-3-furanyl)naphtho[1,2-c]furan-1,3-dione;
1,3,3a,4,5,9b-hexahydro-7-ethyl-5-(tetrahydro-2,5-dioxo-3-furanyl)naphtho[1,2-c]furan-1,3-dione;
1,3,3a,4,5,9b-hexahydro-8-methyl-5-(tetrahydro-2,5-dioxo-3-furanyl)naphtho[1,2-c]furan-1,3-dione;
1,3,3a,4,5,9b-hexahydro-8-ethyl-5-(tetrahydro-2,5-dioxo-3-furanyl)naphtho[1,2-c]furan-1,3-dione;
5-(2,5-dioxotetrahydrofural)-3-methyl-3-cyclohexene-1,2-dicarboxylic dianhydride;
bicyclo[2.2.2]octo-7-en-2,3,5,6-tetracarboxylic dianhydride;
aromatic tetracarboxylic (acid) dianhydrides such as pyromellitic dianhydride;
3,3',4,4'-benzophenonetetracarboxylic dianhydride;
3,3',4,4'-biphenylsulfonetetracarboxylic dianhydride;
1,4,5,8-naphthalenetetracarboxylic dianhydride;
2,3,6,7-naphthalenetetracarboxylic dianhydride;
3,3',4,4'-biphenylethertetracarboxylic dianhydride;
3,3',4,4'-dimethyldiphenylsilanetetracarboxylic dianhydride;
3,3',4,4'-tetraphenylsilanetetracarboxylic dianhydride;
1,2,3,4-furantetracarboxylic dianhydride;
4,4'-bis(3,4-dicarboxyphenoxy)diphenylsulfide dianhydride;
4,4'-bis(3,4-dicarboxyphenoxy)diphenylsulfone dianhydride;
4,4'-bis(3,4-dicarboxyphenoxy)diphenylpropane dianhydride;
3,3',4,4'-perfluoroisopropyliden diphthalic acid dianhydride;
3,3',4,4'-biphenyltetracarboxylic dianhydride;
bis(phthalic acid)-phenylphosphineoxide dianhydride;
p-phenylene-bis(triphenylphthalic acid)dianhydride;
m-phenylene-bis(triphenylphthalic acid)dianhydride;
bis(triphenylphthalic acid)-4,4'-diphenylether dianhydride;
bis(triphenylphthalic acid)-4,4'-diphenylmethane dianhydride.

Examples of tetracarboxylic acids include:
aliphatic tetracarboxylic acids or cyclic aliphatic tetracarboxylic acids such as
butanetetracarboxylic acid;
1,2,3,4-cyclobutanetetracarboxylic acid;
1,3-dimethyl-1,2,3,4-cyclobutanetetracarboxylic acid;
1,3-diethyl-1,2,3,4-cyclobutanetetracarboxylic acid;
1,2,3,4-tetramethyl-1,2,3,4-cyclobutanetetracarboxylic acid;
1,2,3,4-cyclopentanetetracarboxylic acid;
2,3,5-tricarboxylcyclopentyl acetic acid;
3,5,6-tricarboxylnorbornane-2-acetic acid;
2,3,4,5-tetrahydrofurantetracarboxylic acid;
5-(2,5-dioxotetrahydrofural)-3-methyl-3-cyclohexene-1,2-dicarboxylic acid;
bicyclo[2.2.2]octo-7-en-2,3,5,6-tetracarboxylic acid;
aromatic tetracarboxylic acid such as pyromellitic acid;
3,3',4,4'-benzophenontetracarboxylic acid; 3,3',4,4'-biphenylsulfonetetra-carboxylic acid;
3,3',4,4'-biphenylethertetracarboxylic acid;
3,3',4,4'-dimethyldiphenylsilanetetracarboxylic acid;
1,2,3,4-furantetracarboxylic acid;
4,4'-bis(3,4-dicarboxyphenoxy)diphenylsulfide;
4,4'-bis(3,4-dicarboxyphenoxy)diphenylsulfone;
3,3',4,4'-perfluoroisopropylidendiphthalic acid;
3,3',4,4'-biphenyltetracarboxylic acid;
p-phenylene-bis(triphenylphthalic acid);
m-phenylene-bis(triphenylphthalic acid);
bis(triphenylphthalic acid)-4,4'-diphenylmethane.

Examples of tetracarboxylic esters include methyl ester, ethyl ester, propyl ester, isopropyl ester and butyl ester of above mentioned carboxylic acids. Specifically, examples are pyromellitic acid tetramethyl ester, pyromellitic acid tetraethyl ester, pyromellitic acid tetrapropyl ester, pyromellitic acid tetraisopropyl ester and pyromellitic acid tetrabutyl ester.

Among these, tetracarboxylic anhydrides are preferable. Especially, cyclic aliphatic tetracarboxylic dianhydrides such as
2,3,5-tricarboxycyclopentylacetic dianhydride;
1,2,3,4-cyclobutanetetracarboxylic dianhydride;
1,3-dimethyl-1,2,3,4-cyclobutanetetracarboxylic dianhydride;

1,3,3a,4,5,9b-hexahydro-5-(tetrahydro-2,5-dioxo-3-furanyl)naphtho[1,2-c]furan-1,3-dione;
1,3,3a,4,5,9b-hexahydro-5-methyl-5-(tetrahydro-2,5-dioxo-3-furanyl)naphtho[1,2-c]furan-1,3-dione;
1,3,3a,4,5,9b-hexahydro-5-ethyl-5-(tetrahydro-2,5-dioxo-3-furanyl)naphtho[1,2-c]furan 1,3-dione;
1,3,3a,4,5,9b-hexahydro-7-methyl-5-(tetrahydro-2,5-dioxo-3-furanyl)naphtho[1,2-c]furan 1,3-dione;
1,3,3a,4,5,9b-hexahydro-7-ethyl-5-(tetrahydro-2,5-dioxo-3-furanyl)naphtho[1,2-c]furan 1,3-dione;
1,3,3a,4,5,9b-hexahydro-8-methyl-5-(tetrahydro-2,5-dioxo-3-furanyl)naphtho[1,2-c]furan-1,3-dione;
1,3,3a,4,5,9b-hexahydro-8-ethyl-5-(tetrahydro-2,5-dioxo-3-furanyl)naphtho[1,2-c]furan-1,3-dione.

Also other preferable tetracarboxylic dianhydrides are
butanetetracarboxylic dianhydride;
pyromellitic acid dianhydride;
3,3',4,4'-benzophenonetetracarboxylic dianhydride;
3,3',4,4'-biphenylsulfonetetracarboxylic dianhydride;
1,4,5,8-naphthalenetetracarboxylic dianhydride;
2,3,6,7-naphthalenetetracarboxylic dianhydride;
3,3',4,4'-biphenylethertetracarboxylic dianhydride.

These tetracarboxylic compounds can be used alone or in a combination of two or more.

Diamine Compounds

Figure 6:
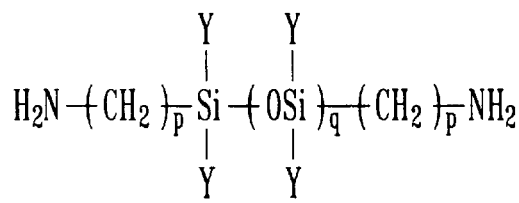
Figure 7A:
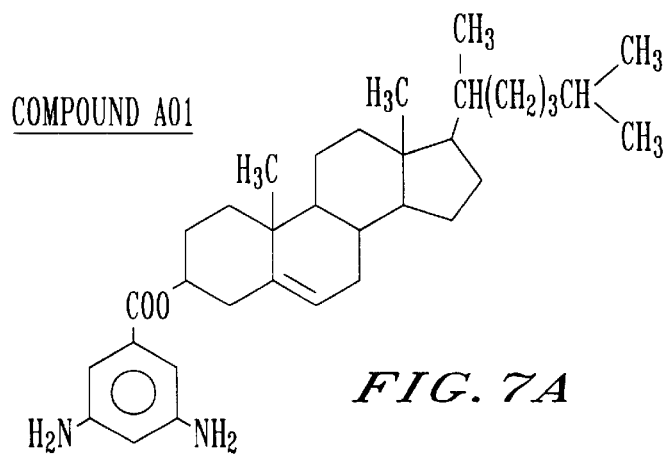
Figure 7B:
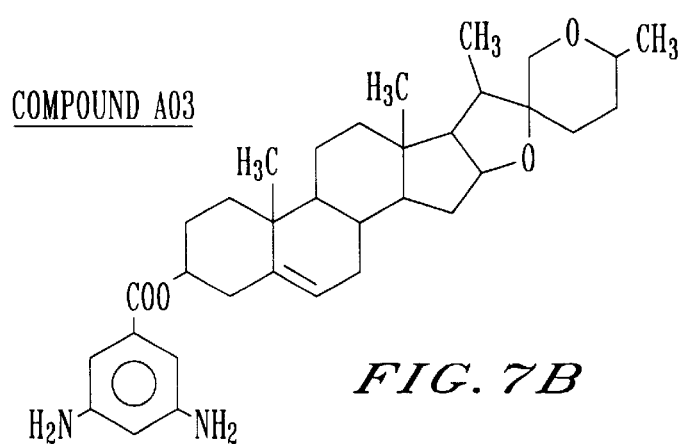
Figure 7C:
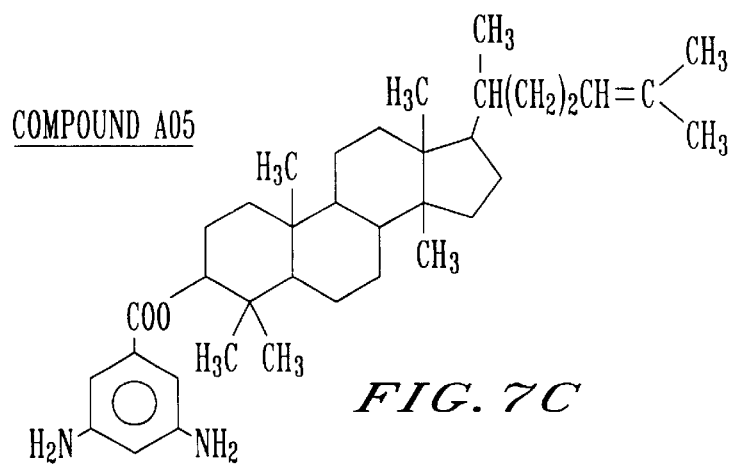
Figure 7D:
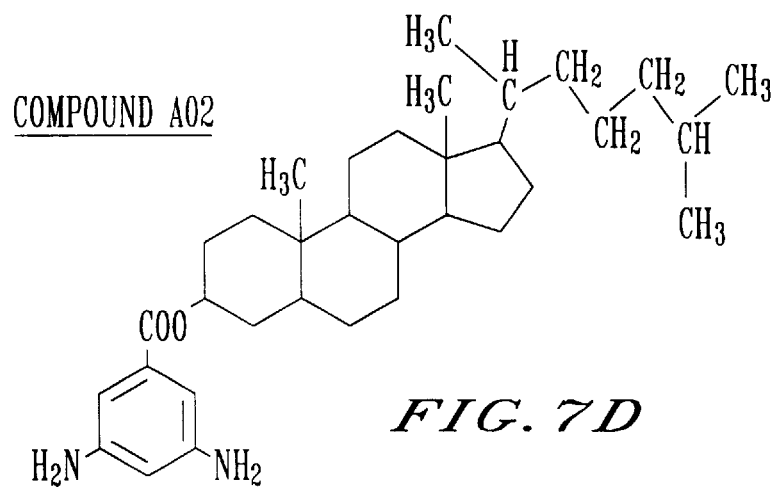
Figure 7E:
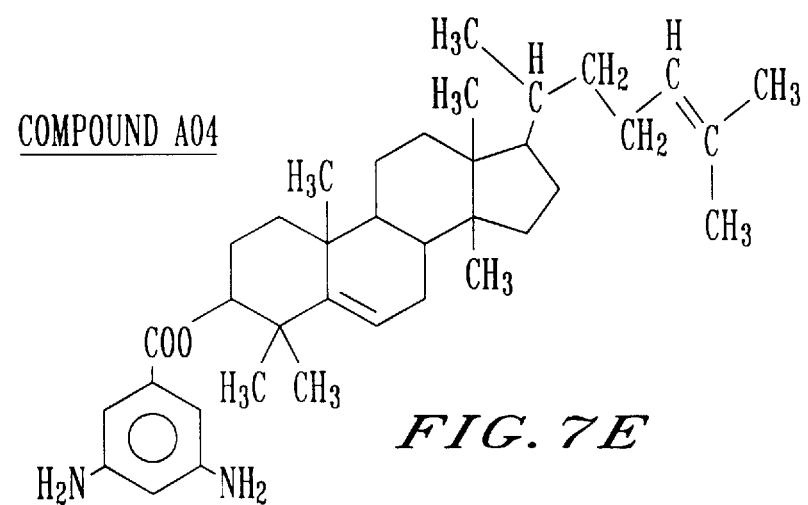
Figure 8A:
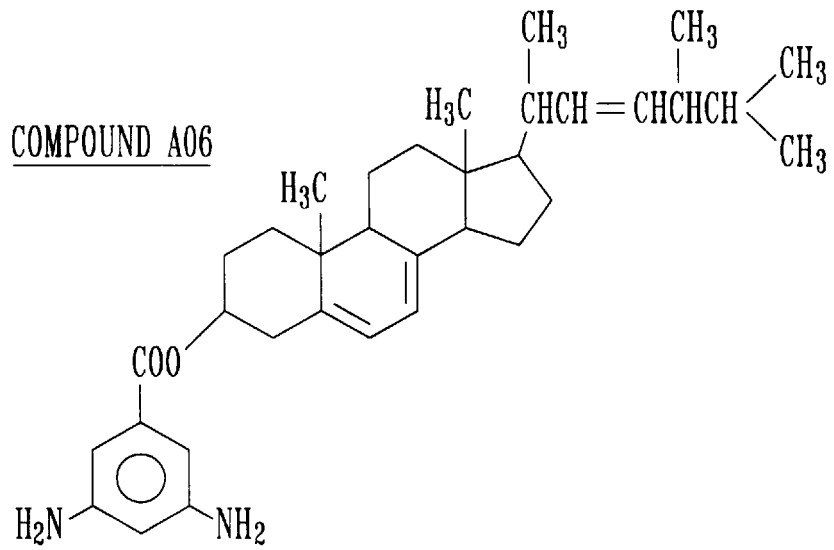
Figure 8B:
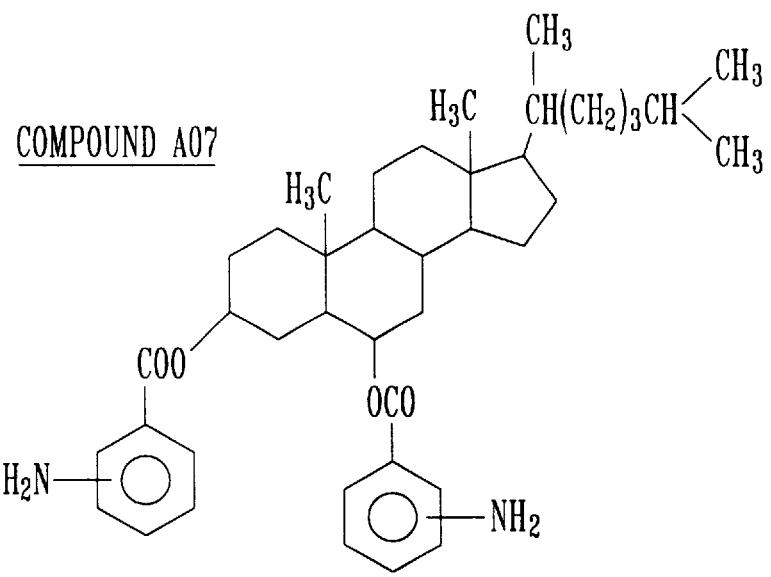
Figure 8C:
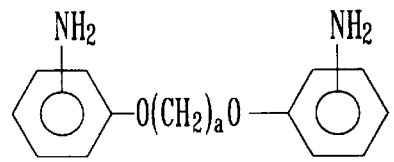
Figure 8D:
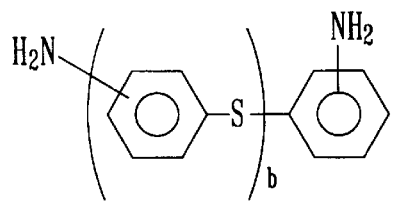
Figure 8E:
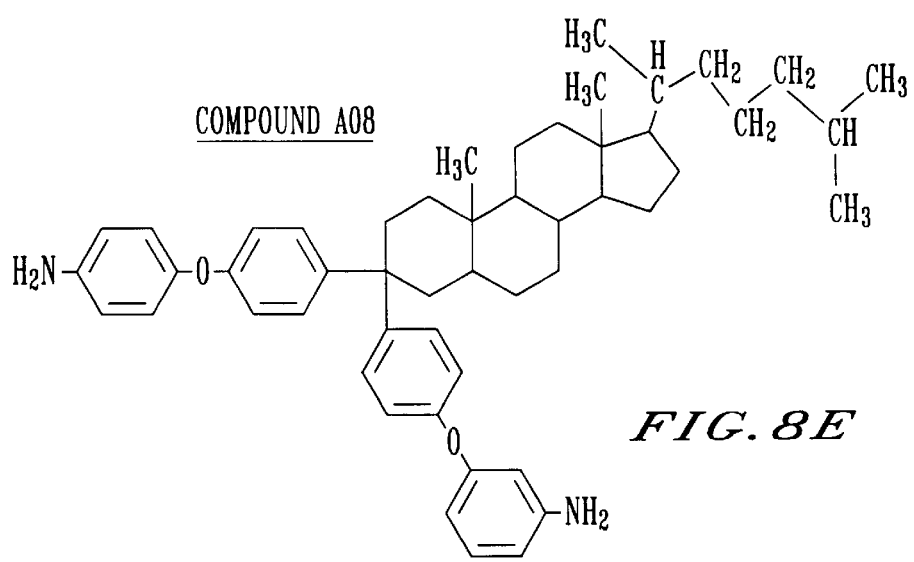
Figure 9A:
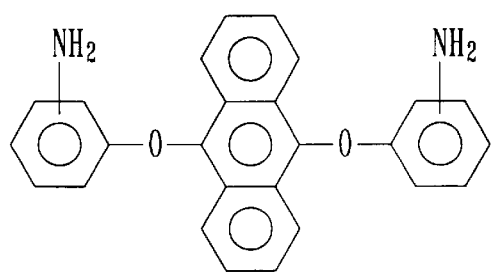
Figure 9B:
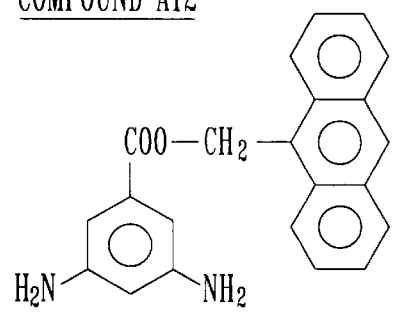
Figure 9C:
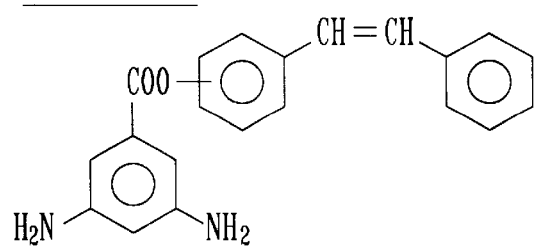
Figure 9D:
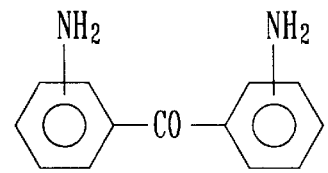

Examples of diamine compounds useful herein include:
aromatic diamine compounds such as
p-phenylenediamine; m-phenylenediamine;
4,4'-diaminodiphenylmethane;
4,4'-diaminodiphenylethane;
4,4-diaminodiphenylsulfide;
4,4'-diaminodiphenylsulfone;
3,5-diamino-3'-trifluoromethylbenzanilide;
3,5-diamino-4'-trifluoromethylbenzanilide;
3,3'-dimethyl-4,4'-diaminobiphenyl;
4,4'-diaminobenzanilide;
4,4'-diaminodiphenyl ether;
1,5-diaminonaphthalene;
5-amino-1-(4'-aminophenyl)-1,3,3-trimethylindan;
6-amino-1-(4'-aminophenyl)-1,3,3-trimethylindan;
3,4'-diaminodiphenyl ether;
3,3'-diaminobenzophenone;
3,4'-diaminobenzophenone;
4,4'-diaminobenzophenone;
2,2-bis[4-(4-aminophenoxy)phenyl]propane;
2,2-bis[4-(4-aminophenoxy)phenyl]hexafluoropropane;
2,2-bis(4-aminophenyl)hexafluoropropane;
bis[4-(4-aminophenoxy)phenyl]sulfone;
1,4-bis(4-aminophenoxy)benzene;
1,3-bis(4-aminophenoxy)benzene;
1,3-bis(3-aminophenoxy)benzene;
9,9-bis(4-aminophenyl)-10-hydroanthracene;
2,7-diaminofluorene;
9,9-bis(4-aminophenyl)fluorene;
4,4'-methylene-bis(2-chloroaniline);
2,2',5,5'-tetrachloro-4,4'-diaminobiphenyl;
2,2'-dichloro-4,4'-diamino-5,5'-dimethoxybiphenyl;
3,3'-dimethoxy-4,4'-diaminobiphenyl;
4,4'-(p-phenyleneisopropylidene)bisaniline;
4,4'-(m-phenyleneisopropylidene)bisaniline;
2,2-bis[4-(4-amino-2-trifluoromethylphenoxy)phenyl]hexafluoropropane;
4,4'-diamino-2,2'-bis(trifluoromethyl)biphenyl;
4,4'-bis(4-aminophenoxy)-octafluorobiphenyl
4,4'-bis [(4-amino-2-trifluoromethyl)phenoxy]-octafluorobiphenyl;
bis(4-aminophenoxy)-2,2'-dimethylpropane;
aromatic diamine compounds having hetero atoms such as
diaminotetraphenylthiophene;
aliphatic or cyclic aliphatic diamine compounds such as
1,1-metaxylilene diamine;
1,3-propane diamine, tetramethylene diamine; pentamethylene diamine; hexamethylene diamine;
heptamethylene diamine;
octamethylene diamine;
nonamethylene diamine;
1,4-diaminocyclohexane;
isophorone diamine;
tetrahydrodicyclopentadienylene diamine;
hexahydro-4,7-methanoindanilenedimethylene diamine;
tricyclo[$6.2.1.0^{2,7}$]-undecylenedimethylene diamine;
4,4'-methylene bis(cyclohexylamine);
the diamino organosiloxanes illustrated in FIG. 6 wherein Y is a hydrocarbon group having 1 to 12 carbon atoms such as an alkyl group, for example, a methyl group, an ethyl group or a propyl group; a cycloalkyl group, for example, a cyclohexyl group; an aryl group, for example, a phenyl group. p is an integer from 1 to 3 and q is an integer from 1 to 20.

Among these, preferable compounds are
p-phenylenediamine;
4,4'-diaminodiphenylmethane;
1,5-diaminonaphthalene;
2,7-diaminofluorene;
4,4'-diaminodiphenyl ether;
4,4'-(p-phenyleneisopropylidene)bisaniline;
2,2-bis[4-(4-aminophenoxy)phenyl]hexafluoropropane;
2,2-bis(4-aminophenyl)hexafluoropropane;
2,2-bis[4-(4-amino-2-trifluoromethylphenoxy) phenyl] hexafluoropropane;
4,4'-diamino-2,2'-bis(trifluoromethyl)biphenyl;
4,4'-bis(4-aminophenoxy)-octafluorobiphenyl
4,4'-bis[4-amino-2-trifluoromethyl)phenoxy]-octafluorobiphenyl; and
3,5-diamino-4'-trifluoromethylbenzanilide.

Especially, preferable are p-phenylenediamine, 4-4'-diaminodiphenyl methane, and 4-4'-(p-phenyleneisopropylidene)bisaniline.

These diamine compounds can be used as alone or in a combination of two or more.

Examples of the above-mentioned aromatic diamine compounds that have two amino groups (—$NH_2$) bonded to an aromatic ring and have hetero atoms such as nitrogen atoms, oxygen atoms and sulfur atoms other than the nitrogen atoms of the amino groups, include the compounds A01 through A14 illustrated in FIGS. 7 through 9 but are not limited thereto. For example, the hetero atoms may be contained within the aromatic rings.

The polycondensation reaction between tetracarboxylic compounds and diamine compounds in Step 1 and/or 2 takes place normally in the range of 0° to 200° C., preferably 0° to 100° C. Any organic solvent(s) that dissolve the resulting polyamic acid can be used in this polycondensation reaction. Examples include non-proton type polar solvents such as N-methyl-2-pyrrolidone; N,N-dimethylacetamide; N,N-dimethylformamide; dimethyl sulfoxide; (γ-butyrolactone); tetramethyl urea; and hexamethyl phosphortriamide; phenol type solvents such as m-cresol, xylenol, phenol, and phenol halide. Regarding the amount of the organic solvent used, the total amount of tetracarboxylic compounds and diamine compounds should be preferably in the range of 0.1 to 30 weight % of the total weight of reaction solution.

With these organic solvents, poor solvents such as alcohols, ketones, esters, ethers, hydrocarbon halides and hydrocarbons can be used within the proportion in that the resulting polyamic acid prepolymer does not precipitate. Examples of the poor solvents include methyl alcohol, ethyl alcohol, isopropyl alcohol, cyclohexanol, ethylene glycol, propylene glycol, 1,4-butanediol, triethylene glycol, acetone, methylethylketone, methylisobutylketone, cyclohexanone, methyl acetate, ethyl acetate, butyl acetate, diethyl oxalate, diethyl malonate, diethyl ether, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, tetrahydrofuran, dichloromethane, 1,2-dichloroethane, 1,4-dichlorobutane, trichloroethane, chlorobenzene, o-dichlorobenzene, hexane, heptane, octane, benzene, toluene, and xylene.

Method B

The polyamic acid block copolymer obtained by Method A can be imidized (one or more rings can be closed by a dehydration reaction) to produce a polyimide block copolymer comprising a first polyimide block with a bonding between a nuclear atom group $R^1$ and an organic group $Q^1$ via an imide bond, and a second polyimide block with a bonding between a nuclear group 2 and an organic group $Q^2$ in the same manner. See, for example, FIG. 10. It is not necessary that all possible imidization take place.

To be more specific, imidization is implemented to dehydrate and close the ring of the polyamic acid by heating the mentioned polyamic acid or dissolving the mentioned polyamic acid into an organic solvent and heating the solution in the presence of a dehydrating agent and an imidization catalyst.

Heat imidization is implemented preferably, but not necessarily, at 60° to 250° C., preferably at 100° to 200° C. At less than 60° C., the ring closing dehydration reaction does not progress efficiently; at more than 200° C., the resulting polyimide block copolymer may have a small molecular weight.

When imidization is implemented by adding a dehydrating agent and an imidization catalyst into a solution of polyamic acid block copolymer, the dehydrating agent can be selected from acid anhydrides such as acetic anhydride, propionic anhydride, trifluoro acetic anhydride. The amount of the dehydrating agent per mole of recurring units of the polyamic acid is preferably 1.6 to 20.

Examples of the imidization catalyst include tertiary amines such as pyridine, collidine, lutidine, triethylamine, but are not limited. The amount of the imidization catalyst per mole of the dehydrating agent is preferably 0.5 to 10 mole. Organic solvents used in imidization include those organic solvents mentioned as examples for synthesis of polyamic acid block copolymer; the reaction temperature for the ring closing dehydration reaction during imidization is preferably 0° to 200° C., preferably 60° to 150° C.

Method C

Figure 10:
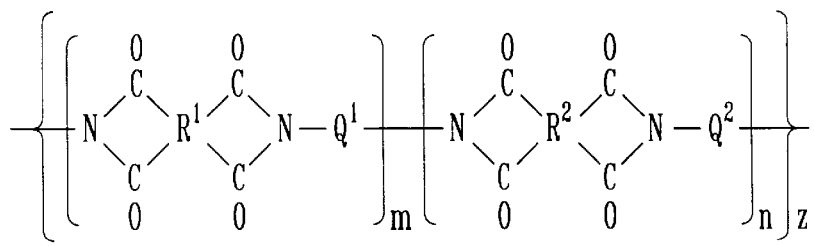
Figure 11A:
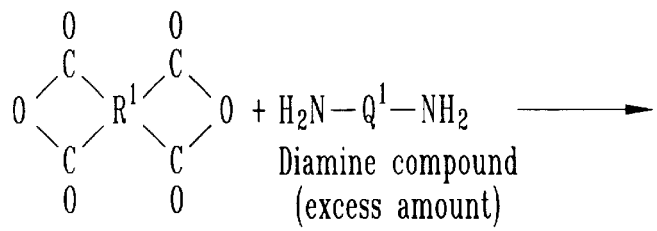
Figure 11A:
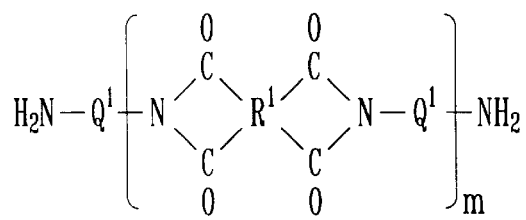
Figure 11B:
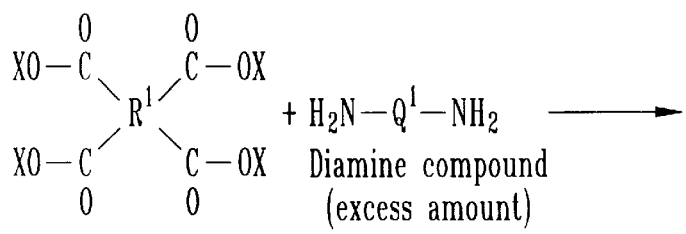
Figure 11B:
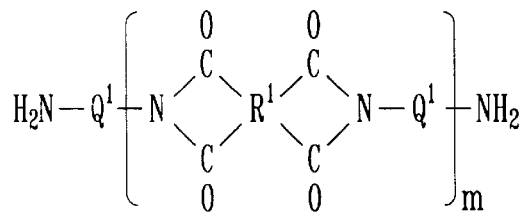
Figure 12A:
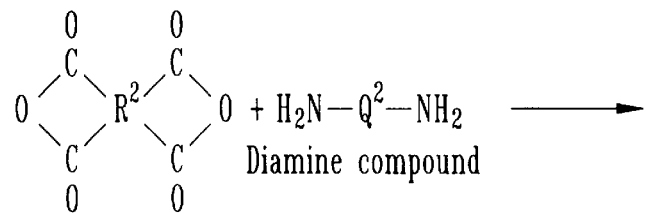
Figure 12A:
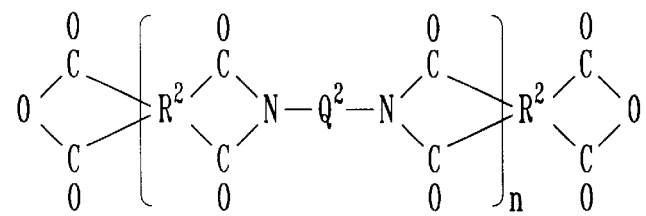
Figure 12B:
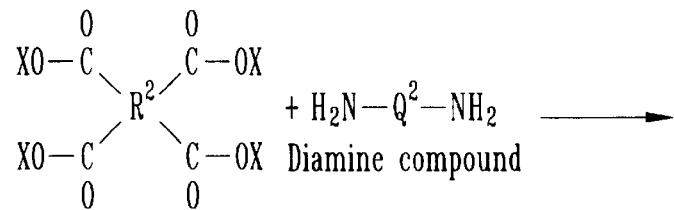
Figure 12B:
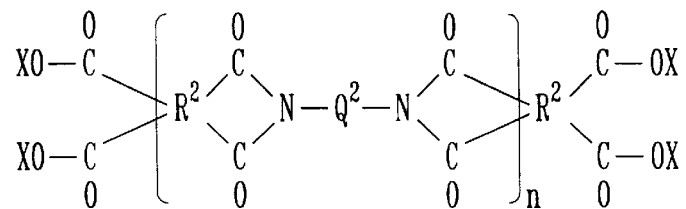
Figure 13A:
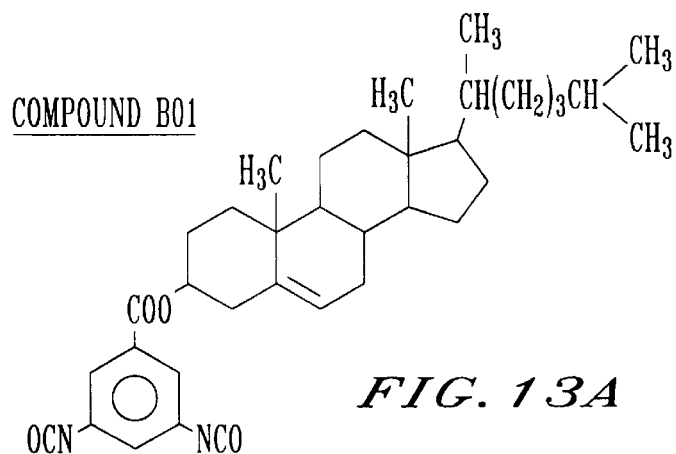
Figure 13B:
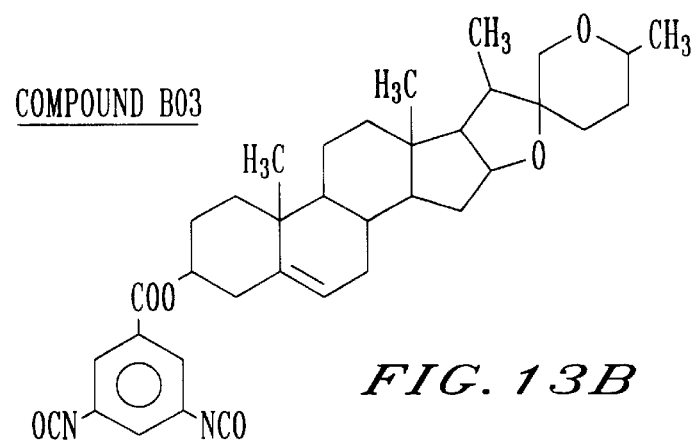
Figure 13C:
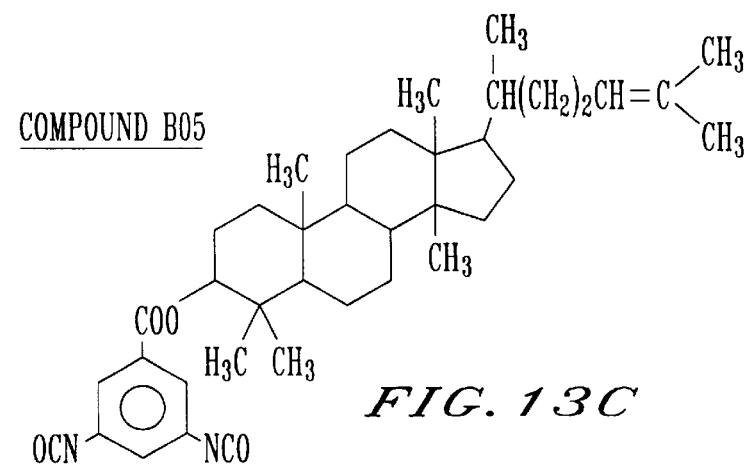
Figure 13D:
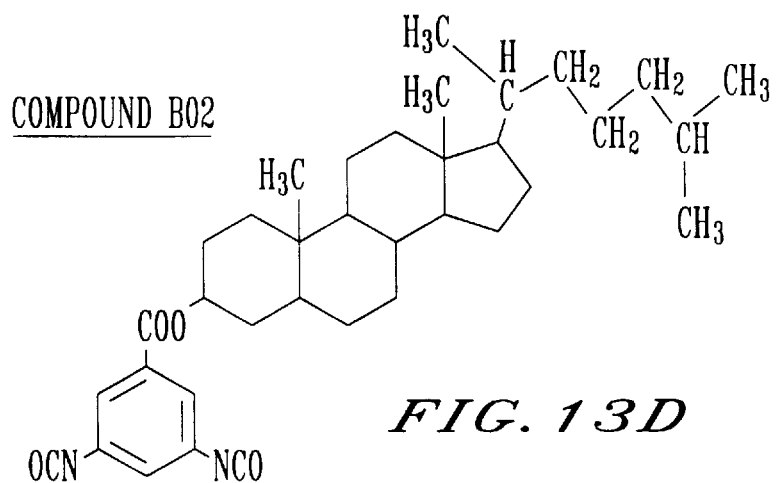
Figure 13E:
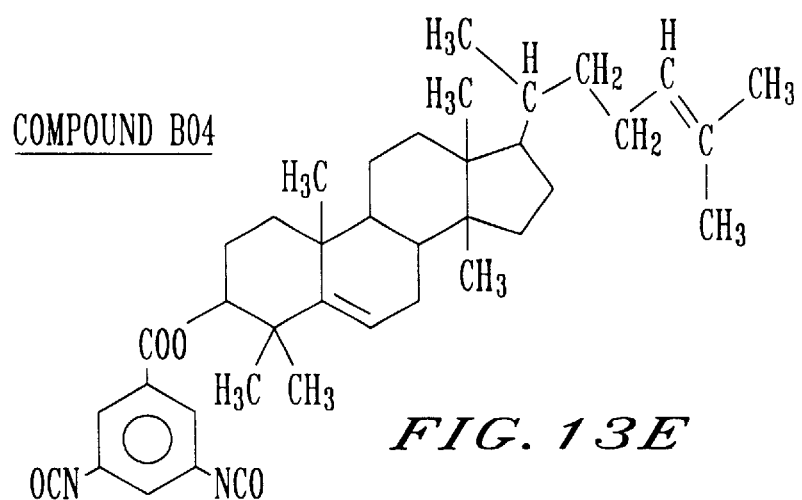
Figure 14A:
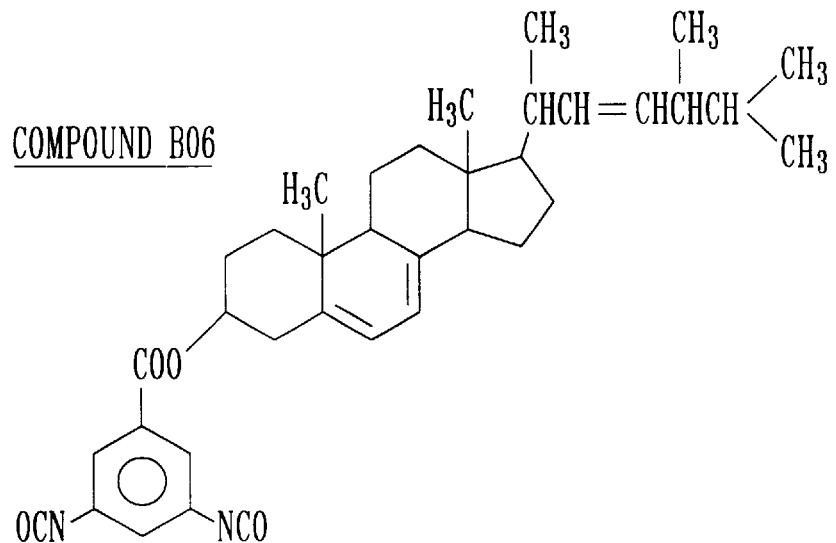
Figure 14B:
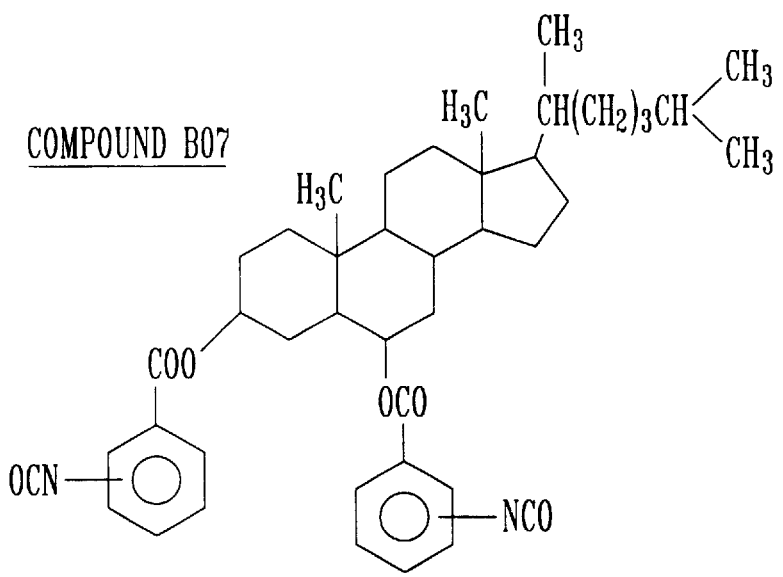
Figure 14C:
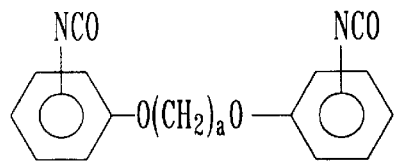
Figure 14D:
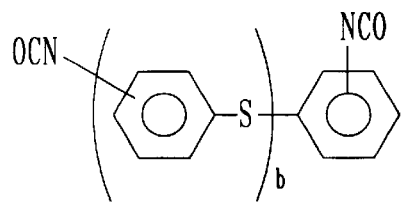
Figure 14E:
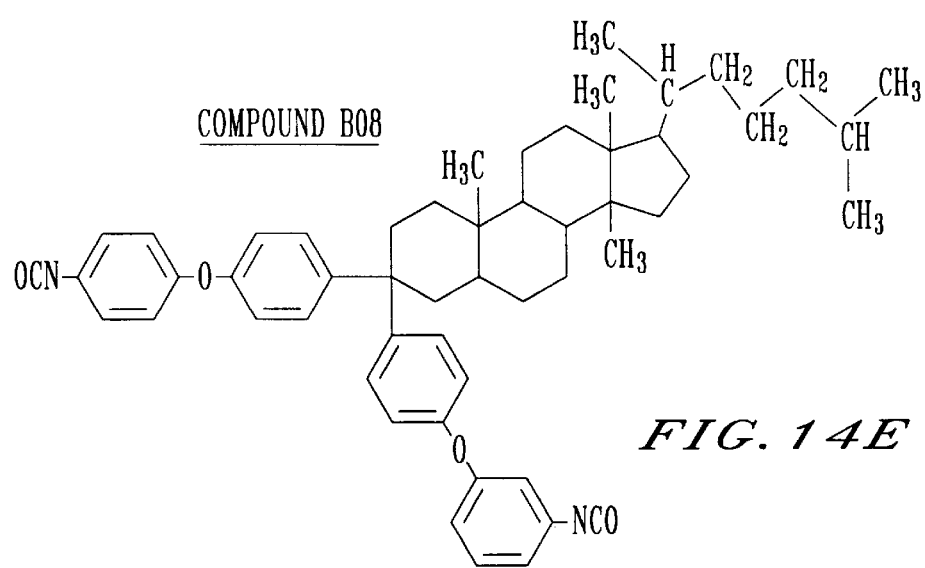
Figure 15A:
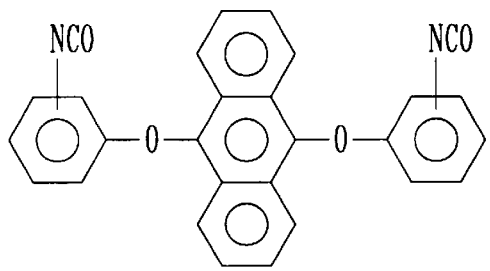
Figure 15B:
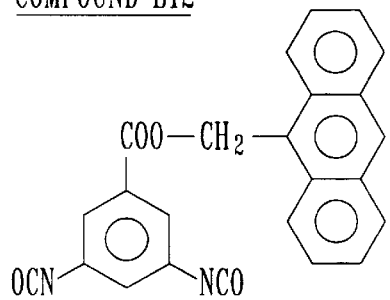
Figure 15C:
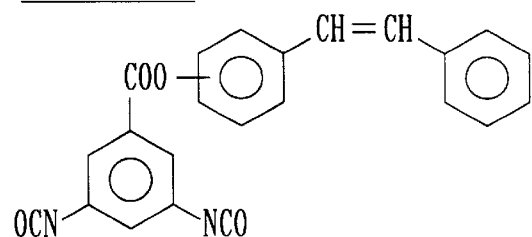
Figure 15D:
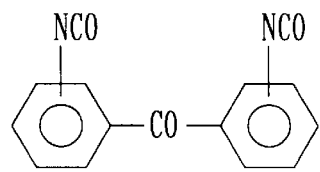

This method directly produces a polyimide block copolymer comprising, in a molecule, a first polyimide block and a second polyimide block with a different structure from the first polyimide block as illustrated in, e.g., formula 6 of FIG. 10, by the reaction between tetracarboxylic compounds and diamine compounds in the same manner as in the process of producing the polyamic acid block copolymer. There are generally three steps in this method:

Step 1

Step 1 is a step to produce a first polyimide prepolymer having amino groups at molecular ends, by the reaction between tetracarboxylic compounds and diamine compounds having two amino groups bonded to a divalent organic group $Q^1$, as illustrated in reaction 5 or 6 of FIG. 11, with the molar ratio of diamine compounds to tetracarboxylic compounds of, for example, 1.001 to 2.0.

Step 2

Step 2 is a step to produce a second polyimide prepolymer having reactive groups originating from tetracarboxylic compounds at molecular ends, by the reaction between tetracarboxylic compounds and diamine compounds having two amino groups bonded to a divalent organic group $Q^2$ as illustrated in reaction 7 or 8 of FIG. 12, with the molar ratio of tetracarboxylic compounds to diamine compounds of, for example, 1.001 to 2.0 in excess of equivalent.

To produce polyimide prepolymers in the above Steps, one or more dehydrating agent and one or more imidization catalyst required for imidization should be added to the reaction system in the presence of the same organic solvent as in Method A and be heated at an appropriate temperature, for example, 0° to 200° C., preferably 60° to 150° C., for reaction.

The first and second polyimide prepolymers may be produced by producing a first and a second polyamic acid prepolymers according to Steps 1 and 2 in Method A, and then, imidizing them respectively as in Method B.

Step 3

Step 3 is a step to produce a polyimide block copolymer by reaction between the amino groups at the ends of the first polyimide prepolymer obtained in Step 1 and the reaction groups originating from tetracarboxylic compounds at the ends of the second polyimide prepolymer obtained in Step 2; a first polyimide block has a bonding between a nuclear group $R^1$ and an organic group $Q^1$, and a second polyimide-type block has a bonding between a nuclear group $R^2$ and an organic group Q2 as illustrated in formula 6 of the FIG. 10. In order for the first and second blocks to be different the same considerations for $R^1$, $R^2$, $Q^1$ and $Q^2$ as in Method A apply here in all methods where different blocks are required.

The various conditions to obtain the polyimide block copolymer may be the same as those used to obtain the polyamic acid block copolymer. In each of Steps 1 and 2, the ring closing dehydration reaction occurs by imidization, thus eliminating the steps in Method B used to produce a polyimide block copolymer. This process need only be different from that in Method A in this sense. The condition details of this Method C, therefore, may remain the same as in Method A and Method B. It is well within the skill of the ordinary artisan to produce the various blocks and copolymers described herein.

In Steps 1 or 2, plural kinds of compounds can be used as tetracarboxylic compounds and plural kinds of compounds can be used as diamine compounds. By having one or more kinds of polyimide prepolymer produced in the same manner as in Step 1 or 2 reacted in Step 3, polyimide block copolymer comprised of three or more kinds of polyimide block can be produced.

Method D

This method employs diisocyanate compounds in place of diamine compounds in Method C. Except for the fact that the amino groups of reaction 5 of FIG. 11 and reaction 7 of FIG. 12 are replaced with isocyanate groups, the details remain the same as in Method C: polyimide block copolymer is produced in the same manner of Steps 1 through 3 of Method C.

Examples of diisocyanate compounds include:

aliphatic diisocyanate compounds such as hexamethylene diisocyanate; cyclic aliphatic diisocyanate compounds such as cyclohexane diisocyanate;

and aromatic diisocyanate compounds such as:

diphenylmethane-4,4'-diisocyanate;
diphenyl ether-4,4'-diisocyanate;
diphenylsulfone-4,4'-diisocyanate;
diphenylsulfide-4,4'-diisocyanate;
1,2-diphenylethane-p,p'-diisocyanate;
2,2-diphenylpropane-p,p'-diisocyanate;
2,2-diphenyl-1,1,1,3,3,3-hexafluoropropane-p,p'-diisocyanate;
2,2-diphenylbutane-p,p'-diisocyanate;
diphenyldichloromethane-4,4'-diisocyanate;
diphenylfluoromethane-4,4'-diisocyanate;
benzophenone-4,4'-diisocyanate;
N-phenylbenzoic amide-4,4'-diisocyanate.

Examples of aromatic diisocyanate compounds having two isocyanate groups ((NCO) bonded to the aromatic ring and having heteroatoms other than nitrogen atoms of the isocyanate groups, are illustrated as compounds B01 through B14 in FIGS. 13 to 15.

These isocyanate compounds can be used alone or in a combination of two or more.

One of the diisocyanate compounds used in Steps 1 and 2 is preferably an aromatic diisocyanate compound having two isocyanate groups ((NCO) bonded to an aromatic ring and having heteroatoms other than the nitrogen atoms of the isocyanate group, while the other diisocyanate compound is preferably an aromatic diisocyanate compound having two isocyanate groups bonded to an aromatic ring and not having heteroatoms other than the nitrogen atoms of the isocyanate group, because of the transparency of the polyimide block copolymer and because of the liquid crystal alignment properties, such as electric properties during liquid crystal driving.

For the reaction between tetracarboxylic compounds and diisocyanate compounds, catalysts are not specially required, and the reaction temperature is preferably between 50° and 200° C., more preferably between 100° and 160° C.

In Step 1 or Step 2, plural kinds of compounds can be used as tetracarboxylic compounds and plural kinds of compounds can also be used as diisocyanate compounds. By having one or more kinds of polyimide prepolymer produced in the same manner as in Step 1 or Step 2 reacted in Step 3, or in the same manner as in the Step 3, polyimide block copolymer comprised of three or more kinds of polyimide blocks can be produced.

Method E

This method is comprised of the following steps: a step to obtain a polyimide prepolymer having carboxylic anhydride groups or isocyanate groups at its ends in the same manner as mentioned in Method D above, using tetracarboxylic dianyhydrides and diisocyanate compounds; a step to obtain a polyamic acid prepolymer having amino groups or carboxylic anhydrides groups at its ends in the same manner as in mentioned Method A, using tetracarboxylic dianhydrides and diamine compounds; and a step to obtain a polyimide-polyamic acid block copolymer by having the polyimide prepolymer reacted with the polyamic acid prepolymer having appropriate functional groups at their ends.

The details of the steps are the same as those mentioned in Method D or Method A. To form the copolymer the following functional groups may be reacted with one another:

(tetracarboxylic compounds-amine-containing species);
(isocyanate(s)-tetracarboxylic compounds); etc.

Method F

This method is comprised of the following steps: a step to obtain a polyimide prepolymer having reactive groups originating from tetracarboxylic compounds or amino groups at its ends in the same manner as in Method C above, using tetracarboxylic compounds and diamine compounds; a step to obtain a polyamic acid prepolymer having amino groups or reactive groups originating from tetracarboxylic compounds at its ends in the same manner as in Method A above by using tetracarboxylic compounds and diamine compounds; and a step to obtain a polyimide-polyamic acid block copolymer by having the polyimide prepolymer reacted with the polyamic acid prepolymer after selecting functional groups at their ends.

The details of the process are the same as described in Method C or Method A above.

As described above, Method A of this invention can produce a polyamic acid block copolymer having recurring units of a first polyamic acid prepolymer block and a second polyamic acid prepolymer block with different structure from the first polyamic acid prepolymer block. Third, fourth, fifth, etc., prepolymer blocks can also be prepared and used to make the copolymer, technically a terpolymer, etc.

Then, by imidizing the polyamic acid block copolymer obtained in Method A, according to Method B of this invention, a polyimide block copolymer can be produced.

According to Method C or D of this invention, a polyimide block copolymer can be produced directly.

According to Method E or F of this invention a polyimide-polyamic acid block copolymer can be produced.

The polyimide-type block copolymer of the invention is comprised of two, three, or more kinds of block components of different structures and may be made by those of ordinary skill upon appreciation of the overall molecular architecture by art accepted synthetic methods. As a result, it has the inherent properties of a polyamic acid or a polyimide and, at the same time, has plural kinds of homopolymer properties of polyamic acid or polyimide related to each block component. In other words, coexistence of block components in a molecule, those being the first and second (or more)

polyimide components, provides the properties of the homopolymer of the first polyimide block components and the properties of the homopolymer of the second polyimide block components at the same time. It can also be said that the properties of the invention polyimide-type block copolymer is the status in which homopolymer properties of polyimide constituting certain block components are modified by the homopolymer properties of polyimide constituting the other blocks. This is true for all the materials of the invention, whether the blocks are all polyimides, polyamic acids or a mixture thereof since each material contains at least two different blocks. Blocks are different when they are not exactly the same. Preferably different blocks have at least 5 mol % including 10 mol %, 20 mol %, etc. monomer units which are different from each other: e.g., $R^1$ vs. $R^2$ and/or $Q^1$ vs. $Q^2$. In all the materials of the invention each block or prepolymer can be made from a single monomer unit or two or more different monomer units. Preferred logarithmic viscosities of the invention polyimide-type copolymers measured as described below range from 0.05–5.0 dl/g, preferably 0.05–2.0 dl/g but are not limited to these values. In an invention copolymer the ratio of first block or prepolymer to second block or prepolymer can vary and is not limited. Ratios of 98:2–2:98 are preferred, ratios of 95:5–5:95 are more preferred.

Such properties can be obtained neither from a mere mixture of, e.g., the first polyimide and the second polyimide nor from, for example, a polycondensation reaction of all tetracarboxylic compounds, diamine compounds or diisocyanates used for the first polyimide and the second polyimide.

That is, the process for producing a polyimide-type block copolymer of this invention produces a polyimide block copolymer with excellent plural properties coexistently which are difficult to obtain at the same time by conventional methods.

In both above and below, when organic groups $R^1$, $R^2$, $Q^1$, or $Q^2$ exist in plural in the formulas of polyimide-block copolymer, they have the same structure as each other.

As described above, the properties of a polyimide-type block copolymer depends on the structures of recurring units in each block element of the polyimide-type block copolymer and the number of recurring units or its recurring ratio. Therefore, by controlling these factors, it is possible to control the properties of a polyimide-type block copolymer which is finally obtained. Since each polycondensation reaction by the method of this invention is performed in a simple way, the conditions can be controlled very easily.

That is, the properties of a polyimide-type block copolymer which is finally obtained can be controlled by selecting the kinds and by adjusting its quantity or ratio used from such compounds as tetracarboxylic compounds, diamine compounds or diisocyanate compounds, so that the number, kind and ratio of the block components that constitute polyimide-type block copolymer, kinds of compounds and the (ratio) quantity can be controlled.

As a result, polyimide-type block copolymers having desired properties can be produced by molecular design in accordance with actual applications, based on known properties of polyimide homopolymer.

Also, the polyimide-type block copolymers of the invention may be of an end-modified type in which a monoanhydride or monoamine compound and the like is bonded to its ends to control its molecular weight. Such an end-modified type can be synthesized by adding a monoanhydride or monoamine compound and the like to the reaction system when the polyamic acid or polyimide is synthesized.

Examples of monoanhydrides are maleic anhydride, phthalic acid anhydride, or Nadic anhydride; examples of monoamine compounds are aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine.

The polyimide-type block copolymer can be of the end-modified type obtained by adding the polyamic acid compound or an imide compound, having a monoanhydride or monoamine compound at its end to the reaction system.

Thin Layer Forming Agent

The thin layer forming agent of this invention is a liquid obtained by dissolving the polyamic acid block copolymers, polyimide block copolymers, or polyimide-polyamic acid block copolymers of the invention into one or a mixture of appropriate organic solvents.

By being comprised of polyimide-type block copolymers, this thin layer forming agent can be used to form a thin layer for various purposes, for example, an electrical insulator, a heat-resistant coating, a surface protection coating, and others. The agent is especially useful as a liquid crystal alignment layer forming agent.

The organic solvents which may be used for the thin layer forming agent are not limited and various kinds can be used if it dissolves the block copolymer type polyamic acid, the polyimide block copolymer, or the polyimide-polyamic acid block copolymer. Examples are mentioned as reaction solvents used in above Method A.

To the thin layer forming agent, various additives can be added in accordance with its intended usage. Especially, a thin layer forming agent used as a liquid crystal alignment layer forming agent may contain various additives to improve properties of its own and that of the liquid crystal layer formed from it.

Such additives can contain functional silane-containing compounds, for example, to improve the adhesiveness of the layer to a substrate surface of, e.g., a liquid crystal display element. Examples of functional silane-containing compounds are:

3-aminopropyltrimethoxysilane; 3-aminopropyltriethoxysilane;

2-aminopropyltrimethoxysilane; 2-aminopropyltriethoxysilane;

N-(2-aminoethyl)-3-aminopropyltrimethoxysilane;

N-(2-aminoethyl)-3-aminopropylmethyldimethoxysilane;

3-ureidopropyltrimethoxysilane; 3-ureidopropyltriethoxysilane;

N-ethoxycarbonyl-3-aminopropyltrimethoxysilane;

N-ethoxycarbonyl-3-aminopropyltriethoxysilane;

N-triethoxysilylpropyltriethylenetriamine;

N-trimethoxysilylpropyltriethylenetriamine;

10-trimethoxysilyl-1,4,7-triazadecane;

10-triethoxysilyl-1,4,7-triazadecane;

9-trimethoxysilyl-3,6-diazanonyl acetate;

9-triethoxysilyl-3,6-diazanonyl acetate;

N-benzyl-3-aminopropyltrimethoxysilane;

N-benzyl-3-aminopropyltriethoxysilane;

N-phenyl-3-aminopropyltrimethoxysilane;

N-phenyl-3-aminopropyltriethoxysilane;

N-bis(oxyethylene)-3-aminopropyltrimethoxysilane; and N-bis(oxyethylene)-3-aminopropyltriethoxysilane.

Thin Layer Formation

In order to form a thin layer according to the invention using the invention thin layer forming agent, the thin layer forming agent is normally applied on the surface of a substrate and dried, and further heated, if necessary, for ring closing dehydration reaction when there are polyamic acid blocks desired to be closed. When using this layer forming agent as a liquid crystal alignment layer forming agent, a liquid crystal alignment layer is formed and a liquid crystal display element is produced by, for example, the following process:

(1) The thin layer forming agent is applied on a surface of a liquid crystal display element substrate, on which a transparent conductive layer is prepared, and heat is applied to the surface of the substrate to form a thin layer.

Examples of substrates include glasses such as float glass and soda glass; a transparent substrate comprised of plastic such as polyethyleneterephtalate, polybutylene terephthalate, polyether sulfone, and polycarbonate, etc. The thin layer may be rubbed, etc., to provide orientation for liquid crystal molecules.

Examples of transparent conductive layers which can be first formed on a substrate are NESA layer (U.S. PPG registered trademark) comprised of tin oxide ($SnO_2$), ITO layer comprised of indium oxide—tin oxide ($In_2O_3$—$SnO_2$), and the like. Examples of the patterning method of these transparent conductive layer, if such patterning is desired, a photo-etching method, a method preliminary using a mask and the like can be used. Other applications of the thin layer forming agent include a printing method, a roll-coater method, a spinner method, and a curtain coat method and the like.

Regarding the application of a thin layer forming agent, a functional silane compound, a functional titanium compound, and the like may be preliminary applied on a substrate or on a transparent conductive layer to improve the adhesiveness of the applied layer to the substrate surface or the transparent conductive layer. The temperature during heating of the applied surface or ring closing dehydration reaction of polyamic acid block is typically in the range of 80° to 200° C., preferably 120° to 200° C. A dried layer thickness of the applied layer is usually in the range of 0.001 to 1 $\mu$m, preferably 0.005 to 0.5 $\mu$m.

As mentioned above, the thin layer may be aligned. Examples of the alignment treatment of thin layers are methods of rubbing, irradiating with ultraviolet light, and the like. A method of rubbing is to rub a thin layer in a certain direction with a roll wound with, for example, nylon, rayon, cotton cloths, and the like. By the alignment treatment, the thin layer molecules are given alignability of liquid crystal molecules to form a liquid crystal alignment layer.

Before or after an aligning treatment, one may perform an alignment altering treatment by irradiating, for example, with ultraviolet light in the range of 1 to 1000 mJ/cm2, preferably 200 to 3000 mJ/cm2 preferably on a selected partial area of the formed thin layer.

A liquid crystal cell can be obtained as follows: two substrates on which liquid crystal alignment layers were formed in the above manner are prepared. The substrates are put together so that the rubbing directions of each liquid crystal alignment layer are in the position to be orthogonal, parallel or reversed parallel to the rubbing direction of the opposite side via a cell gap. The peripherals are sealed with a sealing agent. Liquid crystals are injected into the cell gap that is spaced between the substrate surfaces and sealing agent. Then, the inlet is sealed to constitute a liquid crystal cell. Polarizers are attached, in accordance with or orthogonal to the rubbing direction of the liquid crystal alignment layer. Polarizers are attached on one substrate on the outer surfaces of a liquid crystal cell, that is, on the other surface side of each substrate that constitutes the liquid crystal cell, to obtain the liquid crystal display element.

Examples of the sealing agents include epoxy resin containing a curing agent and aluminum oxide particles as a spacer and the like.

Examples of liquid crystal materials include nematic type liquid crystals and smectic type liquid crystals. Of these, nematic type liquid crystals are preferable. Examples of nematic type liquid crystals are Schiff base type liquid crystal, azoxy type liquid crystal, biphenyl liquid type crystal, phenylcyclohexane type liquid crystal, ester type liquid crystal, terphenyl type liquid crystal, biphenylcylohexane type liquid crystal, pyrimidine type liquid crystal, dioxane type liquid crystal, bicyclooctane type liquid crystal and cubane type liquid crystal and the like. Further, ferro-electric type liquid crystals such as p-decyloxybenzylidene-p-amino-2-methylbutyl cinnamate can be used.

Cholesteric type liquid crystals such as cholesteryl chloride, cholesteryl nonaate, and cholesteryl carbonate or chiral agents, for example, with product names "C-15," "CB-15" (Merck Product) can be added to these liquid crystals.

Examples of polarizers attached on the outer surface of liquid crystal cell include the polarizer of which the polarizing layer is comprised of so-called "H-layer", which iodine is absorbed while polyvinyl alcohol is stretch-aligned and is sandwiched between acetyl cellulose protective layers, or the polarizer of which the polarizing layer consists of "H-layer" only and the like.

A liquid crystal alignment layer of this invention is preferably comprised of the polyimide block copolymer having the composition of formula 6 of the FIG. 10. As described above, the polyimide block copolymer provides excellent plural properties which are difficult to obtain at the same time by conventional methods.

For example, it will be apparent from the examples described later that a certain kind of polyimide obtained by conventional methods provides excellent applicability, but the alignment properties of its liquid crystal alignment layer are not stable, being dependent on the rubbing times or layer thickness; on the other hand another kind of polyimide obtained by conventional methods has poor applicability, but the liquid crystal alignment properties of its liquid crystal alignment layer are stable and independent from the rubbing times or layer thickness to obtain a large pretilt angle.

Therefore, a liquid crystal alignment layer forming agent comprised of polyimide block copolymer, having the above polyimides, as block components in a molecule, can provide excellent applicability and a resulting liquid crystal alignment layer which is stable in liquid crystal alignment properties, being independent from the rubbing times or layer thickness to obtain a large pretilt angle.

The properties of a high irradiation sensitivity and a high adhesive retention to substrate cannot be obtained together by conventional methods from polyimide homopolymer; the invention polyimide-type block copolymer provides both properties at the same time, as a result, it is possible to perform highly efficient alignment correction or alignment altering on the liquid crystal alignment layer.

Specifically, this alignment correction or altering, implemented by irradiating, for example, ultraviolet light on a selected partial region of a thin layer of a liquid crystal alignment layer before or after alignment treatment such as rubbing, can be performed highly efficiently. Usually, the adhesiveness of prior art liquid crystal alignment layers to the substrate is lost by ultraviolet irradiation and the like, but in this invention, excellent adhesiveness can be sustained. And, the liquid crystal alignment layer is not damaged during rubbing. Therefore, the invention liquid crystal alignment layer provides easy control of regional pretilt angle and also provides a highly efficient production of a liquid crystal display element having good contrast nearly independent of viewing angle.

Various applications of a thin layer comprised of a polyimide block copolymer of this invention include thin layers used as an electrical insulator, a heat-resistant coating thin layer, a surface protection coating thin layer, and other thin layers. Especially, it is useful as a liquid crystal alignment layer forming agent; the resultant liquid crystal alignment layer comprised of a polyimide-type block copolymer of the invention is especially suitable for producing liquid crystal alignment layers for STN (Supertwist Nematic) type display elements or for TN type display elements.

A liquid crystal display element with a liquid crystal alignment layer formed from the thin layer forming agent of this invention is also suitable for a ferroelectric liquid crystal display element with the appropriate liquid crystal material filling between substrates.

Further, a liquid crystal display element formed from the thin layer forming agent of this invention is excellent in liquid crystal alignability and reliability and can be used effectively for various devices: especially, suitable for display devices such as a calculator, watch, clock, digital board, word processor, personal computer, and liquid crystal television.

EXAMPLES

Examples of this invention will be explained in detail below, but do not limit this invention.

In the examples below, a pretilt angle of a liquid crystal display element was measured by a crystal rotation method using He—Ne laser beam, according to the method described in T. J. Schffer, et al., Journal of Applied Physics., vol. 19, 2013 (1980).

Regarding the applicability of a thin layer forming agent, a thin layer thickness was measured by "Alpha Step" (U.S. TENCOR INSTRUMENTS CO. Product), the pin-contact type thickness measurement tool and an average thickness and its variation were measured.

Adhesiveness of a liquid crystal alignment layer to a substrate was evaluated by the occurrence of peeling after a rubbing treatment on a thin layer formed on a ITO layer.

The value of logarithmic viscosity $\eta_{ln}$ of each polymer was calculated by measuring the viscosity of a polymer solution of 0.5 g/100 ml in N-methyl-2-pyrrolidone at 30° C. and by plugging the values into formula 1:

$$\eta_{ln} = \ln \frac{(\text{solution flow time/solvent flow time})}{(\text{polymer weight concentration})}$$

Process Example 1

Step 1
Preparation of a first polyamic acid prepolymer:
29.37 g (131.0 mmol) of 2,3,5-tricarboxycyclopentylacetic dianhydride and 14.55 g (134.5 mmol) of p-phenylenediamine were dissolved in 395.28 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.10 dl/g.

Step 2
Preparation of a second polyamic acid prepolymer:
2.39 g (10.7 mmol) of 2,3,5-tricarboxycyclopentylacetic dianhydride and 3.69 g (7.1 mmol) of a diamine compound, which was indicated as compound A01 in FIG. 7, were dissolved in 54.72 g of N-methyl-2-pyrrolidone and reacted with stirring for 2 hours at room temperature to obtain a solution of a second polyamic acid prepolymer having carboxylic anhydride groups at its ends. The logarithmic viscosity of the second polyamic acid prepolymer was 0.05 dl/g.

Step 3
Preparation of a block copolymer type polyamic acid:
The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.10 dl/g.

Step 4
Imidization:
20.00 g of block copolymer type polyamic acid which was obtained in step 3 was dissolved in 380 g of N-methyl-2-pyrrolidone; further, 8.95 g of pyridine and 11.57 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure; then a polyimide block copolymer with 1.10 dl/g of logarithmic viscosity was obtained. This is designated as "Polymer 1".

Process Example 2

Step 1
Preparation of a first polyamic acid prepolymer:
28.87 g (128.8 mmol) of 2,3,5-tricarboxycyclopentylacetic dianhydride and 14.31 g (132.3 mmol) of p-phenylenediamine were dissolved in 388.62 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.10 dl/g.

Step 2
Preparation of a second polyamic acid prepolymer:
2.35 g (10.5 mmol) of 2,3,5-tricarboxycyclopentylacetic dianhydride and 4.48 g (7.0 mmol) of a diamine compound, which was indicated as compound A07 in FIG. 8 wherein the amino group in the benzene nucleus is in the para-position, were dissolved in 61.47 g of N-methyl-2-pyrrolidone and reacted with stirring for 2 hours at room temperature to obtain a solution of a second polyamic acid prepolymer having carboxylic anhydride groups at its ends. The logarithmic viscosity of the second polyamic acid prepolymer was 0.05 dl/g.

Step 3
Preparation of a block copolymer type polyamic acid:

The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.08 dl/g.

Step 4
Imidization:

20.00 g of block copolymer type polyamic acid which was obtained in step 3 was dissolved in 380 g of N-methyl-2-pyrrolidone; further, 8.81 g of pyridine and 11.37 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure; then a polyimide block copolymer with 1.08 dl/g of logarithmic viscosity was obtained. This is designated as "Polymer 2".

Process Example 3

Step 1
Preparation of a first polyamic acid prepolymer 17.57 g (78.4 mmol) of 2,3,5-tricarboxycyclopentylacetic dianhydride and 10.18 g (94.1 mmol) of p-phenylenediamine were dissolved in 249.75 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.20 dl/g.

Step 2
Preparation of a second polyamic acid prepolymer:

10.56 g (47.1 mmol) of 2,3,5-tricarboxycyclopentylacetic dianhydride and 11.69 g (31.4 mmol) of a diamine compound, which was indicated as compound A09 in FIG. 8 wherein the recurring number "a" of methylene groups was 12 and the amino group in the benzene nucleus is in the para-position, were dissolved in 200.25 g of N-methyl-2-pyrrolidone and reacted with stirring for 2 hours at room temperature to obtain a solution of a second polyamic acid prepolymer having carboxylic anhydride groups at its ends. The logarithmic viscosity of the second polyamic acid prepolymer was 0.05 dl/g.

Step 3
Preparation of a block copolymer type polyamic acid:

The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.50 dl/g.

Step 4
Imidization:

20.00 g of block copolymer type polyamic acid which was obtained in step 3 was dissolved in 380 g of N-methyl-2-pyrrolidone; further, 7.94 g of pyridine and 10.25 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure; then a polyimide block copolymer with 1.66 dl/g of logarithmic viscosity was obtained. This is designated as "Polymer 3".

Process Example 4

Step 1
Preparation of a first polyamic acid prepolymer:

18.47 g (82.4 mmol) of 2,3,5-tricarboxycyclopentylacetic dianhydride and 10.70 g (98.9 mmol) of p-phenylenediamine were dissolved in 262.53 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.30 dl/g.

Step 2
Preparation of a second polyamic acid prepolymer:

11.10 g (49.5 mmol) of 2,3,5-tricarboxycyclopentylacetic dianhydride and 9.74 g (33.0 mmol) of 3,5-diamino-4'-trifluoromethylbenzanilide were dissolved in 187.56 g of N-methyl-2-pyrrolidone and reacted with stirring for 2 hours at room temperature to obtain a solution of a second polyamic acid prepolymer having carboxylic anhydride groups at its ends. The logarithmic viscosity of the second polyamic acid prepolymer was 0.03 dl/g.

Step 3
Preparation of a block copolymer type polyamic acid:

The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having 1.20 dl/g of logarithmic viscosity.

Step 4
Imidization:

20.00 g of block copolymer type polyamic acid which was obtained in step 3 was dissolved in 380 g of N-methyl-2-pyrrolidone; further, 8.35 g of pyridine and 10.77 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure; then a polyimide block copolymer with 1.28 dl/g of logarithmic viscosity was obtained. This is designated as "Polymer 4".

Process Example 5

Step 1
Preparation of a first polyamic acid prepolymer:

23.64 g (105.5 mmol) of 2,3,5-tricarboxycyclopentylacetic dianhydride and 21.47 g (108.3 mmol) of diaminodiphenylmethane were dissolved in 405.99 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.10 dl/g.

Step 2
Preparation of a second polyamic acid prepolymer:

1.92 g (8.6 mmol) of 2,3,5-tricarboxycyclopentylacetic dianhydride and 2.97 g (5.7 mmol) of a diamine compound, which was indicated as compound A01 in FIG. 7, were dissolved in 44.01 g of N-methyl-2-pyrrolidone and reacted with stirring for 2 hours at room temperature to obtain a solution of a second polyamic acid prepolymer having carboxylic anhydride groups at its ends. The logarithmic viscosity of the second polyamic acid prepolymer was 0.04 dl/g.

Step 3
Preparation of a block copolymer type polyamic acid:

The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.10 dl/g.

Step 4
Imidization:

20.00 g of block copolymer type polyamic acid which was obtained in step 3 was dissolved in 380 g of N-methyl-2-pyrrolidone; further, 7.22 g of pyridine and 9.31 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure; then a polyimide block copolymer with 1.20 dl/g of logarithmic viscosity was obtained. This is designated as "Polymer 5".

Process Example 6

Step 1
Preparation of a first polyamic acid prepolymer:

29.28 g (130.6 mmol) of 2,3,5-tricarboxycyclopentylacetic dianhydride and 13.76 g (127.2 mmol) of p-phenylenediamine were dissolved in 387.36 g of N-methyl-2-pyrrolidone and reacted with stirring for 2 hours at room temperature to obtain a solution of a first polyamic acid prepolymer having carboxylic anhydride groups at its ends. The logarithmic viscosity of the first polyamic acid prepolymer was 0.10 dl/g.

Step 2
Preparation of a second polyamic acid prepolymer:

1.54 g (6.9 mmol) of 2,3,5-tricarboxycyclopentylacetic dianhydride and 5.41 g (10.4 mmol) of a diamine compound, which was indicated as compound A01 in FIG. 7, were dissolved in 121.32 g of N-methyl-2-pyrrolidone and reacted with stirring for 2 hours at room temperature to obtain a solution of a second polyamic acid prepolymer having amino groups at its ends. The logarithmic viscosity of the second polyamic acid prepolymer was 0.04 dl/g.

Step 3
Preparation of a block copolymer type polyamic acid:

The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.22 dl/g.

Step 4
Imidization 20.00 g of block copolymer type polyamic acid which was obtained in step 3 was dissolved in 380 g of N-methyl-2-pyrrolidone; further, 8.70 g of pyridine and 11.23 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure; then a polyimide block copolymer with 1.30 dl/g of logarithmic viscosity was obtained. This is designated as "Polymer 6".

Process Example 7

Step 1
Preparation of a first polyamic acid prepolymer:

17.45 g (58.1 mmol) of 1,3,3a,4,5,9b-hexahydro-5 (tetrahydro-2,5-dioxo-3-furanyl)naphtho[1,2-c]furan-1,3-dione, 6.63 g (61.3 mmol) of p-phenylenediamine, and 1.68 g (3.2 mmol) of a diamine compound, which was indicated as compound A01 in FIG. 7, were dissolved in 231.84 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.10 dl/g.

Step 2
Preparation of a second polyamic acid prepolymer:

15.92 g (71.0 mmol) of 2,3,5-tricarboxycyclopentylacetic dianhydride, 6.63 g (61.3 mmol) of p-phenylenediamine, and 1.68 g (3.2 mmol) of a diamine compound, which was indicated as compound A01 in FIG. 7, were dissolved in 218.07 g of N-methyl-2-pyrrolidone and reacted with stirring for 2 hours at room temperature to obtain a solution of a second polyamic acid prepolymer having carboxylic anhydride groups at its ends. The logarithmic viscosity of the second polyamic acid prepolymer was 0.05 dl/g.

Step 3
Preparation of a block copolymer type polyamic acid:

The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.08 dl/g.

Step 4
Imidization:

20.00 g of block copolymer type polyamic acid which was obtained in step 3 was dissolved in 380 g of N-methyl-2-pyrrolidone; further, 8.09 g of pyridine and 10.44 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure; then a polyimide block copolymer with 1.10 dl/g of logarithmic viscosity was obtained. This is designated as "Polymer 7".

Process Example 8

Step 1
Preparation of a first polyamic acid prepolymer:
 29.08 g (133.3 mmol) of pyromellitic acid dianhydride and 14.81 g (137.0 mmol) of p-phenylenediamine were dissolved in 395.01 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.10 dl/g.

Step 2
Preparation of a second polyamic acid prepolymer:
 2.36 g (10.8 mmol) of pyromellitic acid dianhydride and 3.75 g (7.2 mmol) of a diamine compound, which was indicated as compound A01 in FIG. 7, were dissolved in 54.99 g of N-methyl-2-pyrrolidone and reacted with stirring for 2 hours at room temperature to obtain a solution of a second polyamic acid prepolymer having carboxylic anhydride groups at its ends. The logarithmic viscosity of the second polyamic acid prepolymer was 0.05 dl/g.

Step 3
Preparation of a block copolymer type polyamic acid:
 The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.55 dl/g. This is designated as "Polymer 8".

Process Example 9

Step 1
Preparation of a first polyamic acid prepolymer:
 28.63 g (127.7 mmol) of 2,3,5-tricarboxycyclopentylacetic dianhydride and 14.58 g (134.8 mmol) of p-phenylenediamine were dissolved in 388.89 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.10 dl/g.

Step 2
Preparation of a second polyamic acid prepolymer:
 3.10 g (14.2 mmol) of pyromellitic acid dianhydride and 3.70 g (7.1 mmol) of a diamine compound, which was indicated as compound A01 in FIG. 7, were dissolved in 61.20 g of N-methyl-2-pyrrolidone and reacted with stirring for 2 hours at room temperature to obtain a solution of a second polyamic acid prepolymer having carboxylic anhydride groups at its ends. The logarithmic viscosity of the second polyamic acid prepolymer was 0.05 dl/g.

Step 3
Preparation of a block copolymer type polyamic acid:
 The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.30 dl/g. This is designated as "Polymer 9".

Process Example 10

Step 1
Preparation of a first polyamic acid prepolymer:
 5.19 g (23.8 mmol) of pyromellitic acid dianhydride and 5.90 g (29.8 mmol) of 4,4'-diaminodiphenylmethane were dissolved in 99.81 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.10 dl/g.

Step 2
Preparation of a second polyamic acid prepolymer:
 8.01 g (35.7 mmol) of 2,3,5-tricarboxycyclopentylacetic dianhydride and 5.90 g (29.8 mmol) of 4,4'-diaminodiphenylmethane were dissolved in 125.19 g of N-methyl-2-pyrrolidone and reacted with stirring for 2 hours at room temperature to obtain a solution of a second polyamic acid prepolymer having carboxylic anhydride groups at its ends. The logarithmic viscosity of the second polyamic acid prepolymer was 0.05 dl/g.

Step 3
Preparation of a block copolymer type polyamic acid:
 The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.10 dl/g.

Step 4
Imidization
 25.00 g of block copolymer type polyamic acid which was obtained in step 3 was dissolved in 475 g of N-methyl-2-pyrrolidone; further, 9.42 g of pyridine and 12.15 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure; then a polyimide block copolymer with 1.10 dl/g of logarithmic viscosity was obtained. This is designated as "Polymer 10".

Process Example 11

Step 1
Preparation of a first polyamic acid prepolymer:
 5.35 g (23.9 mmol) of 2,3,5-tricarboxycyclopentylacetic dianhydride and 5.92 g (29.9 mmol) of 4,4'-diaminodiphenylmethane were dissolved in 101.43 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.05 dl/g.

Step 2
Preparation of a second polyamic acid prepolymer:
 7.81 g (35.8 mmol) of pyromellitic acid dianhydride and 5.92 g (29.9 mmol) of 4,4'-diaminodiphenylmethane were dissolved in 123.57 g of N-methyl-2-pyrrolidone and reacted with stirring for 2 hours at room temperature to obtain a solution of a second polyamic acid prepolymer having carboxylic anhydride groups at its ends. The logarithmic viscosity of the second polyamic acid prepolymer was 0.10 dl/g.

Step 3
Preparation of a block copolymer type polyamic acid:

The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.10 dl/g. This is designated as "Polymer 11".

Process Example 12

Step 1
Preparation of a first polyamic acid prepolymer:

9.77 g (44.8 mmol) of pyromellitic dianhydride and 4.27 g (37.5 mmol) of 1,4-diaminocyclohexane were dissolved in 126.36 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.12 dl/g.

Step 2
Preparation of a second polyamic acid prepolymer:

6.70 g (29.9 mmol) of 2,3,5-tricarboxycyclopentylacetic dianhydride and 4.27 g (37.5 mmol) of 1,4-diaminocyclohexane were dissolved in 98.73 g of N-methyl-2-pyrrolidone and reacted with stirring for 2 hours at room temperature to obtain a solution of a second polyamic acid prepolymer having carboxylic anhydride groups at its ends. The logarithmic viscosity of the second polyamic acid prepolymer was 0.06 dl/g.

Step 3
Preparation of a block copolymer type polyamic acid:

The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.14 dl/g.

Step 4
Imidization:

25.00 g of block copolymer type polyamic acid which was obtained in step 3 was dissolved in 475 g of N-methyl-2-pyrrolidone; further, 11.82 g of pyridine and 15.25 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure; then a polyimide block copolymer with 1.14 dl/g of logarithmic viscosity was obtained. This is designated as "Polymer 12".

Process Example 13

Step 1
Preparation of a first polyamic acid prepolymer:

7.21 g (32.2 mmol) of 2,3,5-tricarboxycyclopentylacetic dianhydride and 7.65 g (38.6 mmol) of 4,4'-diaminodiphenylmethane were dissolved in 133.74 g of N-methyl-2-pyrrolidone and reacted with stirring for 2 hours at room temperature to obtain a solution of a first polyamic acid prepolymer having amino groups at its ends. The logarithmic viscosity of the first polyamic acid prepolymer was 0.16 dl/g.

Step 2
Preparation of a second polyamic acid prepolymer:

7.21 g (32.2 mmol) of tricarboxycyclopentylacetic dianhydride and 2.94 g (25.7 mmol) of 1,4-diaminocyclohexane were dissolved in 98.73 g of N-methyl-2-pyrrolidone and reacted with stirring for 2 hours at room temperature to obtain a solution of a second polyamic acid prepolymer having carboxylic anhydride groups in its ends. The logarithmic viscosity of the second polyamic acid prepolymer was 0.06 dl/g.

Step 3
Preparation of a block copolymer type polyamic acid:

The entire solution of the first polyamic acid prepolymer which was obtained in step 1 and the entire solution of the second polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a block copolymer type polyamic acid having a logarithmic viscosity of 1.19 dl/g Step 4
Imidization:

25.00 g of block copolymer type polyamic acid which was obtained in step 3 was dissolved in 475 g of N-methyl-2-pyrrolidone; further, 10.17 g of pyridine and 13.13 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure; then a polyimide block copolymer with 1.19 dl/g of logarithmic viscosity was obtained. This is designated as "Polymer 13".

Process Example 14

Step 1
Preparation of a first polyimide prepolymer:

29.37 g (131.0 mmol) of 2,3,5-tricarboxycyclopentylacetic dianhydride and 13.78 g (127.4 mmol) of p-phenylenediamine were dissolved in 395.28 g of N-methyl-2-pyrrolidone and reacted with stirring for 2 hours at room temperature; further, 20.73 g of pyridine and 26.74 g of acetic anhydride were added and reacted at 60° C. for 6 hours. Then 0.77 g (7.1 mmol) of p-phenylenediamine added and reacted for 4 hours to obtain a first polyimide prepolymer having amino groups at its ends. The logarithmic viscosity of the first polyimide prepolymer was 0.30 dl/g.

Step 2
Preparation of a second polyimide prepolymer:

2.39 g (10.7 mmol) of 2,3,5-tricarboxycyclopentylacetic dianhydride and 3.69 g (7.1 mmol) of a diamine compound, which was indicated as compound A01 in FIG. 7, were dissolved in 54.72 g of N-methyl-2-pyrrolidone and reacted with stirring for 2 hours at room temperature; further, 0.56 g of pyridine and 0.78 g of acetic anhydride were added and reacted at 60° C. for 6 hours to obtain a second polyimide prepolymer having carboxylic anhydride group at its ends.

The logarithmic viscosity of the second polyimide prepolymer was 0.20 dl/g.

Step 3
Preparation of a polyimide block copolymer:

The entire solution of the first polyimide prepolymer which was obtained in step 1 and the entire solution of the second polyimide prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a polyimide block copolymer having a logarithmic viscosity of 1.10 dl/g. This is designated as "Polymer 14".

Process Example 15

Step 1
Preparation of a first polyimide prepolymer:

33.29 g (90.9 mmol) of pyromellitic acid tetraethyl ester and 10.38 g (95.9 mmol) of 4,4'-diaminodiphenylmethane were dissolved in 393.03 g of N-methyl-2-pyrrolidone and reacted with stirring for 6 hours at 150(to obtain a solution of a first polyimide prepolymer having amino groups at its ends. The logarithmic viscosity of the first polyimide prepolymer was 0.02 dl/g.

Step 2
Preparation of a second polyimide prepolymer:

3.70 g (10.1 mmol) of pyromellitic acid tetraethyl ester and 2.63 g (5.1 mmol) of a diamine compound, which was indicated as compound A01 in FIG. 7, were dissolved in 56.1 g of N-methyl-2-pyrrolidone and reacted with stirring for 6 hours at 150° C. to obtain a solution of a second polyimide prepolymer having ethylester groups at its ends. The logarithmic viscosity of the second polyimide prepolymer was 0.02 dl/g.

Step 3
Preparation of a polyimide block copolymer:

The entire solution of the first polyimide prepolymer which was obtained in step 1 and the entire solution of the second polyimide prepolymer which was obtained in step 2 were mixed and reacted with stirring for 6 hours at 150° C.

Resulting reaction product was poured into a large excess of methyl alcohol to precipitate a polymer; the solid was separated, rinsed with methyl alcohol, and dried for 15 hours at 40° C. under reduced pressure to obtain a polyimide block copolymer having a logarithmic viscosity of 0.20 dl/g. This is designated as "Polymer 15".

Process Example 16

Step 1
Preparation of a first polyimide prepolymer:

21.02 g (93.8 mmol) of 2,3,5-tricarboxycyclopentylacetic dianhydride and 24.24 g (96.8 mmol) of diphenylmethane-4,4'-diisocyanate were dissolved in 407.34 g of N-methyl-2-pyrrolidone and reacted with stirring for 2 hours at room temperature to obtain a solution of a first polyimide prepolymer having isocyanate groups at its ends. The logarithmic viscosity of the first polyimide prepolymer was 0.10 dl/g.

Step 2
Preparation of a second polyimide prepolymer 1.83 g (8.2 mmol) of 2,3,5-tricarboxycyclopentylacetic dianhydride and 2.92 g (5.1 mmol) of a diisocyanate compound, which was indicated as compound B01 in FIG. 13, were dissolved in 42.75 g of N-methyl-2-pyrrolidone and reacted with stirring for 2 hours at room temperature to obtain a second polyimide prepolymer having carboxylic anhydride groups at its ends. The logarithmic viscosity of the second polyimide prepolymer was 0.05 dl/g.

Step 3
Preparation of a polyimide block copolymer:

The entire solution of the first polyimide prepolymer which was obtained in step 1 and the entire solution of the second polyimide prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a polyimide block copolymer having a logarithmic viscosity of 1.10 dl/g. This is designated as "Polymer 16".

Process Example 17

Step 1
Preparation of a polyimide prepolymer:

0.96 g (4.3 mmol) of 2,3,5-tricarboxycyclopentylacetic dianhydride and 4.10 g (7.2 mmol) of a diisocyanate compound, which was indicated as compound B01 in FIG. 13, were dissolved in 45.54 g of N-methyl-2-pyrrolidone and reacted with stirring for 2 hours at room temperature to obtain a solution of a polyimide prepolymer having isocyanate groups at its ends. The logarithmic viscosity of the polyimide prepolymer was 0.10 dl/g.

Step 2
Preparation of a second polyamic acid prepolymer:

30.25 g (138.7 mmol) of pyromellitic dianhydride and 14.69 g (135.8 mmol) of p-phenylenediamine were dissolved in 404.46 g of N-methyl-2-pyrrolidone and reacted with stirring for 6 hours at room temperature to obtain a solution of a polyamic acid prepolymer having carboxylic anhydride groups at its ends. The logarithmic viscosity of the polyamic acid prepolymer was 0.10 dl/g.

Step 3
Preparation of a polyimide-polyamic acid block copolymer:

The entire solution of the polyimide prepolymer which was obtained in step 1 and the entire solution of the polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a polyimide-polyamic acid block copolymer having a logarithmic viscosity of 1.10 dl/g. This is designated as "Polymer 17".

Process Example 18

Step 1
Preparation of a polyimide prepolymer:

2.44 g (11.0 mmol) of 2,3,5-tricarboxycyclopentylacetic dianhydride and 4. 14 g (7.1 mmol) of a diisocyanate compound, which was indicated as compound B01 in FIG. 13, were dissolved in 59.22 g of N-methyl-2-pyrrolidone and reacted with stirring for 2 hours at room temperature to obtain a solution of a polyimide prepolymer having carboxylic anhydride groups at its ends. The logarithmic viscosity of the polyimide prepolymer was 0.10 dl/g.

Step 2
Preparation of a polyamic acid prepolymer:

28.75 g (131.8 mmol) of pyromellitic dianhydride and 14.67 g (135.7 mmol) of p-phenylenediamine were dissolved in 390.78 g of N-methyl-2-pyrrolidone and reacted with stirring for 6 hours at room temperature to obtain a solution of a polyamic acid prepolymer having carboxylic anhydride groups at its ends. The logarithmic viscosity of the polyamic acid prepolymer was 0.10 dl/g.

Step 3

Preparation of a polyimide-polyamic acid block copolymer

The entire solution of the polyimide prepolymer which was obtained in step 1 and the entire solution of the polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a polyimide-polyamic acid block copolymer having a logarithmic viscosity of 1.11 dl/g. This is designated as "Polymer 18".

Process Example 19

Step 1

Preparation of a polyimide prepolymer:

1.13 g (4.3 mmol) of pyromellitic acid tetraethyl ester and 3.75 g (7.2 mmol) of a diamine compound illustrated as A01 were dissolved in 34.29 g of N-methyl-2-pyrrolidone and reacted for 6 hours at 150° C. to obtain a solution of a first polyimide prepolymer having amino groups at its ends. The logarithmic viscosity of the first polyimide prepolymer was 0.10 dl/g.

Step 2

Preparation of a polyamic acid prepolymer:

31.37 g (140.1 mmol) of 2,3,5-tricarboxycyclopentylacetic dianhydride and 14.81 g (137.1 mmol) of p-phenylenediamine were dissolved in 415.62 g of N-methyl-2-pyrrolidone and reacted with stirring for 2 hours at room temperature to obtain a solution of a polyamic acid prepolymer having carboxylic anhydride groups at its ends. The logarithmic viscosity of the polyamic acid prepolymer was 0.10 dl/g.

Step 3

Preparation of a polyimide-polyamic acid block copolymer:

The entire solution of the polyimide prepolymer which was obtained in step 1 and the entire solution of the polyamic acid prepolymer which was obtained in step 2 were mixed and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a polyimide-polyamic acid block copolymer having a logarithmic viscosity of 1.20 dl/g. This is designated as "Polymer 19".

Comparative Process Example 1

In Comparative Process Example 1, the same kind and the same amount to the total amount of tetracarboxylic dianhydride as in steps 1 and 2 of Process Example 1 and the same kinds and the same amounts of two diamine compounds as in the same steps were gathered (mixed) and reacted together. A polyamic acid was prepared in this reaction (method), and then, was imidized as in step 4 of Process Example 1 to obtain a polyimide.

[Preparation of a polyamic acid]

31.76 g (141.7 mmol) of 2,3,5-tricarboxycyclopenthylacetic dianhydride, 14.55 g (134.5 mmol) of p-phenylenediamine, and 3.69 g (7.1 mmol) of a diamine compound, which was indicated as compound A01 in FIG. 7, were dissolved in 450.00 g of N-methyl-2-pyrrolidone and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a hybrid type polyamic acid having of a logarithmic viscosity of 1.23 dl/g.

Imidization:

20.00 g of the hybrid polyamic acid was dissolved in 380 g of N-methyl-2-pyrrolidone; further, 8.96 g of pyridine and 11.57 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure to obtain a hybrid type polyimide copolymer having a logarithmic viscosity of 1.25 dl/g. This is designated as "Comparative Polymer 1".

Comparative Process Example 2

In this Comparative Process Example 2, two kinds of polyimide mixtures below were produced following the manner of Process Example 1.

(1) A first polyimide

The same kinds of tetracarboxylic dianhydride and diamine compound as the ones used in step 1 of Process Example 1 were reacted in equivalent amounts to prepare a polyamic acid; further, the imidization was performed in the same manner as in step 4 of Process Example 1 to obtain a polyimide.

(2) A second polyimide

The same kinds of tetracarboxylic dianhydride and diamine compound as the ones used in step 2 of Process Example 1 were reacted with stirring in equivalent amounts to prepare a polyamic acid; further, the imidization was performed in the same manner as in step 4 of Process Example 1 to obtain a polyimide.

Preparation of a polyamic acid:

15.05 g (67.1 mmol) of 2,3,5-tricarboxycyclopentylacetic dianhydride and 34.95 g (67.1 mmol) of a diamine compound, which was indicated as compound A01 in FIG. 7, were dissolved in 450.00 g of N-methyl-2-pyrrolidone and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a polyamic acid having a logarithmic viscosity of 0.77 dl/g.

Imidization:

20.00 g of the above polyamic acid was dissolved in 380 g of N-methyl-2-pyrrolidone; further, 4.25 g of pyridine and 5.48 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure to obtain a first polyimide having a logarithmic viscosity of 0.77 dl/g.

Preparation of a polyamic acid:

33.73 g (150.5 mmol) of 2,3,5-tricarboxycyclopenthylacetic dianhydride and 16.27 g (150.5 mmol) of p-phenylenediamine were dissolved in 450.00 g of N-methyl-2-pyrrolidone and reacted with stirring for 6 hours at 60° C.

Resulting reaction product was poured into a large excess of methyl alcohol to precipitate a polymer; the solid was separated, rinsed with methyl alcohol, and dried for 15 hours at 40° C. under reduced pressure to obtain a polyamic acid having a logarithmic viscosity of 1.30 dl/g.

Imidization:

20.00 g of the above polyamic acid was dissolved in 380 g of N-methyl-2-pyrrolidone; further, 9.51 g of pyridine and 12.29 g of acetic anhydride were added and reacted while the mixture was being stirred for 5 hours at 110° C.

Resulting reaction product was poured into a large excess of methyl alcohol to precipitate a polymer; the solid was separated, rinsed with methyl alcohol, and dried for 15 hours at 40° C. under reduced pressure to obtain a second polyimide having a logarithmic viscosity of 1.25 dl/g.

Preparation of a polyimide mixture:

10.6 weight % of the first polyimide and 89.4 weight % of the second polyimide which were obtained in the above manner were mixed to produce a polyimide mixture having the same monomer composition as in the Polymer 1 of Process Example 1. This is designated as "Comparative polymer 2".

Comparative Process Example 3

In Comparative Process Example 3, an excess amount of tetracarboxylic dianhydride was reacted with a diamine compound; further, another kind of diamine compound was added and reacted with remained tetracarboxylic dianhydride to prepare polyamic acid. Further, imidization was performed to produce a polyimide.

Preparation of a polyamic acid:

14.55 g (134.5 mmol) of p-phenylenediamine was dissolved in 450.00 g of N-methyl-2-pyrrolidone and kept at 0° C. in ice bath; further, 31.76 g (141.7 mmol) of 2,3,5-tricarboxycyclopenthylacetic dianhydride was gradually added and stirred for 3 hours in ice bath. 3.69 g (7.1 mmol) of a diamine compound which was indicated as a compound A01 in FIG. 7 and 2.24 g (28.3 mmol) of pyridine were added to the solution and reacted with stirring for 3 hours.

Resulting reaction product was poured into a large excess of methyl alcohol to precipitate a polymer; the solid was separated, rinsed with methyl alcohol, and dried for 15 hours at 40° C. under reduced pressure to obtain a polyamic acid having a logarithmic viscosity of 0.45 dl/g.

Imidization 20.00 g of the above polyamic acid was dissolved in 380 g of N-methyl-2-pyrrolidone; further, 8.96 g of pyridine and 11.57 g of acetic anhydride were added and reacted for 5 hours at 110° C.

Resulting reaction product was poured into a large excess of methyl alcohol to precipitate a polymer; the solid was separated, rinsed with methyl alcohol, and dried for 15 hours at 40° C. under reduced pressure to obtain a modified-type polyimide copolymer having a logarithmic viscosity of 0.50 dl/g. This is designated as "Comparative Polymer 3."

Example 1

The Polymer 1 which was obtained in Process Example 1 was dissolved in γ-butyrolactone to obtain a solution with 5 weight % solids concentration; the solution was filtered through a 1 μm pore diameter filter to produce a thin layer forming agent.

The obtained thin layer forming agent was used as a liquid crystal alignment layer forming agent and was applied by the printing method to one side of a glass substrate on which transparent ITO conductive layer was formed. The substrate was heat dried at 180° C. for 1 hour to obtain a thin layer. As shown in Table 1, measurement of the thickness was 600 Å in average with ±20 Å variation, demonstrating excellent thickness uniformity.

A rubbing machine was equipped with a roller wound with a nylon cloth. The thin layer was rubbed at the pile contact length of 0.6 mm, roller rotation speed of 500 rpm, and stage feed movement rate of 1 cm/sec to obtain a thin liquid crystal alignment layer. This liquid crystal alignment layer demonstrated excellent adhesiveness to the substrate. No peeling phenomenon from the substrate by rubbing was observed.

Example 2

The same thin layer forming agent as in Example 1 was applied on the surface of the same glass substrate as above to have 800 Å of thickness after drying by a spinner and was dried for 1 hour at 180° C. to form a thin layer. Measurement of the thickness showed 800 Å in average with ±20 Å of variation, demonstrating excellent thickness uniformity.

The same rubbing treatment as in Example 1 was performed on the thin layer to obtain a liquid crystal alignment layer demonstrating excellent adhesiveness to the substrate. No peeling phenomenon from the substrate by rubbing was observed.

On peripheries of each of the two substrates obtained above, epoxy resin containing 17 μm diameter aluminum oxide particles was screen printed. Then, the two substrates were positioned face to face via the gap between them so that the rubbing direction on each liquid crystal alignment layer is reverse-paralleled. The peripheries of the substrates were contacted and pressed, and the adhesive was hardened.

Then, nematic type liquid crystal "MLC-2001" (Merck) was injected into the cell gap between the opposite substrate surfaces and the adhesive agent on their peripheries, and the inlet was sealed by the epoxy type adhesive agent to form a liquid crystal cell. Further, on outer surfaces of both substrates that constitute the liquid crystal cell, polarizers were attached so that the polarizing direction remains in accordance with the rubbing direction of the liquid crystal alignment layer on one side of the substrate surface. Thus, the liquid crystal display element was produced.

As shown in Table 2, alignment properties of the liquid crystal molecule in the liquid crystal display element was excellent and the pretilt angle was 5.3°.

Examples 3–20

Using polymers 2–19, which were prepared respectively in Process Examples 2–19, in place of polymer 1, thin layer forming agents were prepared in the same manner as in Example 1; using each thin layer forming agent, a thin layer was respectively formed on the surface of the glass substrate for liquid crystal display elements in the same manner as in Example 1 and the average and the variation of thickness for each thin layer were measured. And, in the cases of Polymer 8, Polymer 9 and Polymer 11, imidization was performed by heating at 180° C. after applying and drying. Table 1 shows the results.

Rubbing treatment was performed on each of the formed layers using the same conditions as in Example 1 to obtain a liquid crystal alignment layer demonstrating excellent adhesiveness to the substrate and no peeling from substrate by rubbing was observed.

Comparative Example 1

Using Comparative Polymer 1, a hybrid type polyimide copolymer, obtained in Comparative Process Example 1, a thin layer forming agent was prepared in the same manner as in Example 1, and a thin layer was formed in the same manner as in Example 1. As shown in Table 1, measurement of the thickness showed 630 Å in average with ±80 Å of variation, demonstrating poor thickness uniformity.

Rubbing treatment was performed on the layer surface in the same manner as in Example 1 to form a liquid crystal alignment layer. And no peeling from substrate was observed.

Comparative Example 2

Using Comparative Polymer 2, a polyimide mixture, obtained in Comparative Process Example 2, a thin layer forming agent was prepared in the same manner as in Example 1, and a thin layer was formed in the same manner as in Example 1. As shown in Table 1, measurement of the thickness showed 760 Å in average with ±150 Å of variation, demonstrating very poor thickness uniformity and showing a surface with a mottled pattern.

Rubbing treatment was performed on the thin layer surface in the same manner as in Example 1 to form a liquid crystal alignment layer; minute rubbing scratches on the surface were observed.

Comparative Example 3

Using Comparative Polymer 3, a modified-type polyimide, obtained in the Comparative Process Example 3, a thin layer forming agent was prepared in the same manner as in Example 1, and a thin layer was formed in the same manner as in Example 1. As shown in Table 1, measurement of the thickness showed 580 Å in average with ±50 Å of variation, demonstrating poor thickness uniformity.

Rubbing treatment was performed on the layer surface in the same manner as in Example 1 to form a liquid crystal alignment layer. And no peeling from substrate by rubbing was observed.

It is obvious from Table 1 that the liquid crystal alignment layers, obtained from the thin layer forming agents with Polymers 1–19 of polyimide-type block copolymers, have a very small variation in thickness within the range of ±10 to ±25 Å. This is because the thin layer forming agent for each liquid crystal alignment layer can provides excellent and uniform applicability, by which excellent liquid crystal alignment layers were formed.

It is obvious from Example 8, Example 9, and Example 11 that even block copolymer type polyamic acids used as polyimide-type block copolymers show excellent properties like polyimide block copolymers show.

Example 21

Using the thin layer forming agent prepared in Example 1, a thin layer was formed on a glass substrate surface in the same manner as in Example 2. Measurement of the thickness showed 500 Å on average with ±20 Å of variation, demonstrating excellent thickness uniformity.

With all conditions equal to Example 1, except that the rubbing times was performed twice on the thin layer surface, a liquid crystal alignment layer was produced. The liquid crystal alignment layer demonstrated excellent adhesiveness to the substrate and no peeling from substrate by rubbing was observed.

Using two substrates having a liquid crystal alignment layer obtained in such a manner, a liquid crystal display element was produced in the same manner as in Example 2. As shown in Table 2, alignment properties of the liquid crystal molecule in the liquid crystal display element were excellent and the pretilt angle was 5.0°.

It is obvious that the liquid crystal alignment layer, even with multiple rubbing treatments, maintains as excellent adhesiveness and alignment properties as it does with one rubbing treatment. In other words, the liquid crystal alignment layer obtains stable adhesiveness and alignment properties.

Example 22–53

Thin layer forming agents with Polymers 1–9 and with Polymers 14–19 were prepared as liquid crystal alignment layer forming agents. Thin layers of various thickness within the range of 500 Å to 1500 Å were formed. A variety of liquid crystal display elements were produced as in Example 21, except that the rubbing times was selected from 1 to 5. The alignment properties and the pretilt angle of the liquid crystal molecule in each of liquid crystal display elements were measured. With polymers 8 and 9, the thin layer was applied and dried, then heated at 180° C. for imidization. Table 2 and Table 3 show the results.

According to Examples 21–53, it was obvious that obtained liquid crystal alignment layers had nearly constant pretilt angles such as 5.0°, 5.1°, and 5.2° with twice rubbing treatments even thickness was varied within the range of 500 Å to 1500 Å. It is understood that these liquid crystal alignment layers gave very stable pretilt angles in the wide range of layer thickness, being little affected by. fluctuations of the production process conditions.

According to Example 2, Example 24, and Example 25, it is understandable that, with all other conditions equal except the rubbing times, nearly the same pretilt angles were obtained at each rubbing time from 1 through 5. Yet obtained alignment properties at each stage were excellent.

The similar results as above were confirmed in other examples where different kinds of polyimide-type block copolymer were used.

Comparative Examples 4–21

Using the thin layer forming agent as prepared in Comparative Examples 1–3 as a liquid crystal alignment layer forming agent, thin layers of various thickness were formed within the range of 500 Å to 1500 Å. With all other conditions remained equal as in Example 21, except that the rubbing times was selected from 1 to 5, a variety of liquid crystal display element for reference were produced. Then, alignment properties and pretilt angles of liquid crystal molecules were measured for each liquid crystal display element. Table 4 shows the results.

Reference Example 1

Using the first polyimide obtained in Comparative Process Example 2, a thin layer forming agent was prepared; then, a thin layer was formed as in Example 1. As shown in Table 1, the thickness was 810 Å on average with ±80 Å variation, demonstrating very poor layer thickness uniformity.

The rubbing treatment was performed on this layer surface as in Example 1 to form a liquid crystal alignment layer; minute rubbing scratches on the surface were observed.

Reference Example 2

Using the second polyimide obtained in Comparative Process Example 2, a thin layer forming agent was prepared; then, a thin layer was formed as in Example 1. As shown in Table 1, measurement of the thickness showed 800 Å on average with ±20 Å variation, demonstrating excellent thickness uniformity.

Rubbing treatment was performed on this layer surface in the same manner as in Example 1 to form a liquid crystal alignment layer. No rubbing scratches on the surface were observed.

Reference Examples 3–8

Using the same thin layer forming agent of Reference Example 1 that contains the first polyimide obtained in Comparative Process Example 2 as a liquid crystal alignment layer forming agent, thin layers of various thickness were formed within the range of 500 Å to 1500 Å. With all other conditions remained equal as in Example 21, except that the rubbing times was selected from 1 to 5, a variety of liquid crystal display element for reference were produced. Then, alignment properties and pretilt angles of liquid crystal molecules were measured for each liquid crystal display element. Table 5 shows the results.

Reference Examples 9–14

Using the same thin layer forming agent of Reference Example 2 that contains the second polyimide obtained in Comparative Example 2 as a liquid crystal alignment layer forming agent, thin layers of various thickness were formed within the range of 500 Å to 1500 Å. With all other conditions remained equal as in Example 21, except that the rubbing times was selected from 1 to 5, a variety of liquid crystal display elements for reference were produced. Then, alignment properties and pretilt angles of liquid crystal molecules were measured for each liquid crystal display element. Table 5 shows the results.

According to the results of Comparative Examples 4–21, it is obvious that, even with the polyimide of the same monomer composition, such excellent properties derived from block copolymer could not be obtained when a polymer that constitute liquid crystal alignment layer was a hybrid type (Comparative Polymer 1) or a simple mixture (Comparative Polymer 2), not a block copolymer.

It was understood, according to Comparative Examples 4–7 and others, that even though the rubbing times was the same, the pretilt angles were changed dramatically when the thickness was changed; according to Comparative Examples 8 and 9, even though the layer thickness was the same, the pretilt angles were dramatically changed when the times for rubbing treatment was changed.

According to Comparative Examples 10–13 and others, it is understood that alignment properties obtained were poor even though the times for rubbing was the same because the pretilt angle was dramatically changed when the thickness was changed; according to Comparative Examples 14, 15, and others, it is understood that the pretilt angle was small even though the thickness was constant and alignment properties were greatly affected by the times for rubbing even though the thickness was the same.

Further, according to Reference Examples 1 and 3–8, it is obvious that with the first polyimide of homopolymer, the applicability of liquid crystal alignment layer and its adhesiveness to the substrate were poor while the very large pretilt angle was obtained. However, with changes in the thickness or the rubbing times, the pretilt angle changed dramatically.

According to Reference Examples 2 and 9–14, when the second polyimide of homopolymer was used, it is obvious that both applicability of the liquid crystal alignment layer and its adhesiveness to the substrate were excellent but a large pretilt angle could not be obtained.

Therefore, it is understood that the polyimide of homopolymer with recurring units of each block component that constitutes a polyimide block copolymer is unable to have plural excellent properties together as a polyimide block copolymer does.

TABLE 1

| Number | Polymer | Layer Thickness (Å) average | variety | Adhesiveness |
|---|---|---|---|---|
| Example 1 | Polymer 1 | 600 | ±20 | excellent |
| Example 3 | Polymer 2 | 600 | ±15 | excellent |
| Example 4 | Polymer 3 | 620 | ±10 | excellent |
| Example 5 | Polymer 4 | 640 | ±20 | excellent |
| Example 6 | Polymer 5 | 660 | ±15 | excellent |
| Example 7 | Polymer 6 | 500 | ±25 | excellent |
| Example 8 | Polymer 7 | 610 | ±15 | excellent |
| Example 9 | Polymer 8 | 650 | ±20 | excellent |
| Example 10 | Polymer 9 | 660 | ±15 | excellent |
| Example 11 | Polymer 10 | 600 | ±15 | excellent |
| Example 12 | Polymer 11 | 620 | ±10 | excellent |
| Example 13 | Polymer 12 | 640 | ±20 | excellent |
| Example 14 | Polymer 13 | 660 | ±15 | excellent |
| Example 15 | Polymer 14 | 600 | ±15 | excellent |
| Example 16 | Polymer 15 | 600 | ±20 | excellent |
| Example 17 | Polymer 16 | 620 | ±10 | excellent |
| Example 18 | Polymer 17 | 630 | ±20 | excellent |
| Example 19 | Polymer 18 | 650 | ±15 | excellent |
| Example 20 | Polymer 19 | 600 | ±10 | excellent |
| Comparative Example 1 | Comparative Polymer 1 | 630 | ±80 | excellent |
| Comparative Example 2 | Comparative Polymer 2 | 760 | ±150 | poor |
| Comparative Example 3 | Comparative Polymer 3 | 580 | ±50 | poor |
| Referential Example 1 | First Polyimide of Comparative Process Example 2 | 810 | ±80 | poor |
| Referential Example 2 | Second Polyimide of Comparative Process Example 2 | 800 | ±20 | excellent |

TABLE 2

| Number | Polymer | Layer Thickness (Å) | Rubbing (times) | Pretilt Angle (°) | Alignment Properties |
|---|---|---|---|---|---|
| Example 2 | Polymer 1 | 800 | 1 | 5.3 | excellent |
| Example 21 | Polymer 1 | 500 | 2 | 5.0 | excellent |
| Example 22 | Polymer 1 | 1000 | 2 | 5.1 | excellent |
| Example 23 | Polymer 1 | 1500 | 2 | 5.2 | excellent |
| Example 24 | Polymer 1 | 800 | 1 | 5.3 | excellent |
| Example 25 | Polymer 1 | 800 | 5 | 5.2 | excellent |
| Example 26 | Polymer 2 | 800 | 2 | 4.5 | excellent |
| Example 27 | Polymer 2 | 500 | 2 | 4.4 | excellent |
| Example 28 | Polymer 2 | 800 | 5 | 4.5 | excellent |
| Example 29 | Polymer 3 | 800 | 2 | 3.4 | excellent |
| Example 30 | Polymer 3 | 500 | 2 | 3.3 | excellent |
| Example 31 | Polymer 3 | 800 | 5 | 3.4 | excellent |
| Example 32 | Polymer 4 | 800 | 2 | 6.0 | excellent |
| Example 33 | Polymer 4 | 500 | 2 | 6.4 | excellent |
| Example 34 | Polymer 4 | 800 | 5 | 6.3 | excellent |
| Example 35 | Polymer 5 | 800 | 2 | 3.0 | excellent |
| Example 36 | Polymer 6 | 800 | 2 | 3.5 | excellent |

TABLE 3

| Number | Polymer | Layer Thickness (Å) | Rubbing (times) | Pretilt Angle (°) | Alignment Properties |
|---|---|---|---|---|---|
| Example 37 | Polymer 7 | 500 | 2 | 4.0 | excellent |
| Example 38 | Polymer 7 | 800 | 2 | 3.8 | excellent |
| Example 39 | Polymer 7 | 1500 | 2 | 3.9 | excellent |

TABLE 3-continued

| Number | Polymer | Layer Thickness (Å) | Rubbing (times) | Pretilt Angle (°) | Alignment Properties |
|---|---|---|---|---|---|
| Example 40 | Polymer 7 | 800 | 1 | 4.1 | excellent |
| Example 41 | Polymer 7 | 800 | 5 | 3.9 | excellent |
| Example 42 | Polymer 8 | 800 | 2 | 7.0 | excellent |
| Example 43 | Polymer 9 | 800 | 2 | 6.5 | excellent |
| Example 44 | Polymer 14 | 800 | 2 | 3.4 | excellent |
| Example 45 | Polymer 15 | 800 | 2 | 6.5 | excellent |
| Example 46 | Polymer 16 | 500 | 2 | 3.0 | excellent |
| Example 47 | Polymer 16 | 800 | 2 | 3.2 | excellent |
| Example 48 | Polymer 16 | 1500 | 2 | 3.0 | excellent |
| Example 49 | Polymer 16 | 800 | 1 | 3.1 | excellent |
| Example 50 | Polymer 16 | 800 | 5 | 3.0 | excellent |
| Example 51 | Polymer 17 | 800 | 2 | 7.8 | excellent |
| Example 52 | Polymer 18 | 800 | 2 | 7.2 | excellent |
| Example 53 | Polymer 19 | 800 | 2 | 4.8 | excellent |

TABLE 4

| Number | Polymer | Layer Thickness (Å) | Rubbing (times) | Pretilt Angle (°) | Alignment Properties |
|---|---|---|---|---|---|
| Comparative Example 4 | Comparative Polymer 1 | 500 | 2 | 3.2 | excellent |
| Comparative Example 5 | Comparative Polymer 1 | 800 | 2 | 4.5 | excellent |
| Comparative Example 6 | Comparative Polymer 1 | 1000 | 2 | 6.5 | excellent |
| Comparative Example 7 | Comparative Polymer 1 | 1500 | 2 | 7.0 | excellent |
| Comparative Example 8 | Comparative Polymer 1 | 800 | 1 | 8.0 | excellent |
| Comparative Example 9 | Comparative Polymer 1 | 800 | 5 | 2.2 | excellent |
| Comparative Example 10 | Comparative Polymer 2 | 500 | 2 | 2.1 | excellent |
| Comparative Example 11 | Comparative Polymer 2 | 800 | 2 | 3.0 | excellent |
| Comparative Example 12 | Comparative Polymer 2 | 1000 | 2 | — | poor |
| Comparative Example 13 | Comparative Polymer 2 | 1500 | 2 | — | poor |
| Comparative Example 14 | Comparative Polymer 2 | 800 | 1 | — | poor |
| Comparative Example 15 | Comparative Polymer 2 | 800 | 5 | 2.1 | excellent |
| Comparative Example 16 | Comparative Polymer 3 | 500 | 2 | — | poor |
| Comparative Example 17 | Comparative Polymer 3 | 800 | 2 | — | poor |
| Comparative Example 18 | Comparative Polymer 3 | 1000 | 2 | — | poor |
| Comparative Example 19 | Comparative Polymer 3 | 1500 | 2 | — | poor |
| Comparative Example 20 | Comparative Polymer 3 | 800 | 1 | — | poor |
| Comparative Example 21 | Comparative Polymer 3 | 800 | 5 | — | poor |

TABLE 5

| Number | Polymer | Layer Thickness (Å) | Rubbing (times) | Pretilt Angle (°) |
|---|---|---|---|---|
| Referential Example 3 | First Polyimide of Comparative Process Example 2 | 500 | 2 | 60 |
| Referential Example 4 | First Polyimide of Comparative Process Example 2 | 800 | 2 | 80 |
| Referential Example 5 | First Polyimide of Comparative Process Example 2 | 1000 | 2 | 80 |
| Referential Example 6 | First Polyimide of Comparative Process Example 2 | 1500 | 2 | 89 |
| Referential Example 7 | First Polyimide of Comparative Process Example 2 | 800 | 1 | 89 |
| Referential Example 8 | First Polyimide of Comparative Process Example 2 | 800 | 5 | 50 |
| Referential Example 9 | Second Polyimide of Comparative Process Example 2 | 500 | 2 | 0.8 |
| Referential Example 10 | Second Polyimide of Comparative Process Example 2 | 800 | 2 | 1.0 |
| Referential Example 11 | Second Polyimide of Comparative Process Example 2 | 1000 | 2 | 1.2 |
| Referential Example 12 | Second Polyimide of Comparative Process Example 2 | 1500 | 2 | 1.5 |
| Referential Example 13 | Second Polyimide of Comparative Process Example 2 | 800 | 1 | 1.5 |
| Referential Example 14 | Second Polyimide of Comparative Process Example 2 | 800 | 5 | 0.9 |

Example 54

Using the thin layer forming agent prepared in Example 1, a thin layer was formed on a glass substrate to form a liquid crystal alignment layer with 800 Å of the thickness. Ultraviolet rays were irradiated to this thin layer at 3J/cm2 by a low-pressure mercury lamp. Rubbing treatment was performed on the substrate in the same manner as in Example 21 to produce liquid crystal display elements.

Alignment properties of the liquid molecules in this liquid crystal display element were excellent and the pretilt angle was 0.5°.

It is obvious from this result that the liquid crystal alignment layer formed from the thin layer related to Example 21 provides a small pretilt angle after irradiation of ultraviolet rays, then a modification of alignment properties can be effectively made.

In the process of producing a block copolymer type polyamic acid of this invention, plural kinds of reactive polyamic acid prepolymers, which have reactive groups originating from tetracarboxylic compounds and amino groups reacting with the reactive group, and have a different molecular structure of recurring units from each other, are prepared; and further, reacted with stirring to be comprised of plural polyamic acid block components which have different molecular structures of recurring units from each other; thus, a block copolymer type polyamic acid is produced having coexisting properties derived from each of the block components. In this process, it is easy to sufficiently control conditions in each polycondensation reaction, so that block copolymer type polyamic acid having expected properties can be produced with certain. By imidization, the block copolymer type polyamic acid becomes a polyimide block copolymer having coexisting excellent properties of each of the polyimide block components; therefore, the polyimide having coexisting excellent properties from each of the block components is obtained: for example, the applicability, alignment controllability, pretilt angle, rubbing scratch resistivity, voltage retention rate, resistance of uninsulation, flicker resistivity, and retention stability necessary for liquid crystal alignment layer.

In the process of producing a polyimide block copolymer of this invention, plural kinds of reactive polyimides, which have reactive groups originating from tetracarboxylic compounds and amino groups or isocyanate groups reacting with the reactive group, and have a different molecular structure of recurring units from each other, are prepared; and further, reacted with stirring to be comprised of plural polyimide block components which have different molecular structures of recurring units from each other; thus, a polyimide block copolymer having coexisting properties derived from each of the block components is produced. In this process, it is easy to sufficiently control conditions in each polycondensation reaction, so that the polyimide block copolymer having expected properties can be produced with certain. The polyimide block copolymer becomes one having coexisting excellent properties of each of the polyimide block components; therefore, the polyimide having excellent plural properties which are difficult to be obtained at the same time by conventional methods, for example, the necessary properties above mentioned for liquid crystal alignment layer.

In the process of producing a polyimide-polyamic acid block copolymer of this invention, plural kinds of reactive polyimide prepolymers and plural reactive polyamic acid prepolymers, each of which has reactive groups originating form tetracarboxylic compounds, and amino groups or isocyanate groups reacting with the reactive groups, and have a different molecular structure of recurring unit from each other, are prepared; and further, reacted with stirring to be comprised of plural polyimide block components and plural polyamic acid block components which have different molecular structures of recurring units from each other; thus, a polyimide-polyamic acid block copolymer having coexisting properties derived from each of the block components is produced. In this process, it is easy to sufficiently control the conditions for each polycondensation reaction, so that the polyimide-polyamic acid block copolymer having expected properties can be produced with certain. By imidization, the polyimide-polyamic acid block copolymer becomes a polyimide block copolymer having coexisting excellent properties of each of the polyimide block components together; therefore, a polyimide having coexisting excellent plural properties from each of the block components such as the properties necessary for a liquid crystal alignment layer is obtained.

With the thin layer forming agent of this invention, as the major component polymer is a polyimide-type block copolymer comprised of plural kinds of polyimide block components bonded to each other, the inherent properties of each block element can coexist. Therefore, using this thin layer forming agent as a liquid crystal alignment layer forming agent, a liquid crystal alignment layer having excellent plural properties, which are difficult to obtain by conventional methods, can be obtained effectively and easily.

The liquid crystal alignment layer of this invention provides a liquid crystal display element of excellent performance with its coexisting plural properties that are unachievable in conventional methods.

With the process of producing the liquid crystal alignment layer of this invention, alignment property correction can be accomplished with high efficiency by irradiating, and thus excellent liquid crystal display elements can be produced.

This application is based on Japanese Patent Application 7-32875 filed Jan. 31, 1995, incorporated herein by reference.

The following structures illustrate examples of $R^1$, $R^2$, $Q^1$ and $Q^2$ but are non-limiting. Preferred structures for X include hydrogen, $C_1$–$C_{10}$ alkyl such as methyl, ethyl, propyl, etc.

$R^1$ and $R^{2:}$

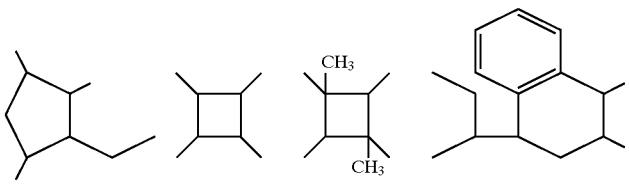

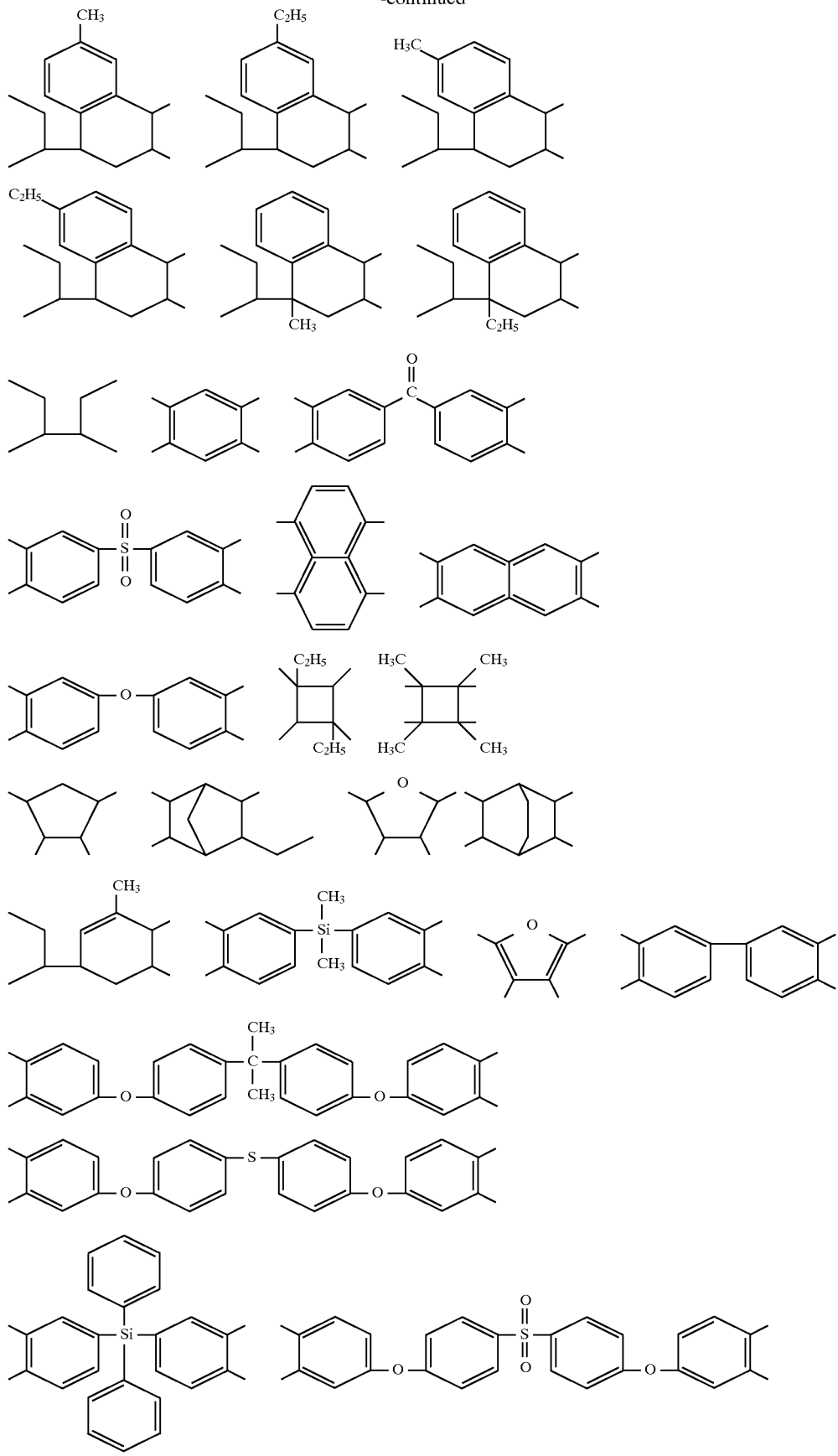

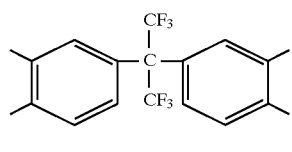 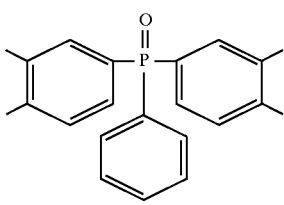
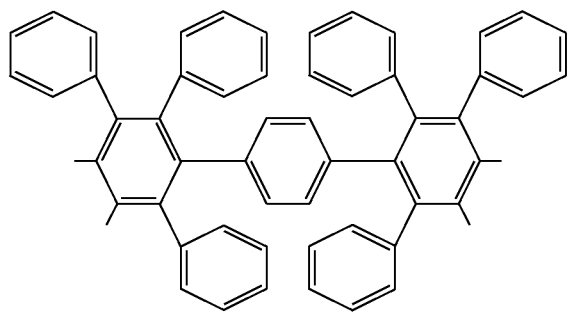
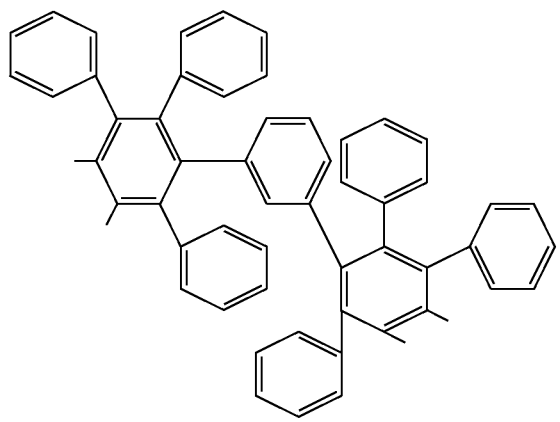
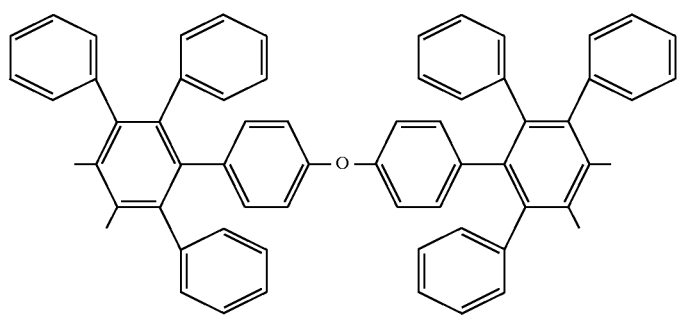
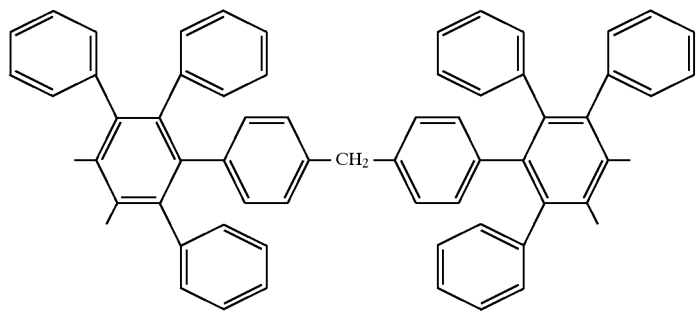
$Q^1$ and $Q^2$:

-continued
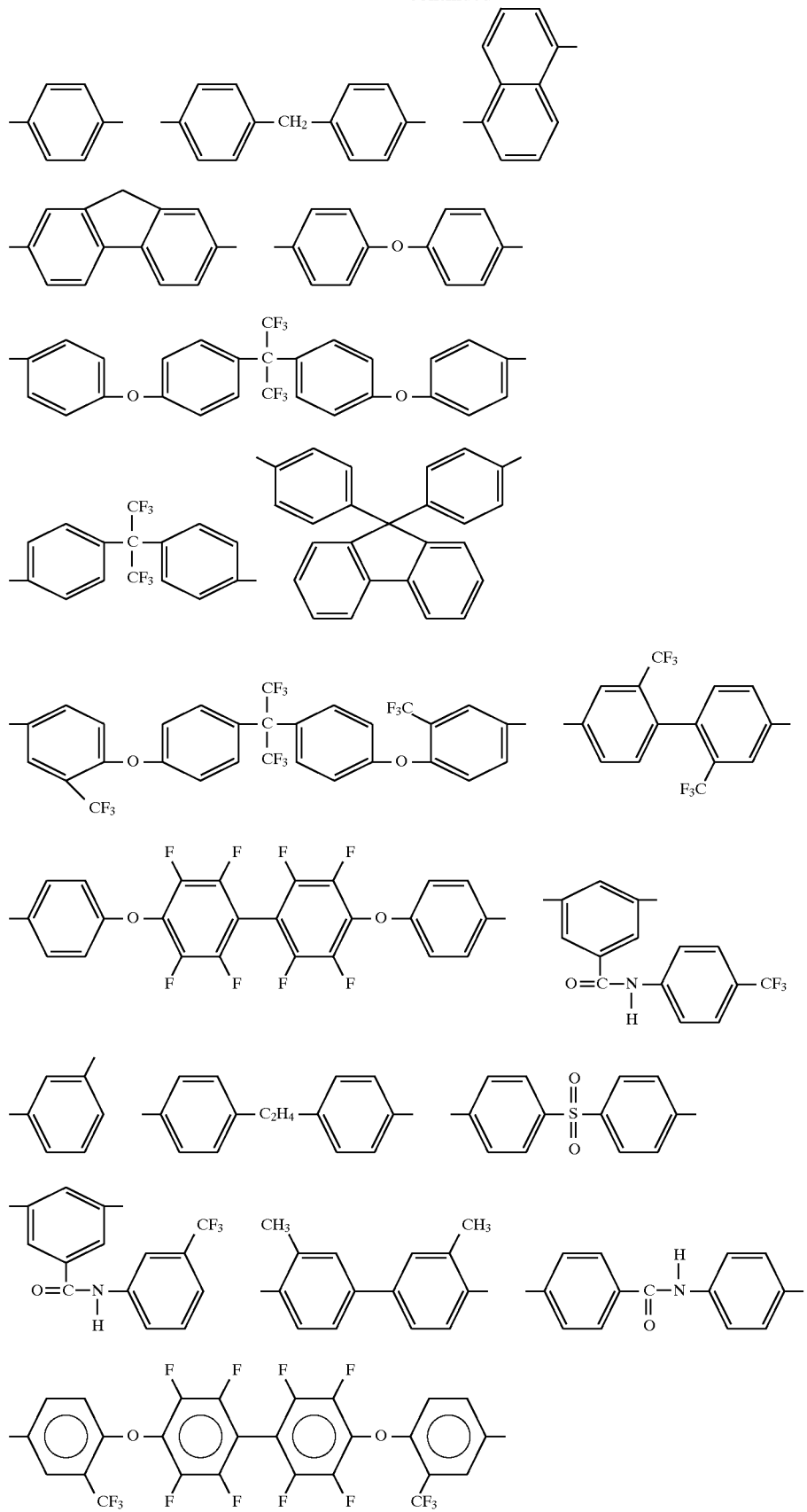

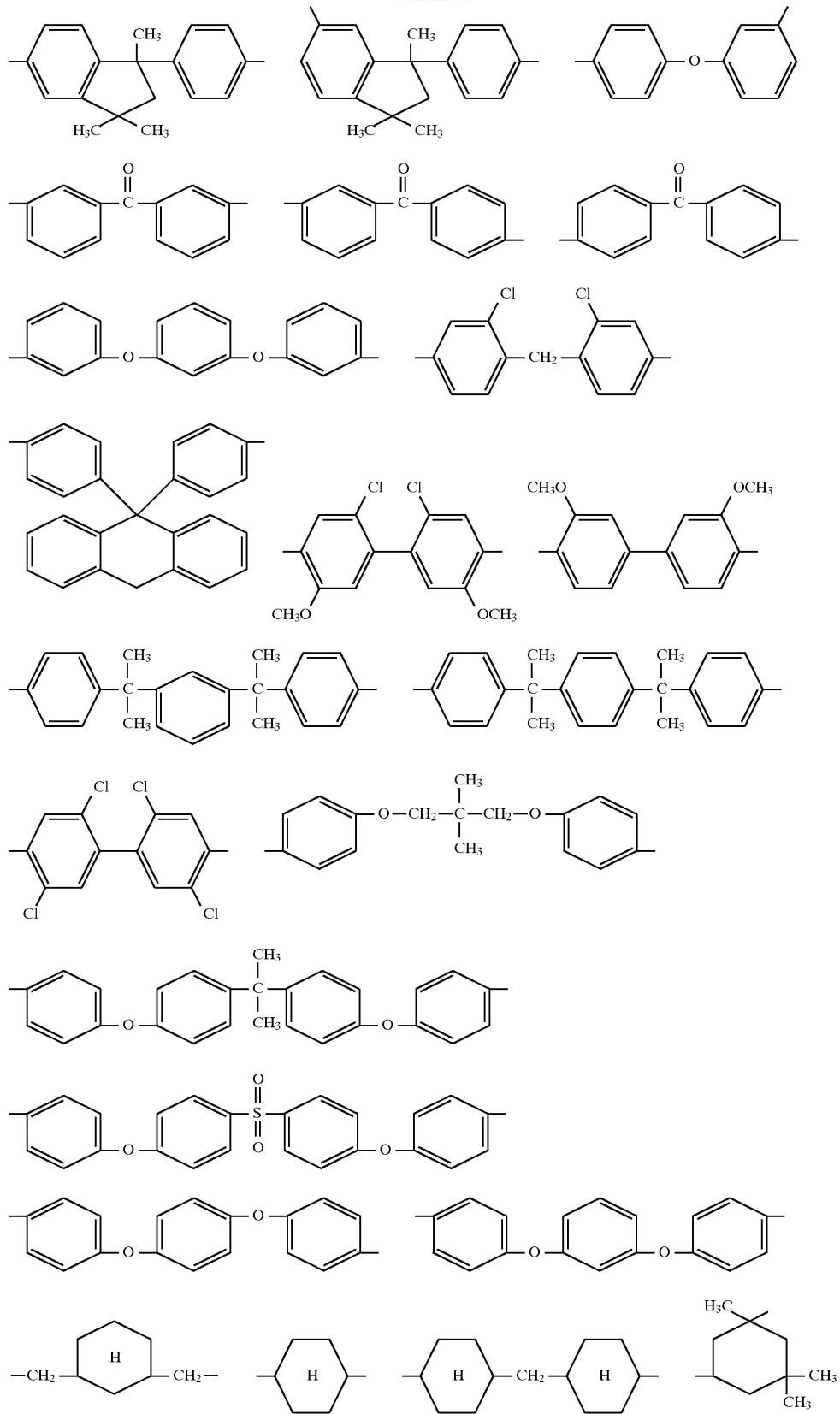

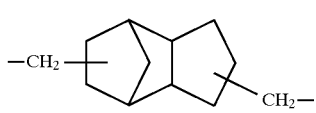 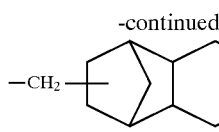 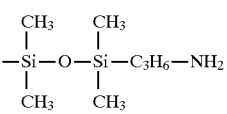

Other examples of $Q^1$ and $Q^2$ include compounds A01–A14 without the diamino groups, such as:

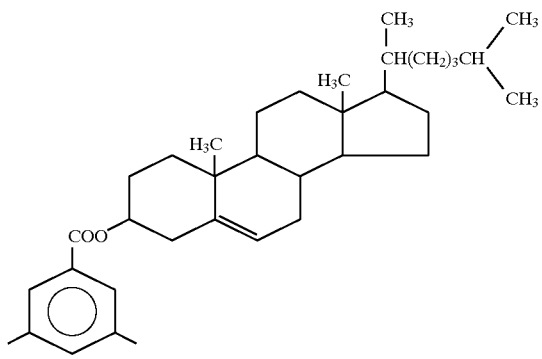

Preferred $R^1$ and $R^2$ structures include the first four rows of structures above. Clearly, $R^1$ $R^2$, $Q^1$, $Q^2$ and X are not limited to specifically identified structures and include, in the case of R and Q, aromatic, heteroaromatic, cyclic, heterocyclic, aliphatic, etc. structures all optionally substituted.

What is claimed as new and desired to be secured by Letters Patents of the United States is:

1. A process of producing a polyamic acid block copolymer comprising a first polyamic acid block and a second polyamic acid block having a different structure from the first block, comprising the following steps:

providing a first polyamic acid prepolymer having amino groups at its ends by reaction between at least one tetracarboxylic compound and at least one diamine compound, providing a second polyamic acid prepolymer different from the first prepolymer and having carboxylic reactive groups at its ends by reaction between at least one tetracarboxylic compound and at least one diamine compound, and reacting the first polyamic acid prepolymer with the second polyamic acid prepolymer to obtain the polyamic acid block copolymer.

2. A process of producing a polyimide block copolymer comprising the steps of claim 1 and further comprising imidizing the polyamic acid block copolymer.

3. A process of producing a polyimide block copolymer comprising a first polyimide block and a second polyimide block having a different structure from the first block, comprising the following steps:

providing a first polyimide prepolymer having amino groups at its ends by a reaction between at least one tetracarboxylic compound and at least one diamine compound, providing a second polyimide prepolymer different from the first prepolymer and having carboxylic reactive groups at its ends by reaction between at least one tetracarboxylic compound and at least one diamine compound, and reacting the first polyimide prepolymer with the second polyimide prepolymer to obtain the polyimide block copolymer.

4. A process of producing a polyimide block copolymer comprising a first polyimide block and a second polyimide block having a different structure from the first polyimide block, comprising the following steps:

providing a first polyimide prepolymer having isocyanate groups at its ends by a reaction between at least one tetracarboxylic dianhydride and at least one diisocyanate compound, providing a second polyimide prepolymer different from the first prepolymer and having carboxylic anhydride groups at its ends by a reaction between at least one tetracarboxylic dianhydride and at least one diisocyanate compound, and reacting the first polyimide prepolymer with the second polyimide prepolymer.

5. A process of producing a polyimide-polyamic acid block copolymer comprising a polyimide block and a polyamic acid block, comprising the following steps:

providing a polyimide prepolymer having carboxylic anhydride groups or isocyanate groups at its ends by reaction between at least one tetracarboxylic dianhydride and at least one diisocyanate compound, providing a polyamic acid prepolymer having amino groups or carboxylic anhydride groups at its ends by reaction between at least one tetracarboxylic dianhydride and at least one diamine compound, reacting the polyamic acid prepolymer having amino groups at its ends with the polyimide prepolymer containing carboxylic anhydride groups at its ends or, reacting the polyamic acid prepolymer having carboxylic anhydride groups at its ends with the polyimide prepolymer containing isocyanate groups at its ends.

6. A process of producing a polyimide-polyamic acid block copolymer comprising a polyimide block and a polyamic acid block, comprising the following steps:

providing a polyimide prepolymer having carboxylic reactive groups or amino groups at its ends by reaction between at least one tetracarboxylic compound and at least one diamine compound, providing a polyamic acid prepolymer having amino groups or carboxylic reactive groups at its ends by reaction between at least one tetracarboxylic compound and at least one diamine compound, reacting the polyamic acid prepolymer having amino groups at its ends with the polyimide prepolymer containing carboxylic reactive groups at its ends or reacting the polyamic acid prepolymer having carboxylic reactive groups at its ends with the polyimide prepolymer containing amino groups at its ends.

7. A composition comprising a solvent and a block copolymer, said block copolymer having a first block and a second block that is bonded to the first block and which has a different structure from the first block, the first block having recurring units of formula 1 or 2:

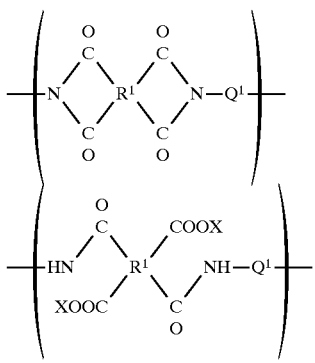

and the block having recurring units of formula 3 or 4:

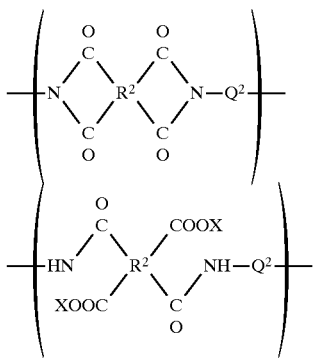

wherein $R^1$ and $R^2$ are tetravalent organic groups which can be the same or different and $Q^1$ and $Q^2$ are divalent organic groups which can be the same or different, and X is a hydrogen atom or an organic group, provided $R^1$ and $R^2$ are not the same when $Q^1=Q^2$ and that $Q^1$ and $Q^2$ are not the same when $R^1=R^2$.

8. A process of producing a liquid crystal alignment layer comprising the steps of:

applying a composition to a substrate surface to form a layer and aligning the layer, wherein the thin layer forming agent comprises a solvent and a block copolymer, said block copolymer having a first block and a second block that is bonded to the first block and which has a different structure from the first block, the first block having recurring units of formula 1 or 2:

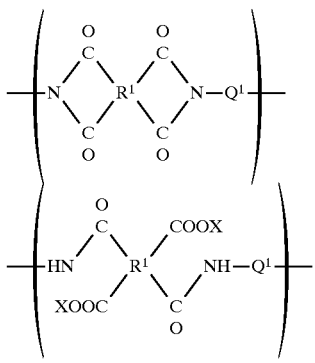

and the second block having recurring units of formula 3 or 4:

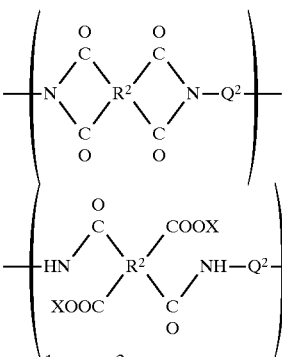

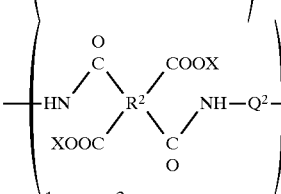

wherein $R^1$ and $R^2$ are tetravalent organic groups which can be the same or different and $Q^1$ and $Q^2$ are divalent organic groups which can be the same or different, and X is a hydrogen atom or an organic group, provided $R^1$ and $R^2$ are not the same when $Q^1=Q^2$ and that $Q^1$ and $Q^2$ are not the same when $R^1=R^2$.

9. The process of producing a liquid crystal alignment layer of claim 8, further comprising the step of improving alignment properties by irradiating at least a selected region of the layer before or after alignment.

10. The process of producing a liquid crystal alignment layer of claim 8, wherein the block copolymer is a polyimide block copolymer.

11. The process of producing a liquid crystal alignment layer of claim 8, wherein the block copolymer is a polyamic acid block copolymer.

12. The process of producing a liquid crystal alignment layer of claim 8, wherein the block copolymer is a polyimide-polyamic acid block copolymer.

13. The process of producing a liquid crystal alignment layer of claim 8, wherein at least one of $R^1$ and $R^2$ is a residue of a cyclic aliphatic tetracarboxylic compound selected from the group consisting of tetracarboxylic acids, tetracarboxylic dianhydrides and tetracarboxylic esters.

14. The process of producing a liquid crystal alignment layer of claim 13, wherein at least one of $R^1$ and $R^2$ is a residue of a cyclic aliphatic tetracarboxylic dianhydride selected from the group consisting of:

2,3,5-tricarboxycyclopentylacetic dianhydride;

1,2,3,4-cyclobutanetetracarboxylic dianhydride;

1,3-dimethyl-1,2,3,4-cyclobutanetetracarboxylic dianhydride;

1,3,3a,4,5,9b-hexahydro-5(tetrahydro-2,5-dioxo-3-furanyl)naphtho[1,2-c]furan-1,3-dione;

1,3,3a,4,5,9b-hexahydro-5-methyl-5-(tetrahydro-2,5-dioxo-3-furanyl)naphtho[1,2-c]furan-1,3-dione;

1,3,3a,4,5,9b-hexahydro-5-ethyl-5-(tetrahydro-2,5-dioxo-3-furanyl)naphtho[1,2-c]furan-1,3-dione;

1,3,3a,4,5,9b-hexahydro-7-methyl-5-(tetrahydro-2,5-dioxo-3-furanyl)naphtho[1,2-c]furan-1,3-dione;

1,3,3a,4,5,9b-hexahydro-7-ethyl-5-(tetrahydro-2,5-dioxo-3-furanyl)naphtho[1,2-c]furan-1,3-dione;

1,3,3a,4,5,9b-hexahydro-8-methyl-5-(tetrahydro-2,5-dioxo-3-furanyl)naphtho[1,2-c]furan-1,3-dione; and 1,3,3a,4,5,9b-hexahydro-8-ethyl-5-(tetrahydro-2,5-dioxo-3-furanyl)naphtho[1,2-c]furan-1,3-dione.

15. The process of producing a liquid crystal alignment layer of claim 8, wherein $Q^1$ is a residue of an aromatic diamine compound having two amino groups bonded to an aromatic ring, and comprising heteroatoms other than the nitrogen atoms of the amino groups, and wherein $Q^2$ is a residue of an aromatic diamine compound having two amino groups bonded to an aromatic ring, and having no heteroatoms other than the nitrogen atoms of the amino groups.

16. The process of producing a liquid crystal alignment layer of claim 15, wherein $Q^1$ is a residue of a diamine compound selected from the group consisting of compounds A01–A14 in FIGS. 7–9.

17. The composition of claim 7, wherein at least one of $R^1$ and $R^2$ is a residue of a cyclic aliphatic tetracarboxylic compound selected from the group consisting of tetracarboxylic acids, tetracarboxylic dianhydrides and tetracarboxylic esters.

18. The composition of claim 7, wherein at least one of $R^1$ and $R^2$ is a residue of a cyclic aliphatic tetracarboxylic dianhydride selected from the group consisting of:

2,3,5-tricarboxycyclopentylacetic dianhydride;

1,2,3,4-cyclobutanetetracarboxylic dianhydride;

1,3-dimethyl-1,2,3,4-cyclobutanetetracarboxylic dianhydride;

1,3,3a,4,5,9b-hexahydro-5(tetrahydro-2,5-dioxo-3-furanyl)naphtho[1,2-c]furan-1,3-dione;

1,3,3a,4,5,9b-hexahydro-5-methyl-5-(tetrahydro-2,5-dioxo-3-furanyl)naphtho[1,2-c]furan-1,3-dione;

1,3,3a,4,5,9b-hexahydro-5-ethyl-5-(tetrahydro-2,5-dioxo-3-furanyl)naphtho[1,2-c]furan-1,3-dione;

1,3,3a,4,5,9b-hexahydro-7-methyl-5-(tetrahydro-2,5-dioxo-3-furanyl)naphtho[1,2-c]furan-1,3-dione;

1,3,3a,4,5,9b-hexahydro-7-ethyl-5-(tetrahydro-2,5-dioxo-3-furanyl)naphtho[1,2-c]furan-1,3-dione;

1,3,3a,4,5,9b-hexahydro-8-methyl-5-(tetrahydro-2,5-dioxo-3-furanyl)naphtho[1,2-c]furan-1,3-dione; and 1,3,3a,4,5,9b-hexahydro-8-ethyl-5-(tetrahydro-2,5-dioxo-3-furanyl)naphtho[1,2-c]furan-1,3-dione.

19. The composition of claim 7, wherein $Q^1$ is a residue of an aromatic diamine compound having two amino groups bonded to an aromatic ring, and comprising heteroatoms other than the nitrogen atoms of the amino groups, and wherein $Q^2$ is a residue of an aromatic diamine compound having two amino groups bonded to an aromatic ring, and having no heteroatoms other than the nitrogen atoms of the amino groups.

20. The composition of claim 17, wherein $Q^1$ is a residue of an aromatic diamine compound having two amino groups bonded to an aromatic ring, and comprising heteroatoms other than the nitrogen atoms of the amino groups, and wherein $Q^2$ is a residue of an aromatic diamine compound having two amino groups bonded to an aromatic ring, and having no heteroatoms other than the nitrogen atoms of the amino groups.

21. The composition of claim 18, wherein $Q^1$ is a residue of an aromatic diamine compound having two amino groups bonded to an aromatic ring, and comprising heteroatoms other than the nitrogen atoms of the amino groups, and wherein $Q^2$ is a residue of an aromatic diamine compound having two amino groups bonded to an aromatic ring, and having no heteroatoms other than the nitrogen atoms of the amino groups.

22. The composition of claim 7, wherein $Q^1$ is a residue of a diamine compound selected from the group consisting of the following compounds:

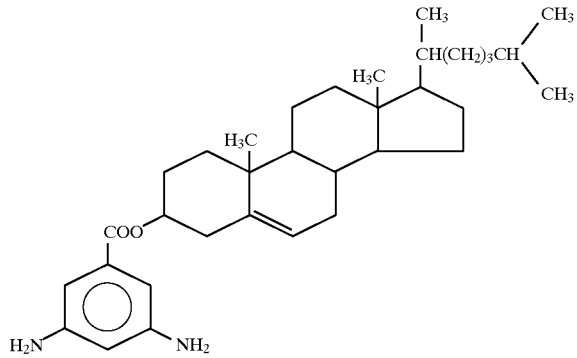

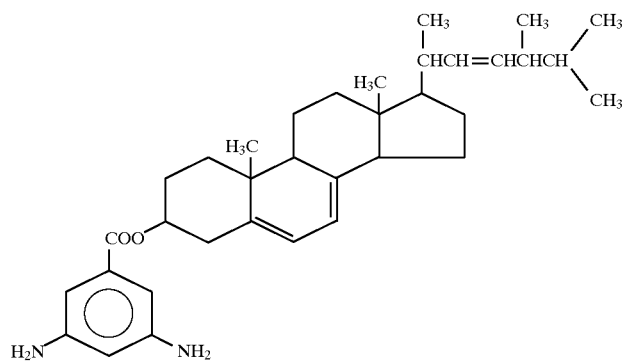

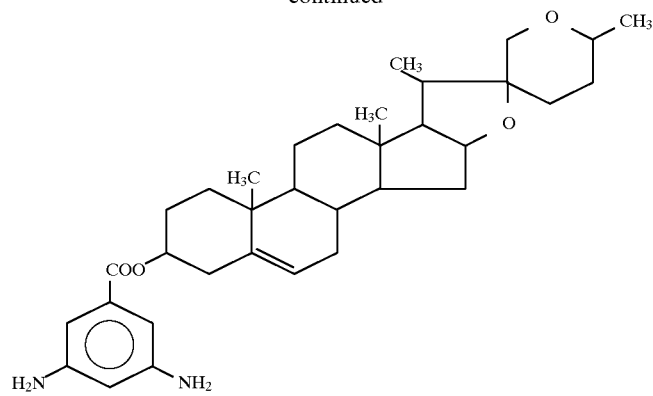
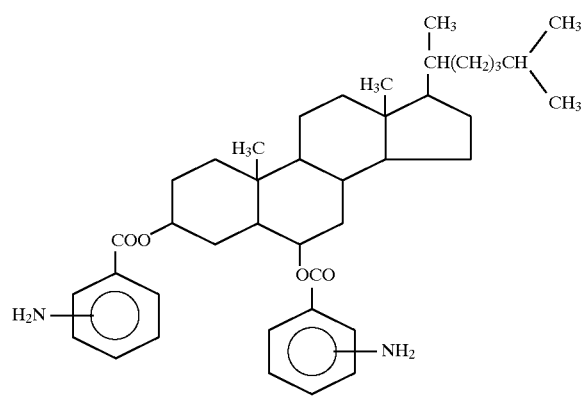
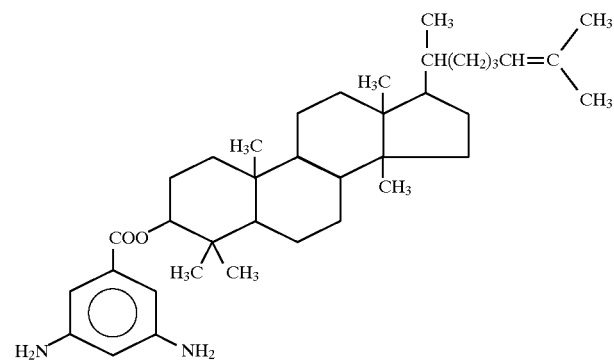
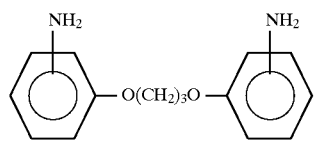
(a = 5 ~12)
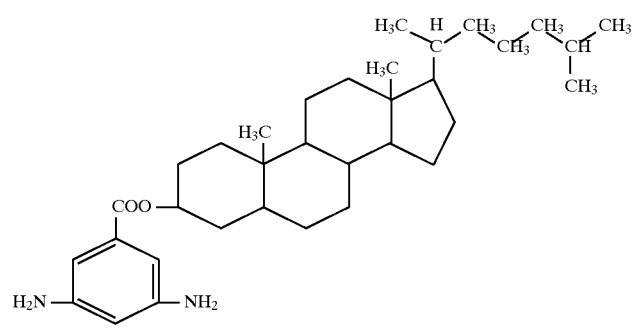

-continued
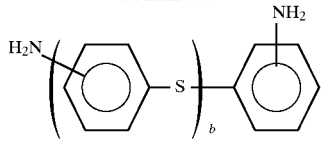
(b = 1~5)
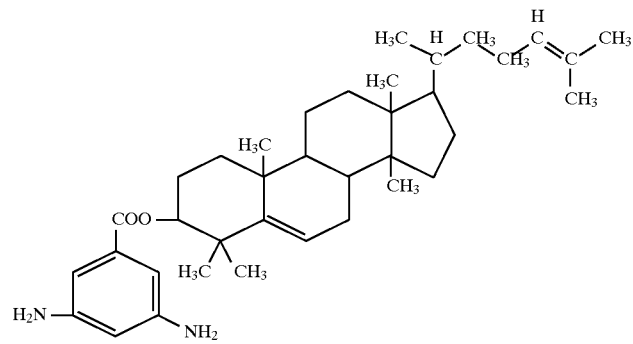
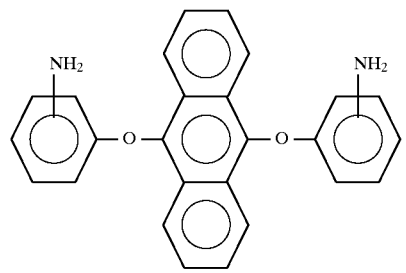
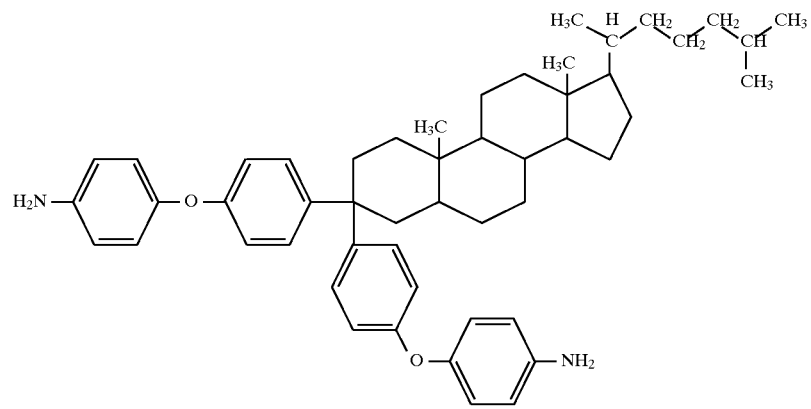
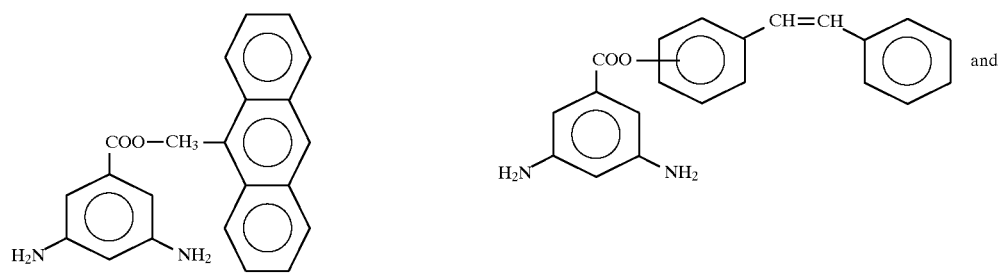
and
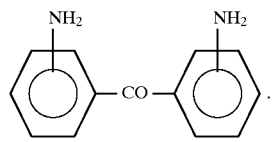
.

23. The composition of claim 17, wherein $Q^1$ is a residue of a diamine compound selected from the group consisting of the following compounds:
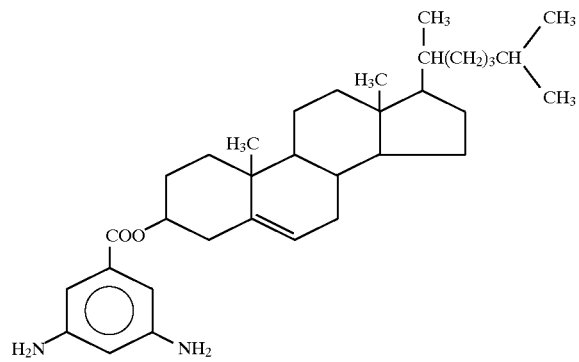
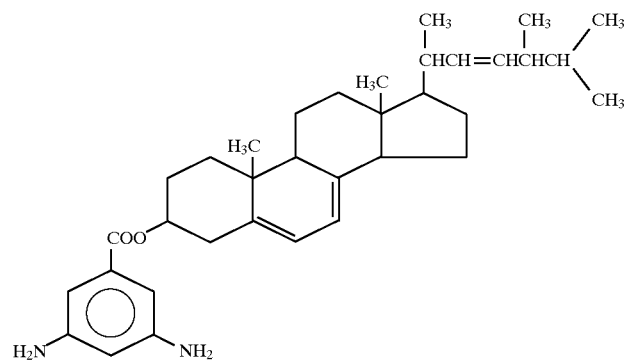
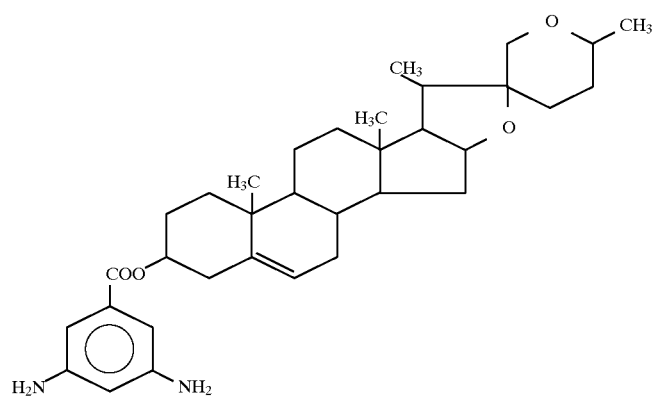
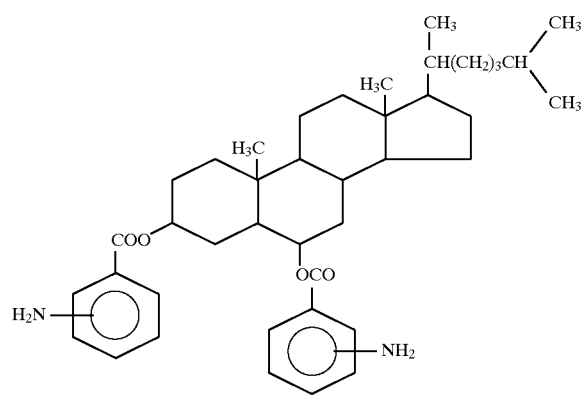

-continued
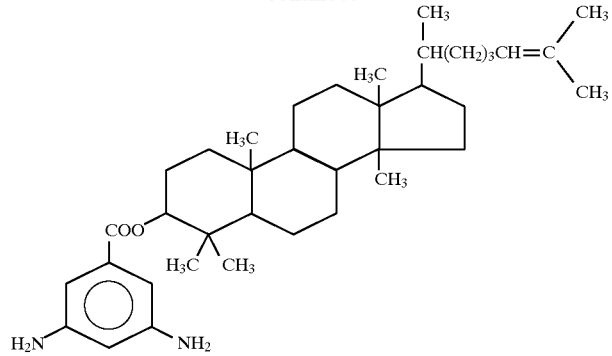
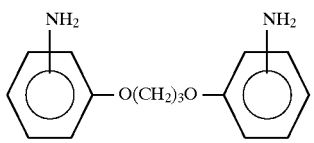
(a = 5 ~12)
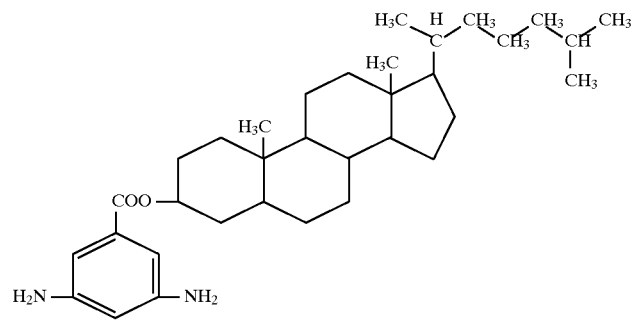
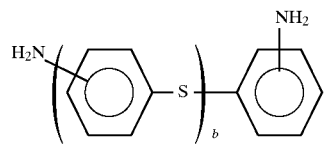
(b = 1~5
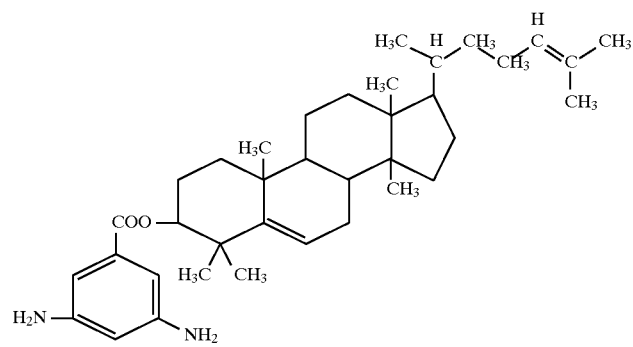
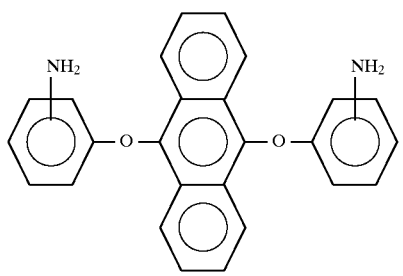

-continued
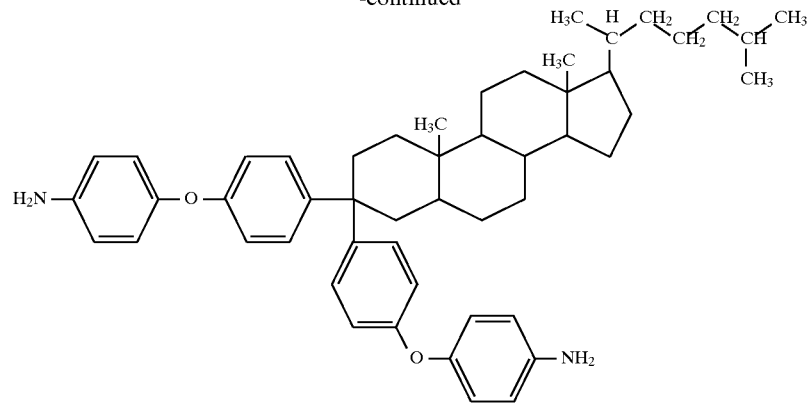
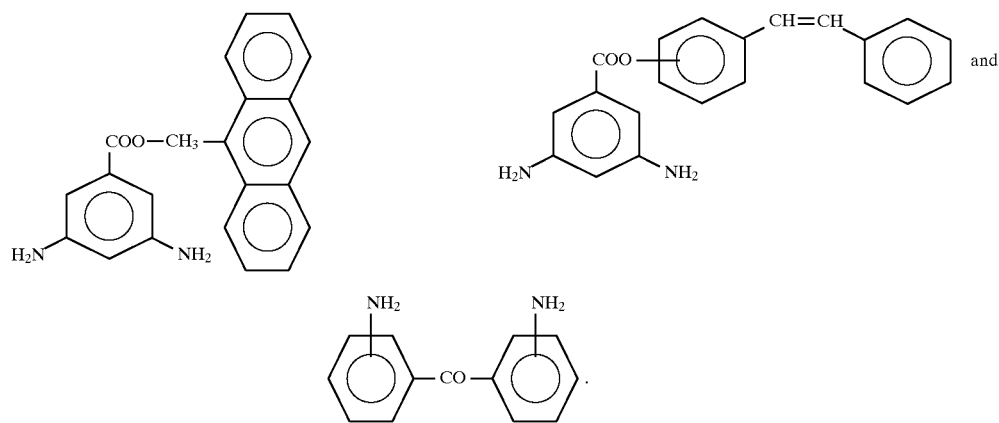
24. The composition of claim 18, wherein $Q^1$ is a residue of a diamine compound selected from the group consisting of the following compounds:
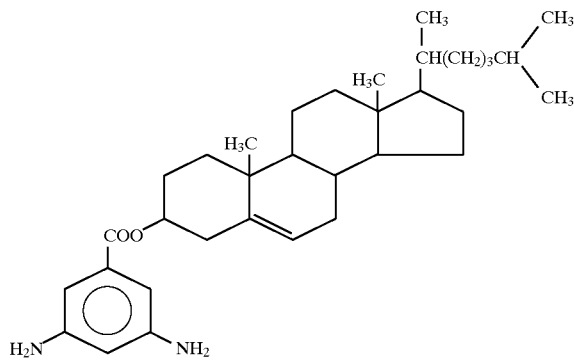

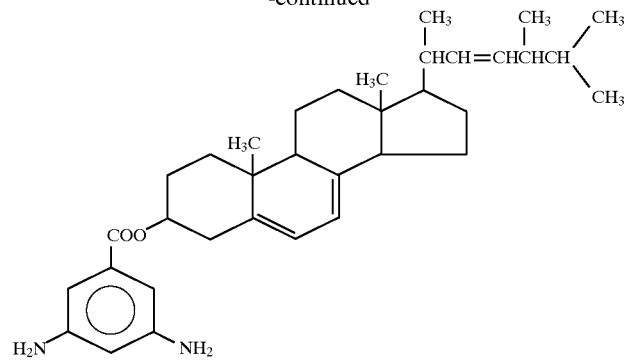
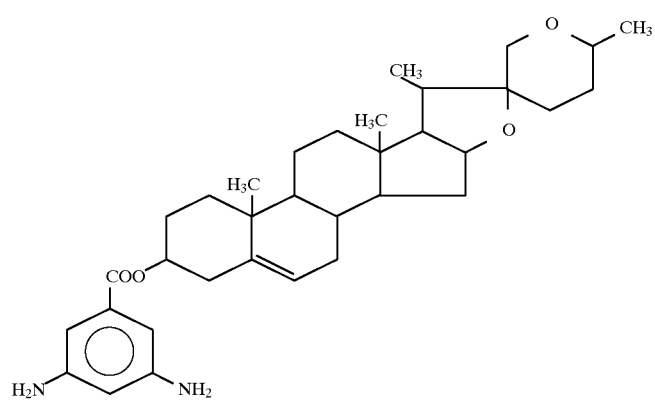
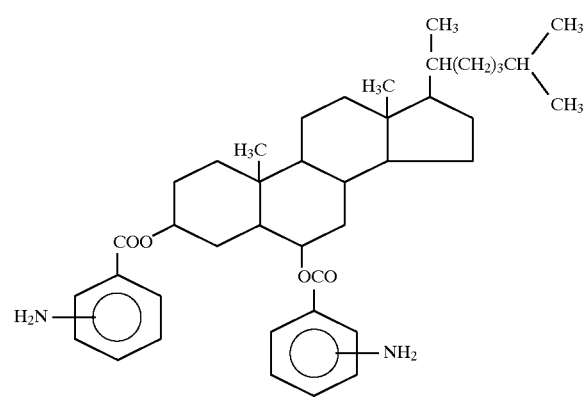
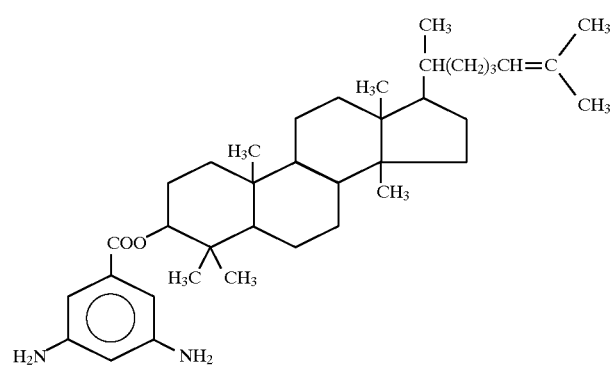
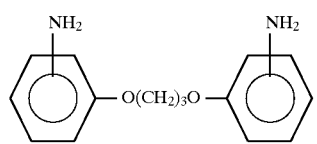
(a = 5 ~12)

-continued
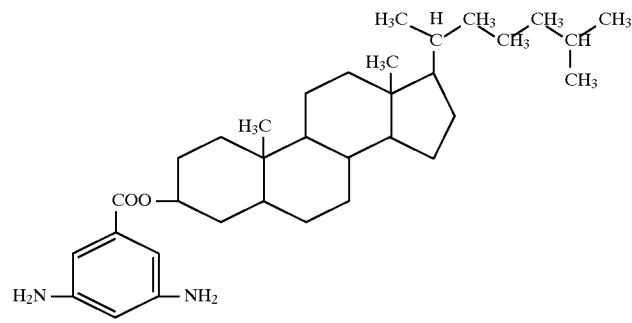
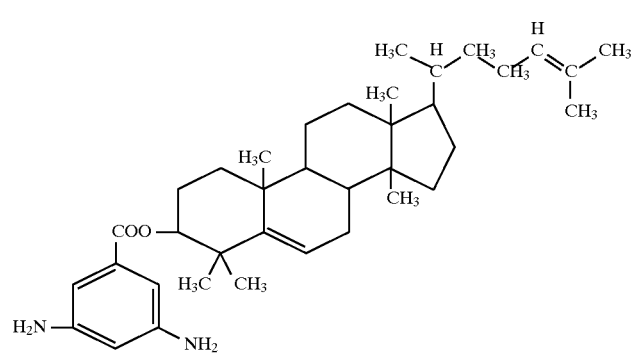
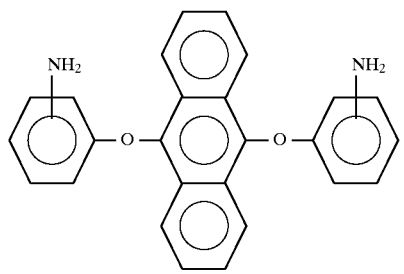
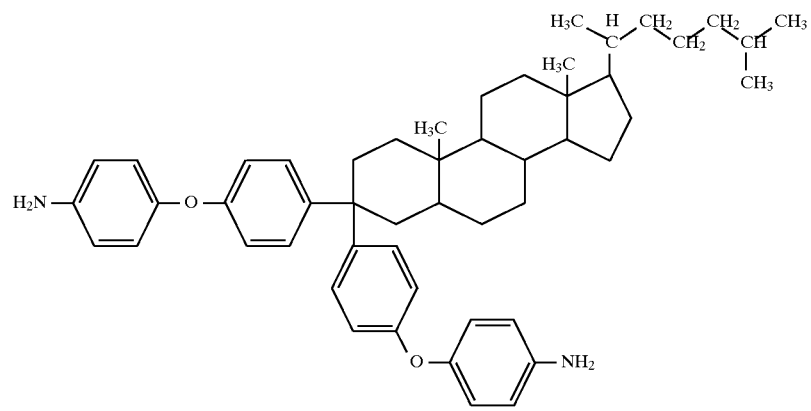

-continued
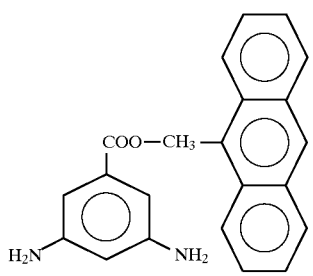
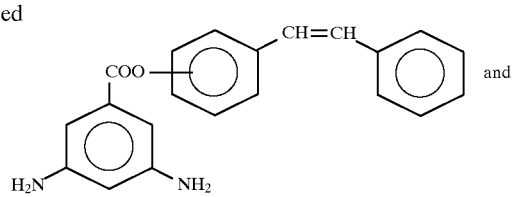 and
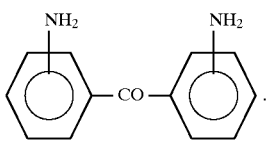
25. The composition of claim 19, wherein $Q^1$ is a residue of a diamine compound selected from the group consisting of the following compounds:
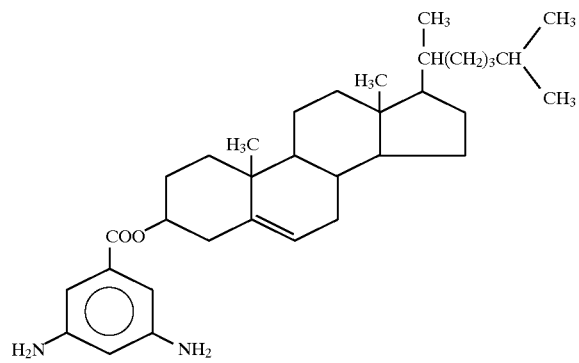
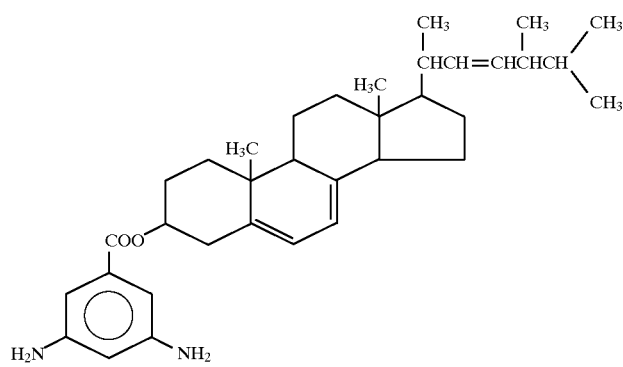
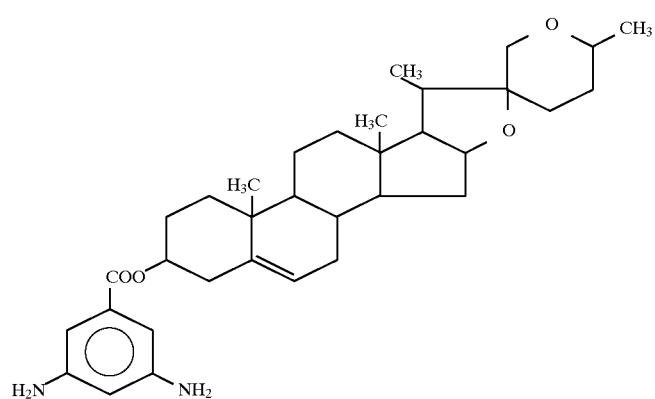

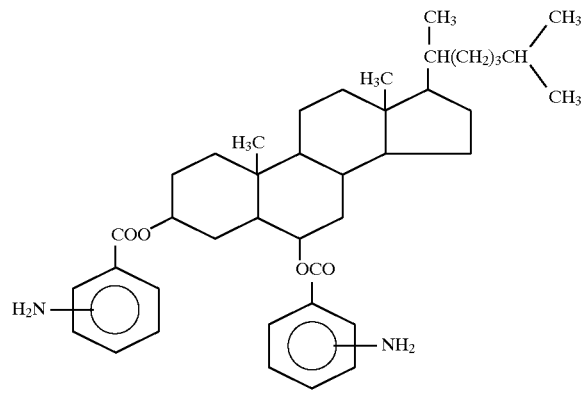
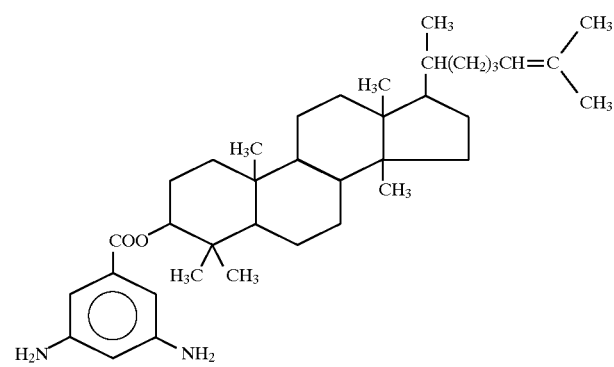
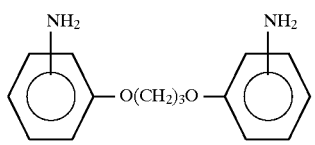
(a = 5 ~12)
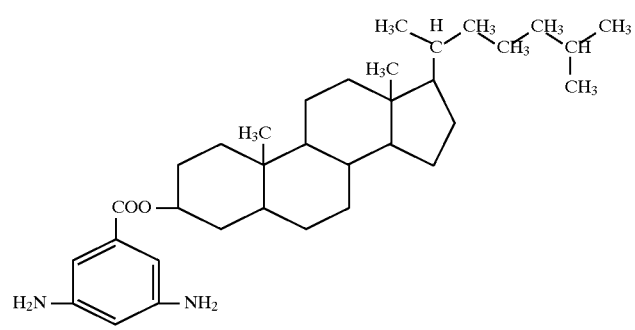
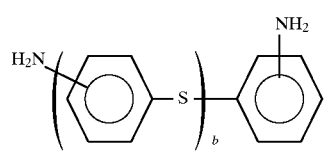
(b = 1~5)

-continued
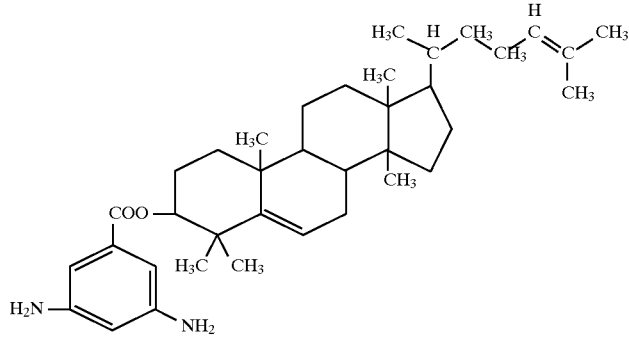
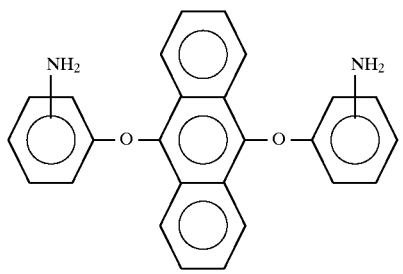
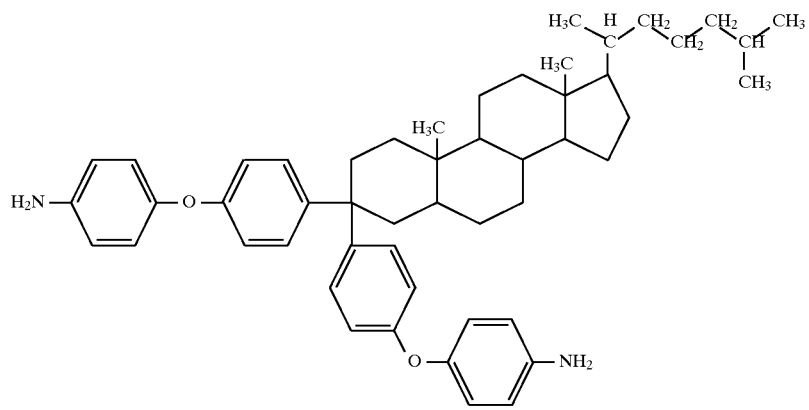
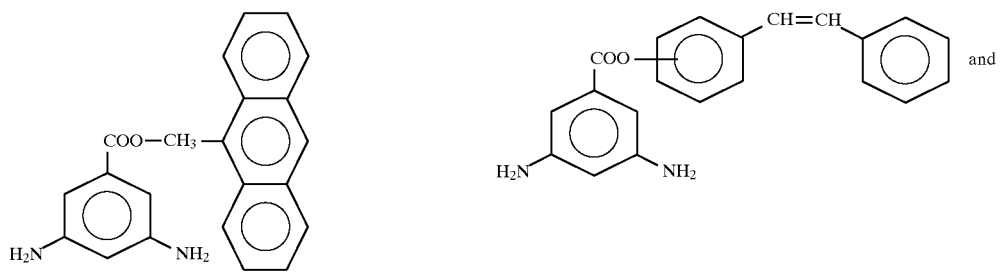
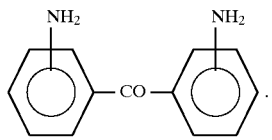
* * * * *